(12) United States Patent
Nan et al.

(10) Patent No.: US 10,285,197 B2
(45) Date of Patent: May 7, 2019

(54) RANDOM ACCESS RESPONSE METHOD, BASE STATION AND TERMINAL

(71) Applicant: Huawei Technologies Co., Ltd., Shenzhen (CN)

(72) Inventors: Fang Nan, Beijing (CN); Zheng Yu, Beijing (CN); Xingqing Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 161 days.

(21) Appl. No.: 15/272,315

(22) Filed: Sep. 21, 2016

(65) Prior Publication Data
US 2017/0013643 A1 Jan. 12, 2017

Related U.S. Application Data

(63) Continuation of application No. PCT/CN2014/073896, filed on Mar. 21, 2014.

(51) Int. Cl.
*H04W 74/00* (2009.01)
*H04W 74/08* (2009.01)

(52) U.S. Cl.
CPC ..... *H04W 74/006* (2013.01); *H04W 74/0833* (2013.01); *Y02D 70/00* (2018.01);
(Continued)

(58) Field of Classification Search
CPC ............ H04W 74/006; H04W 74/0833; Y02D 70/00; Y02D 70/1262; Y02D 70/1264; Y02D 70/21
See application file for complete search history.

(56) References Cited

U.S. PATENT DOCUMENTS

2012/0063393 A1* 3/2012 Du ............... H04W 36/0077
370/329
2013/0029657 A1* 1/2013 Gao ............... H04W 74/004
455/422.1
(Continued)

FOREIGN PATENT DOCUMENTS

CN 102231917 A 11/2011
CN 103249169 A 2/2012
(Continued)

OTHER PUBLICATIONS

NTT DOCOMO, "Discussion on Multi-level PRACH Coverage Enhancement", Discussion & Decision; R1-135509, 3rd Generation Partnership Project (3GPP) TSG RAN WG1 Meeting #75, San Francisco, USA, Nov. 11-15, 2013, 7 pages.
(Continued)

*Primary Examiner* — Ajay Cattungal
(74) *Attorney, Agent, or Firm* — Slater Matsil, LLP

(57) ABSTRACT

A random access response method, a base station, and a terminal are disclosed. In an embodiment the method includes receiving a random access preamble sent in an enhanced manner, determining at least one of level information or resource information corresponding to the random access preamble sent in the enhanced manner and sending a random access response RAR of the random access preamble according to the at least one of the level information or the resource information, where the RAR is carried by a physical downlink shared channel PDSCH.

16 Claims, 19 Drawing Sheets

(52) U.S. Cl.
CPC ...... *Y02D 70/1262* (2018.01); *Y02D 70/1264* (2018.01); *Y02D 70/21* (2018.01)

(56) References Cited

U.S. PATENT DOCUMENTS

| | | | |
|---|---|---|---|
| 2013/0039195 A1* | 2/2013 | Weng | H04W 48/20 370/252 |
| 2013/0064165 A1* | 3/2013 | Chen | H04W 56/0045 370/312 |
| 2013/0083739 A1 | 4/2013 | Yamada | |
| 2013/0083753 A1* | 4/2013 | Lee | H04W 74/0833 370/329 |
| 2013/0201960 A1* | 8/2013 | Kim | H04L 1/1861 370/331 |
| 2014/0044074 A1* | 2/2014 | Chen | H04W 74/0833 370/329 |
| 2014/0086213 A1* | 3/2014 | Kwon | H04W 36/0055 370/331 |
| 2014/0086224 A1* | 3/2014 | Kwon | H04W 52/0219 370/336 |
| 2014/0233535 A1* | 8/2014 | Zhao | H04W 72/0453 370/336 |
| 2014/0328302 A1* | 11/2014 | Park | H04L 5/0037 370/329 |
| 2015/0023281 A1* | 1/2015 | Wu | H04W 72/0473 370/329 |
| 2015/0071198 A1* | 3/2015 | Deng | H04W 74/0833 370/329 |
| 2015/0078286 A1* | 3/2015 | Kim | H04L 1/18 370/329 |
| 2015/0181461 A1 | 6/2015 | Kim et al. | |
| 2015/0319779 A1* | 11/2015 | Li | H04L 27/2613 370/329 |
| 2017/0013610 A1* | 1/2017 | Lee | H04L 1/00 |
| 2017/0245232 A1* | 8/2017 | Kwon | H04W 56/0005 |

FOREIGN PATENT DOCUMENTS

| | | |
|---|---|---|
| CN | 103582073 A | 2/2014 |
| KR | 101208288 B1 | 12/2012 |
| WO | 2010123322 A2 | 10/2010 |
| WO | 2014023026 A1 | 2/2014 |

OTHER PUBLICATIONS

Intel Corporation, "Coverage Improvement for PRACH", Discussion & Decision; R1-140115, 3rd Generation Partnership Project (3GPP) TSG RAN WG1 Meeting #76, Prague, Czech Republic, Feb. 10-14, 2014, 9 pages.

Alcatel-Lucent, Alcatel-Lucent Shanghai Bell, "Coverage enhancement for Rach", Discussion & Decision; R12-140726, 3rd Generation Partnership Project (3GPP) TSG RAN WG2 Meeting #85, Prague, Czech Republic, Feb. 10-14, 2014, 5 pages.

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 v12.1.0, Mar. 2014, 57 pages.

Alcatel-Lucent et al., 3GPP TSG-RAN WG1 Meeting #75 R1-135155, "PRACH Coverage Enhancement for MTC UE", Nov. 11-15, 2013, 8 pages.

* cited by examiner

```
┌─────────────────────────────────────────────────────┐
│ A UE determines a random access preamble to be sent in an enhanced │
│  manner, and determines at least one of level information or resource │
│  information corresponding to the random access preamble, where the │
│    level information includes at least one of a level, a level index, an │
│     enhancement level, an enhancement level index, a repetition level, a │
│      repetition level index, a repetition count, a resource level, a resource │
│       level index, a resource set level, a resource set level index, a resource │
│       set index, a time resource set index, a frequency resource set index, a │
│          preamble index, a preamble group index, or a channel quality           │──── 301
│        characterization parameter, and the resource information includes at │
│       least one of a time-frequency resource index, a resource index, a │
│        random access opportunity index, a physical random access channel │
│          PRACH mask index, a time resource startpoint index, a time resource │
│          index, a frequency resource index, or a first PRACH index of the first │
│         subframe in which a PRACH carrying the random access preamble is │
│           located, where a quantity of values of the first PRACH index of the │
│              first subframe in which the PRACH carrying the random access │
│                    preamble is located is a positive integer greater than 6 │
└─────────────────────────────────────────────────────┘
                              ▼
┌─────────────────────────────────────────────────────┐
│   The UE sends the random access preamble in the enhanced manner   │──── 302
└─────────────────────────────────────────────────────┘
                              ▼
┌─────────────────────────────────────────────────────┐
│  The UE receives an RAR of the random access preamble according to │
│   the at least one of the level information or the resource information,  │──── 303
│                where the RAR is carried by a PDSCH                │
└─────────────────────────────────────────────────────┘
```

FIG. 3

RANDOM ACCESS RESPONSE METHOD, BASE STATION AND TERMINAL

CROSS-REFERENCE TO RELATED APPLICATIONS

This application is a continuation of International Application No. PCT/CN2014/073896, filed on Mar. 21, 2014, and entitled "RANDOM ACCESS RESPONSE METHOD, BASE STATION AND TERMINAL", which application is incorporated herein by reference.

TECHNICAL FIELD

The present invention relates to the wireless communications field, and in particular, to a random access response method, a base station, and a terminal.

BACKGROUND

In a wireless communications system, a terminal (User Equipment, UE) needs to establish a connection to a network, and this procedure is referred to as a random access procedure. In a Long Term Evolution (LTE) or Long Term Evolution Advanced (LTE-A) system, the random access procedure is classified into a contention-based random access procedure and a non-contention based random access procedure. Two contention-based random access procedures include four steps shown in FIG. 1, and the non-contention based random access procedure includes only the first two steps. For detailed descriptions about FIG. 1, reference may be made to a preface part of the description of embodiments, which is not described herein.

When the LTE or LTE-A system supports a machine type communication (MTC) service, network coverage of LTE or LTE-A needs to be enhanced, that is, information on an LTE or LTE-A network needs to be sent in an enhanced manner. In the prior art, a method for sending, in an enhanced manner, a random access preamble carried by a physical random access channel (PRACH) is repeatedly sending the random access preamble. For related descriptions, reference may be made to the preface part of the description of embodiments, which is not described herein. It can be learned from analysis that, during scrambling on physical downlink control channels (PDCCH) at different repetition levels, a same random access radio network temporary identifier (RA-RNTI) may be used to calculate scrambling code sequences, where the scrambling on the PDCCHs refers to scrambling cyclic redundancy check (CRC) of downlink control information (DCI) carried by the PDCCHs. In this way, when the UE detects the PDCCHs, if a base station sends, in one subframe, downlink control information (DCI) carried by the PDCCHs at different repetition levels and uses a same RA-RNTI when calculating scrambling code sequences for the PDCCHs at different repetition levels, the UE cannot distinguish the PDCCHs at different repetition levels. When detecting the PDCCHs, the UE may consider a PDCCH at another repetition level as a PDCCH of the UE and successfully detect the PDCCH, and further detect a physical downlink shared channel (PDSCH) that carries a random access response (RAR) and is scheduled by using DCI carried by the PDCCH, which may cause the following problems:

A first problem is RAR missed detection. That is, a PRACH resource set corresponding to the PDCCH at another repetition level does not include a PRACH resource used when the UE sends the random access preamble. Therefore, when detecting the PDSCH scheduled by using the DCI carried by the PDCCH, the UE cannot find a Media Access Control (MAC) subheader including a random access preamble index (RAPID) of the random access preamble sent by the UE, and consequently considers that no RAR is received, which causes RAR missed detection, requires the random access preamble to be sent again, and causes power waste of the UE.

A second problem is an RAR false alarm. If the base station does not send the RAR to the UE, when time division multiplexing/frequency division multiplexing (TDM/FDM) is used for random access preambles at different PRACH repetition levels, because a same code resource may be used for different PRACH repetition levels, and the PDSCH scheduled by using the DCI carried by the PDCCH at the another repetition level may carry the MAC subheader including the PAPID of the random access preamble sent by the UE, the UE mistakenly considers, when detecting the PDSCH scheduled by using the DCI carried by the PDCCH, that the UE has detected the RAR, and executes a subsequent procedure for random access, which also causes power waste of the UE.

SUMMARY

Embodiments of the present invention provide a random access response method, a base station, and a terminal, which can reduce power waste of the terminal.

According to a first aspect, a random access response method is provided, where the method includes:

receiving a random access preamble sent in an enhanced manner;

determining at least one of level information or resource information corresponding to the random access preamble sent in the enhanced manner, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; and sending a random access response RAR of the random access preamble according to the at least one of the level information or the resource information, where the RAR is carried by a physical downlink shared channel PDSCH.

With reference to the first aspect, in a first possible implementation manner of the first aspect, the sending an RAR of the random access preamble according to the at least one of the level information or the resource information, where the RAR is carried by a PDSCH includes:

scrambling, according to the at least one of the level information or the resource information, cyclic redundancy check CRC of downlink control information DCI carried by a physical downlink control channel PDCCH;

sending the scrambled DCI carried by the PDCCH, where the DCI is used for scheduling the PDSCH;

scrambling the RAR carried by the PDSCH; and sending the scrambled RAR carried by the PDSCH;

or the sending a random access response RAR of the random access preamble according to the at least one of the level information or the resource information, where the RAR is carried by a PDSCH includes:

scrambling, according to the at least one of the level information or the resource information, the RAR carried by the PDSCH; and sending the scrambled RAR carried by the PDSCH.

With reference to the first possible implementation manner of the first aspect, in a second possible implementation manner of the first aspect, the scrambling the RAR carried by the PDSCH includes:

scrambling, according to the at least one of the level information or the resource information, the RAR carried by the PDSCH.

With reference to the first possible implementation manner of the first aspect or the second possible implementation manner of the first aspect, in a third possible implementation manner of the first aspect, the scrambling, according to the at least one of the level information or the resource information, CRC of DCI carried by the PDCCH includes:

determining a random access radio network temporary identifier RA-RNTI according to the at least one of the level information or the resource information; and determining a scrambling code sequence according to the RA-RNTI, and scrambling, by using the scrambling code sequence, the CRC of the DCI carried by the PDCCH; and the scrambling, according to the at least one of the level information or the resource information, the RAR carried by the PDSCH includes:

determining an RA-RNTI according to the at least one of the level information or the resource information; and determining a scrambling code sequence according to the RA-RNTI, and scrambling, by using the scrambling code sequence, the RAR carried by the PDSCH.

With reference to the third possible implementation manner of the first aspect, in a fourth possible implementation manner of the first aspect, the method further includes:

when the at least one of the level information or the resource information has different values, determined RA-RNTIs are different.

With reference to the third possible implementation manner of the first aspect or the fourth possible implementation manner of the first aspect, in a fifth possible implementation manner of the first aspect, the determining the RA-RNTI according to the level information includes:

determining the RA-RNTI according to the level information and the following first formula, where the first formula includes:

$$RA\text{-}RNTI = M + t\_id + 10 * f\_id, \text{ where}$$

M is determined according to the level information, $t\_id$ represents a sequence number of the first subframe in which the PRACH carrying the random access preamble is located and $0 \leq t\_id < 10$, and $f\_id$ represents a second PRACH index of the first subframe in which the PRACH carrying the random access preamble is located and $0 \leq f\_id < 6$.

With reference to the fifth possible implementation manner of the first aspect, in a sixth possible implementation manner of the first aspect, the method further includes:

time resources included in multiple random access opportunities of random access preambles corresponding to same level information do not overlap.

With reference to the third possible implementation manner of the first aspect or the fourth possible implementation manner of the first aspect, in a seventh possible implementation manner of the first aspect, the determining the RA-RNTI according to the level information and the resource information includes:

determining the RA-RNTI according to the level information, the resource information, and the following second formula, where the second formula includes:

$$RA\text{-}RNTI = M + tf\_id,$$

or the second formula includes:

$$RA\text{-}RNTI = M + t\_id + 10 * f\_id',$$

or the second formula includes:

$$RA\text{-}RNTI = M + t\_id' + T * f\_id,$$

or the second formula includes:

$$RA\text{-}RNTI = M + t\_id' + T * f\_id', \text{ where}$$

M is determined according to the level information, $t\_id$ represents a sequence number of the first subframe in which the PRACH carrying the random access preamble is located and $0 \leq t\_id < 10$, $f\_id$ represents a second PRACH index of the first subframe in which the PRACH carrying the random access preamble is located and $0 \leq f\_id < 6$, $tf\_id$ represents at least one of the time-frequency resource index, the resource index, the random access opportunity index, or the PRACH mask index, $t\_id'$ represents the time resource startpoint index or the time resource index, $f\_id'$ represents the frequency resource index or the first PRACH index of the first subframe in which the PRACH carrying the random access preamble is located, and T represents a quantity of values of $t\_id'$.

With reference to the seventh possible implementation manner of the first aspect, in an eighth possible implementation manner of the first aspect, the method further includes:

when first level information corresponding to a first random access preamble is different from second level information corresponding to a second random access preamble, some or all values of first resource information corresponding to the first random access preamble and second resource information corresponding to the second random access preamble are the same.

With reference to the fifth possible implementation manner of the first aspect to the eighth possible implementation manner of the first aspect, in a ninth possible implementation manner of the first aspect, that M is determined according to the level information includes:

$$M = X * L + Y, \text{ where}$$

L represents the level information, and X and Y are constant positive integers; or that M is determined according to the level information includes:

when the level information is lowest level information corresponding to the random access preamble sent in the enhanced manner, $M = 61$; or when the level information is not lowest level information corresponding to the random access preamble sent in the enhanced manner, M is equal to 1 plus a maximum value of an RA-RNTI determined according to level information that is one piece of level information lower than the level information.

With reference to the third possible implementation manner of the first aspect or the fourth possible implementation manner of the first aspect, in a tenth possible implementation manner of the first aspect, the determining the RA-RNTI according to the resource information includes:

determining the RA-RNTI according to the resource information and the following third formula, where the third formula includes:

RA-RNTI=$N$+tf_id, or the third formula includes:

RA-RNTI=$N$+$t$_id+10*$f$_id', or the third formula includes:

RA-RNTI=$N$+$t$_id'+$T$*$f$_id, or the third formula includes:

RA-RNTI=$N$+$t$_id'+$T$*$f$_id', where

N is a constant positive integer, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the tenth possible implementation manner of the first aspect, in an eleventh possible implementation manner of the first aspect, the method further includes:

when first level information corresponding to a first random access preamble is different from second level information corresponding to a second random access preamble, all values of first resource information corresponding to the first random access preamble and second resource information corresponding to the second random access preamble are different.

With reference to the first aspect, in a twelfth possible implementation manner of the first aspect, the sending an RAR of the random access preamble according to the at least one of the level information or the resource information, where the RAR is carried by a PDSCH includes:

determining a resource of a PDCCH according to the at least one of the level information or the resource information, where the resource includes at least one resource of a time resource or a frequency resource;

sending, on the resource, DCI carried by the PDCCH, where the DCI is used for scheduling the PDSCH; and sending the RAR carried by the PDSCH.

With reference to the twelfth possible implementation manner of the first aspect, in a thirteenth possible implementation manner of the first aspect, the method further includes:

when the at least one of the level information or the resource information has different values, determined resources of the PDCCH do not overlap or are different.

With reference to the twelfth possible implementation manner of the first aspect or the thirteenth possible implementation manner of the first aspect, in a fourteenth possible implementation manner of the first aspect, if the resource includes the frequency resource, the determining a resource of a PDCCH according to the at least one of the level information or the resource information includes:

determining at least one of a PDCCH aggregation level, a PDCCH search space, or a PDCCH candidate according to the at least one of the level information or the resource information.

With reference to the twelfth possible implementation manner of the first aspect to the fourteenth possible implementation manner of the first aspect, in a fifteenth possible implementation manner of the first aspect, the method further includes:

sending information about a correspondence between the resource of the PDCCH and the at least one of the level information or the resource information of the random access preamble sent in the enhanced manner, so as to determine the resource of the PDCCH according to the information about the correspondence.

With reference to the first aspect, in a sixteenth possible implementation manner of the first aspect, the sending an RAR of the random access preamble according to the at least one of the level information or the resource information, where the RAR is carried by a physical downlink shared channel PDSCH includes:

sending DCI carried by a PDCCH, where the DCI includes the at least one of the level information or the resource information, and the DCI is used for scheduling the PDSCH; and sending the RAR carried by the PDSCH;

or the sending an RAR of the random access preamble according to the at least one of the level information or the resource information, where the RAR is carried by a PDSCH includes:

sending the RAR carried by the PDSCH, and adding the at least one of the level information or the resource information to the PDSCH.

With reference to the sixteenth possible implementation manner of the first aspect, in a seventeenth possible implementation manner of the first aspect, the adding the at least one of the level information or the resource information to the PDSCH includes:

representing the at least one of the level information or the resource information by using a bit in a backoff indication subheader of a Media Access Control MAC protocol data unit PDU carried by the PDSCH that carries the RAR.

With reference to the first aspect to the seventeenth possible implementation manner of the first aspect, in an eighteenth possible implementation manner of the first aspect, the channel quality characterization parameter includes at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

According to a second aspect, a random access response method is provided, where the method includes:

determining a random access preamble to be sent in an enhanced manner, and determining at least one of level information or resource information corresponding to the random access preamble, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6;

sending the random access preamble in the enhanced manner; and receiving a random access response RAR of the random access preamble according to the at least one of the level information or the resource information, where the RAR is carried by a physical downlink shared channel PDSCH.

With reference to the second aspect, in a first possible implementation manner of the second aspect, the receiving an RAR of the random access preamble according to the at least one of the level information or the resource information, where the RAR is carried by a PDSCH includes:

receiving the RAR carried by the PDSCH; and descrambling, according to the at least one of the level information or the resource information, the received RAR carried by the PDSCH;

or the receiving an RAR of the random access preamble according to the at least one of the level information or the resource information, where the RAR is carried by a PDSCH includes:

receiving downlink control information DCI carried by a physical downlink control channel PDCCH, where the DCI is used for scheduling the PDSCH;

descrambling, according to the at least one of the level information or the resource information, CRC of the received DCI carried by the PDCCH;

receiving, according to scheduling of the DCI, the RAR carried by the PDSCH; and descrambling the received RAR carried by the PDSCH.

With reference to the first possible implementation manner of the second aspect, in a second possible implementation manner of the second aspect, the descrambling the received RAR carried by the PDSCH includes:

descrambling, according to the at least one of the level information or the resource information, the received RAR carried by the PDSCH.

With reference to the first possible implementation manner of the second aspect or the second possible implementation manner of the second aspect, in a third possible implementation manner of the second aspect, the descrambling, according to the at least one of the level information or the resource information, the received RAR carried by the PDSCH includes:

determining a random access radio network temporary identifier RA-RNTI according to the at least one of the level information or the resource information; and determining a scrambling code sequence according to the RA-RNTI, and descrambling, by using the scrambling code sequence, the RAR carried by the PDSCH; and the descrambling, according to the at least one of the level information or the resource information, CRC of the received DCI carried by the PDCCH includes:

determining an RA-RNTI according to the at least one of the level information or the resource information; and determining a scrambling code sequence according to the RA-RNTI, and descrambling, by using the scrambling code sequence, the CRC of the received DCI carried by the PDCCH.

With reference to the third possible implementation manner of the second aspect, in a fourth possible implementation manner of the second aspect, the method further includes:

when the at least one of the level information or the resource information has different values, determined RA-RNTIs are different.

With reference to the third possible implementation manner of the second aspect or the fourth possible implementation manner of the second aspect, in a fifth possible implementation manner of the second aspect, the determining the RA-RNTI according to the level information includes:

determining the RA-RNTI according to the level information and the following first formula, where the first formula includes:

$RA\text{-}RNTI = M + t\_id + 10 * f\_id$, where

M is determined according to the level information, t_id represents a sequence number of the first subframe in which the PRACH carrying the random access preamble is located and $0 \leq t\_id < 10$, and f_id represents a second PRACH index of the first subframe in which the PRACH carrying the random access preamble is located and $0 \leq f\_id < 6$.

With reference to the fifth possible implementation manner of the second aspect, in a sixth possible implementation manner of the second aspect, the method further includes:

time resources included in multiple random access opportunities of random access preambles corresponding to same level information do not overlap.

With reference to the third possible implementation manner of the second aspect or the fourth possible implementation manner of the second aspect, in a seventh possible implementation manner of the second aspect, the determining the RA-RNTI according to the level information and the resource information includes:

determining the RA-RNTI according to the level information, the resource information, and the following second formula, where the second formula includes:

$RA\text{-}RNTI = M + tf\_id$, or the second formula includes:

$RA\text{-}RNTI = M + t\_id + 10 * f\_id'$, or the second formula includes:

$RA\text{-}RNTI = M + t\_id' + T * f\_id$, or the second formula includes:

$RA\text{-}RNTI = M + t\_id' + T * f\_id'$, where

M is determined according to the level information, t_id represents a sequence number of the first subframe in which the PRACH carrying the random access preamble is located and $0 \leq t\_id < 10$, f_id represents a second PRACH index of the first subframe in which the PRACH carrying the random access preamble is located and $0 \leq f\_id < 6$, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the seventh possible implementation manner of the second aspect, in an eighth possible implementation manner of the second aspect, the method further includes:

when first level information corresponding to a first random access preamble is different from second level information corresponding to a second random access preamble, some or all values of first resource information corresponding to the first random access preamble and second resource information corresponding to the second random access preamble are the same.

With reference to the fifth possible implementation manner of the second aspect to the eighth possible implementation manner of the second aspect, in a ninth possible implementation manner of the second aspect, that M is determined according to the level information includes:

M=X*L+Y, where L represents the level information, and X and Y are constant positive integers; or that M is determined according to the level information includes:

when the level information is lowest level information corresponding to the random access preamble sent in the enhanced manner, M=61; or when the level information is not lowest level information corresponding to the random access preamble sent in the enhanced manner, M is equal to 1 plus a maximum value of an RA-RNTI determined according to level information that is one piece of level information lower than the level information.

With reference to the third possible implementation manner of the second aspect or the fourth possible implementation manner of the second aspect, in a tenth possible implementation manner of the second aspect, the determining the RA-RNTI according to the resource information includes:

determining the RA-RNTI according to the resource information and the following third formula, where
the third formula includes:

RA-RNTI=$N$+tf_id, or the third formula includes:

RA-RNTI=$N$+t_id+10*$f$_id', or the third formula includes:

RA-RNTI=$N$+t_id'+$T$*$f$_id, or the third formula includes:

RA-RNTI=$N$+t_id'+$T$*$f$_id', where

N is a constant positive integer, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the tenth possible implementation manner of the second aspect, in an eleventh possible implementation manner of the second aspect, the method further includes:

when first level information corresponding to a first random access preamble is different from second level information corresponding to a second random access preamble, all values of first resource information corresponding to the first random access preamble and second resource information corresponding to the second random access preamble are different.

With reference to the second aspect, in a twelfth possible implementation manner of the second aspect, the receiving an RAR of the random access preamble according to the at least one of the level information or the resource information, where the RAR is carried by a PDSCH includes:

determining a resource of a PDCCH according to the at least one of the level information or the resource information, where the resource includes at least one resource of a time resource or a frequency resource;

receiving, on the resource, DCI carried by the PDCCH, where the DCI is used for scheduling the PDSCH; and receiving, according to scheduling of the DCI, the RAR carried by the PDSCH.

With reference to the twelfth possible implementation manner of the second aspect, in a thirteenth possible implementation manner of the second aspect, the method further includes:

when the at least one of the level information or the resource information has different values, determined resources of the PDCCH do not overlap or are different.

With reference to the twelfth possible implementation manner of the second aspect or the thirteenth possible implementation manner of the second aspect, in a fourteenth possible implementation manner of the second aspect, if the resource includes the frequency resource, the determining a resource of a PDCCH according to the at least one of the level information or the resource information includes:

determining at least one of a PDCCH aggregation level, a PDCCH search space, or a PDCCH candidate according to the at least one of the level information or the resource information.

With reference to the twelfth possible implementation manner of the second aspect to the fourteenth possible implementation manner of the second aspect, in a fifteenth possible implementation manner of the second aspect, the determining a resource of a PDCCH according to the at least one of the level information or the resource information includes:

determining the resource of the PDCCH according to the at least one of the level information or the resource information and a pre-configured correspondence between the resource of the PDCCH and the at least one of the level information or the resource information of the random access preamble sent in the enhanced manner; or before the determining a resource of a PDCCH according to the at least one of the level information or the resource information, the method further includes:

receiving information about a correspondence between the resource of the PDCCH and the at least one of the level information or the resource information of the random access preamble sent in the enhanced manner; and the determining a resource of a PDCCH according to the at least one of the level information or the resource information includes:

determining the resource of the PDCCH according to the at least one of the level information or the resource information and the information about the correspondence.

With reference to the second aspect, in a sixteenth possible implementation manner of the second aspect, the receiving an RAR of the random access preamble according to the at least one of the level information or the resource information, where the RAR is carried by a PDSCH includes:

receiving DCI carried by a PDCCH, where the DCI includes the at least one of the level information or the resource information, and the DCI is used for scheduling the PDSCH;

determining whether the at least one of the level information or the resource information included in the received DCI is the same as the at least one of the level information or the resource information corresponding to the random access preamble; and when the at least one of the level information or the resource information included in the received DCI is the same as the at least one of the level information or the resource information corresponding to the random access preamble, receiving the RAR carried by the PDSCH scheduled by using the DCI;

or the receiving an RAR of the random access preamble according to the at least one of the level information or the resource information, where the RAR is carried by a PDSCH includes:

receiving information carried by the PDSCH, where the information carried by the PDSCH includes the RAR and the at least one of the level information or the resource information;

determining the at least one of the level information or the resource information included in the information carried by the PDSCH;

determining whether the at least one of the level information or the resource information included in the information carried by the PDSCH is the same as the at least one of the level information or the resource information corresponding to the random access preamble; and when the at least one of the level information or the resource information included in the information carried by the PDSCH is the same as the at least one of the level information or the resource information corresponding to the random access preamble, obtaining the RAR carried by the PDSCH.

With reference to the sixteenth possible implementation manner of the second aspect, in a seventeenth possible implementation manner of the second aspect, the determining the at least one of the level information or the resource information included in the information carried by the PDSCH includes:

determining, according to a bit in a backoff indication subheader of a Media Access Control MAC protocol data unit PDU carried by the PDSCH, the at least one of the level information or the resource information included in the information carried by the PDSCH.

With reference to the second aspect to the seventeenth possible implementation manner of the second aspect, in an eighteenth possible implementation manner of the second aspect, the channel quality characterization parameter includes at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

According to a third aspect, a base station is provided, where the base station includes a receiving unit, a determining unit, and a sending unit, where the receiving unit is configured to receive a random access preamble sent in an enhanced manner;

the determining unit is configured to determine at least one of level information or resource information corresponding to the random access preamble that is sent in the enhanced manner and that is received by the receiving unit, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; and the sending unit is configured to send a random access response RAR of the random access preamble according to the at least one of the level information or the resource information determined by the determining unit, where the RAR is carried by a physical downlink shared channel PDSCH.

With reference to the third aspect, in a first possible implementation manner of the third aspect, the sending unit includes a downlink control information DCI scrambling module, a DCI sending module, a first RAR scrambling module, and a first RAR sending module, where the DCI scrambling module is configured to scramble, according to the at least one of the level information or the resource information determined by the determining unit, cyclic redundancy check CRC of DCI carried by a physical downlink control channel PDCCH;

the DCI sending module is configured to send the DCI that is carried by the PDCCH and that is scrambled by the DCI scrambling module, where the DCI is used for scheduling the PDSCH;

the first RAR scrambling module is configured to scramble, according to the at least one of the level information or the resource information determined by the determining unit, the RAR carried by the PDSCH; and the first RAR sending module is configured to send the RAR that is carried by the PDSCH and that is scrambled by the first RAR scrambling module;

or the sending unit includes a second RAR scrambling module and a second RAR sending module, where the second RAR scrambling module is configured to scramble, according to the at least one of the level information or the resource information determined by the determining unit, the RAR carried by the PDSCH; and the second RAR sending module is configured to send the RAR that is carried by the PDSCH and that is scrambled by the second RAR scrambling module.

With reference to the first possible implementation manner of the third aspect, in a second possible implementation manner of the third aspect, the first RAR scrambling module is specifically configured to:

scramble, according to the at least one of the level information or the resource information, the RAR carried by the PDSCH.

With reference to the first possible implementation manner of the third aspect or the second possible implementation manner of the third aspect, in a third possible implementation manner of the third aspect, that the DCI scrambling module is configured to scramble, according to the at least one of the level information or the resource information determined by the determining unit, CRC of DCI carried by a PDCCH includes:

determining a random access radio network temporary identifier RA-RNTI according to the at least one of the level information or the resource information determined by the determining unit; and determining a scrambling code sequence according to the RA-RNTI, and scrambling, by using the scrambling code sequence, the CRC of the DCI carried by the PDCCH; and that the first/second RAR scrambling module is configured to scramble, according to the at least one of the level information or the resource information, the RAR carried by the PDSCH includes:

determining an RA-RNTI according to the at least one of the level information or the resource information determined by the determining unit; and determining a scrambling code sequence according to the RA-RNTI, and scrambling, by using the scrambling code sequence, the RAR carried by the PDSCH.

With reference to the third possible implementation manner of the third aspect, in a fourth possible implementation manner of the third aspect, when the at least one of the level information or the resource information determined by the determining unit has different values, RA-RNTIs determined according to the at least one of the level information or the resource information are different.

With reference to the third possible implementation manner of the third aspect or the fourth possible implementation manner of the third aspect, in a fifth possible implementation manner of the third aspect, that the DCI scrambling module or the first/second RAR scrambling module determines the RA-RNTI according to the level information determined by the determining unit specifically includes:

determining the RA-RNTI according to the level information and the following first formula, where
the first formula includes:

RA-RNTI=$M+t\_id+10*f\_id$, where

M is determined according to the level information, t_id represents a sequence number of the first subframe in which the PRACH carrying the random access preamble is located and 0?t_id<10, and f_id represents a second PRACH index of the first subframe in which the PRACH carrying the random access preamble is located and 0?f_id<6.

With reference to the fifth possible implementation manner of the third aspect, in a sixth possible implementation manner of the third aspect, time resources included in multiple random access opportunities of random access preambles corresponding to same level information do not overlap.

With reference to the third possible implementation manner of the third aspect or the fourth possible implementation manner of the third aspect, in a seventh possible implementation manner of the third aspect, that the DCI scrambling module or the first/second RAR scrambling module determines the RA-RNTI according to the level information and the resource information that are determined by the determining unit specifically includes:

determining the RA-RNTI according to the level information, the resource information, and the following second formula, where
the second formula includes:

RA-RNTI=$M+tf\_id$, or the second formula includes:

RA-RNTI=$M+t\_id+10*f\_id'$, or the second formula includes:

RA-RNTI=$M+t\_id'+T*f\_id$, or the second formula includes:

RA-RNTI=$M+t\_id'+T*f\_id'$, where

M is determined according to the level information, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the seventh possible implementation manner of the third aspect, in an eighth possible implementation manner of the third aspect, when first level information corresponding to a first random access preamble is different from second level information corresponding to a second random access preamble, some or all values of first resource information corresponding to the first random access preamble and second resource information corresponding to the second random access preamble are the same.

With reference to the fifth possible implementation manner of the third aspect to the eighth possible implementation manner of the third aspect, in a ninth possible implementation manner of the third aspect, that M is determined according to the level information includes:

$M=X*L+Y$, where

L represents the level information, and X and Y are constant positive integers; or that M is determined according to the level information includes:

when the level information is lowest level information corresponding to the random access preamble sent in the enhanced manner, M=61; or when the level information is not lowest level information corresponding to the random access preamble sent in the enhanced manner, M is equal to 1 plus a maximum value of an RA-RNTI determined according to level information that is one piece of level information lower than the level information.

With reference to the third possible implementation manner of the third aspect or the fourth possible implementation manner of the third aspect, in a tenth possible implementation manner of the third aspect, that the DCI scrambling module or the first/second RAR scrambling module determines the RA-RNTI according to the resource information determined by the determining unit specifically includes:

determining the RA-RNTI according to the resource information and the following third formula, where the third formula includes:

RA-RNTI=$N$+tf_id, or the third formula includes:

RA-RNTI=$N$+$t$_id+10*$f$_id', or the third formula includes:

RA-RNTI=$N$+$t$_id'+$T$*$f$_id, or the third formula includes:

RA-RNTI=$N$+$t$_id'+$T$*$f$_id', where

N is a constant positive integer, t_id represents a sequence number of the first subframe in which the PRACH carrying the random access preamble is located and 0≤t_id<10, f_id represents a second PRACH index of the first subframe in which the PRACH carrying the random access preamble is located and 0≤f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the tenth possible implementation manner of the third aspect, in an eleventh possible implementation manner of the third aspect, when first level information corresponding to a first random access preamble is different from second level information corresponding to a second random access preamble, all values of first resource information corresponding to the first random access preamble and second resource information corresponding to the second random access preamble are different.

With reference to the third aspect, in a twelfth possible implementation manner of the third aspect, the sending unit includes a determining module, a DCI sending module, and an RAR sending module, where the determining module is configured to determine a resource of a PDCCH according to the at least one of the level information or the resource information determined by the determining unit, where the resource includes at least one resource of a time resource or a frequency resource;

the DCI sending module is configured to send, on the resource determined by the determining module, DCI carried by the PDCCH, where the DCI is used for scheduling the PDSCH; and the RAR sending module is configured to send the RAR carried by the PDSCH scheduled by using the DCI that is sent by the DCI sending module.

With reference to the twelfth possible implementation manner of the third aspect, in a thirteenth possible implementation manner of the third aspect, when the at least one of the level information or the resource information determined by the determining unit has different values, resources that are of the PDCCH and that are determined by the determining module do not overlap or are different.

With reference to the twelfth possible implementation manner of the third aspect or the thirteenth possible implementation manner of the third aspect, in a fourteenth possible implementation manner of the third aspect, if the resource includes the frequency resource, the determining module is specifically configured to:

determine at least one of a PDCCH aggregation level, a PDCCH search space, or a PDCCH candidate according to the at least one of the level information or the resource information.

With reference to the twelfth possible implementation manner of the third aspect to the fourteenth possible implementation manner of the third aspect, in a fifteenth possible implementation manner of the third aspect, the sending unit further includes a correspondence sending module, where the correspondence sending module is configured to send information about a correspondence between the resource of the PDCCH and the at least one of the level information or the resource information of the random access preamble sent in the enhanced manner, so as to determine the resource of the PDCCH according to the information about the correspondence.

With reference to the third aspect, in a sixteenth possible implementation manner of the third aspect, the sending unit includes a DCI sending module and an RAR sending module, where the DCI sending module is configured to send DCI carried by a PDCCH, where the DCI includes the at least one of the level information or the resource information determined by the determining unit, and the DCI is used for scheduling the PDSCH; and the RAR sending module is configured to send the RAR carried by the PDSCH;

or the sending unit includes an RAR sending module, where the RAR sending module is configured to: send the RAR carried by the PDSCH, and add the at least one of the level information or the resource information determined by the determining unit to the PDSCH.

With reference to the sixteenth possible implementation manner of the third aspect, in a seventeenth possible implementation manner of the third aspect, the adding the at least one of the level information or the resource information determined by the determining unit to the PDSCH includes:

representing, by using a bit in a backoff indication subheader of a Media Access Control MAC protocol data unit PDU carried by the PDSCH that carries the RAR, the at least one of the level information or the resource information determined by the determining unit.

With reference to the third aspect to the seventeenth possible implementation manner of the third aspect, in an eighteenth possible implementation manner of the third aspect, the channel quality characterization parameter includes at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

According to a fourth aspect, a terminal UE is provided, where the UE includes a determining unit, a sending unit, and a receiving unit, where the determining unit is configured to determine a random access preamble to be sent in an enhanced manner, and determine at least one of level information or resource information corresponding to the random access preamble, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6;

the sending unit is configured to send, in the enhanced manner, the random access preamble determined by the determining unit; and the receiving unit is configured to receive a random access response RAR of the random access preamble according to the at least one of the level information or the resource information determined by the determining unit, where the RAR is carried by a physical downlink shared channel PDSCH.

With reference to the fourth aspect, in a first possible implementation manner of the fourth aspect, the receiving unit includes a downlink control information DCI receiving module, a DCI descrambling module, a first RAR receiving module, and a first RAR descrambling module, where the DCI receiving module is configured to receive DCI carried by a physical downlink control channel PDCCH, where the DCI is used for scheduling the PDSCH;

the DCI descrambling module is configured to descramble, according to the at least one of the level information or the resource information determined by the determining unit, cyclic redundancy check CRC of the DCI that is carried by the PDCCH and that is received by the DCI receiving module;

the first RAR receiving module is configured to receive, according to scheduling of the DCI received by the DCI receiving module, the RAR carried by the PDSCH; and the first RAR descrambling module is configured to descramble the RAR that is carried by the PDSCH and that is received by the first RAR receiving module;

or the receiving unit includes a second RAR receiving module and a second RAR descrambling module, where the second RAR receiving module is configured to receive the RAR carried by the PDSCH; and the second RAR descrambling module is configured to descramble, according to the at least one of the level information or the resource information determined by the determining unit, the RAR that is carried by the PDSCH and that is received by the second RAR receiving module.

With reference to the first possible implementation manner of the fourth aspect, in a second possible implementation manner of the fourth aspect, the first RAR descrambling module is specifically configured to:

descramble, according to the at least one of the level information or the resource information determined by the determining unit, the RAR that is carried by the PDSCH and that is received by the RAR receiving module.

With reference to the first possible implementation manner of the fourth aspect or the second possible implementation manner of the fourth aspect, in a third possible implementation manner of the fourth aspect, that the first/second RAR descrambling module is configured to descramble, according to the at least one of the level information or the resource information determined by the determining unit, the RAR that is carried by the PDSCH and that is received by the first/second RAR receiving module includes:

determining a random access radio network temporary identifier RA-RNTI according to the at least one of the level information or the resource information determined by the determining unit; and determining a scrambling code sequence according to the RA-RNTI, and descrambling, by using the scrambling code sequence, the RAR carried by the PDSCH; and that the DCI descrambling module is configured to descramble, according to the at least one of the level information or the resource information determined by the determining unit, CRC of the DCI that is carried by the PDCCH and that is received by the DCI receiving module includes:

determining an RA-RNTI according to the at least one of the level information or the resource information determined by the determining unit; and determining a scrambling code sequence according to the RA-RNTI, and descrambling, by using the scrambling code sequence, the CRC of the received DCI carried by the PDCCH.

With reference to the third possible implementation manner of the fourth aspect, in a fourth possible implementation manner of the fourth aspect, when the at least one of the level information or the resource information determined by the determining unit has different values, RA-RNTIs determined according to the at least one of the level information or the resource information are different.

With reference to the third possible implementation manner of the fourth aspect or the fourth possible implementation manner of the fourth aspect, in a fifth possible implementation manner of the fourth aspect, that the first/second RAR descrambling module or the DCI descrambling module determines the RA-RNTI according to the level information determined by the determining unit specifically includes:

determining the RA-RNTI according to the level information and the following first formula, where the first formula includes:

RA-RNTI=$M+t\_id+10*f\_id$, where

M is determined according to the level information, $t\_id$ represents a sequence number of the first subframe in which the PRACH carrying the random access preamble is located and $0 \le t\_id < 10$, and $f\_id$ represents a second PRACH index of the first subframe in which the PRACH carrying the random access preamble is located and $0 \le f\_id < 6$.

With reference to the fifth possible implementation manner of the fourth aspect, in a sixth possible implementation manner of the fourth aspect, time resources included in multiple random access opportunities of random access preambles corresponding to same level information do not overlap.

With reference to the third possible implementation manner of the fourth aspect or the fourth possible implementation manner of the fourth aspect, in a seventh possible implementation manner of the fourth aspect, that the first/second RAR descrambling module or the DCI descrambling module determines the RA-RNTI according to the level information and the resource information that are determined by the determining unit specifically includes:

determining the RA-RNTI according to the level information, the resource information, and the following second formula, where the second formula includes:

RA-RNTI=$M$+tf_id, or the second formula includes:

RA-RNTI=$M$+t_id+10*$f$_id', or the second formula includes:

RA-RNTI=$M$+t_id'+$T$*$f$_id, or the second formula includes:

RA-RNTI=$M$+t_id'+$T$*$f$_id', where

M is determined according to the level information, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the seventh possible implementation manner of the fourth aspect, in an eighth possible implementation manner of the fourth aspect, when first level information corresponding to a first random access preamble is different from second level information corresponding to a second random access preamble, some or all values of first resource information corresponding to the first random access preamble and second resource information corresponding to the second random access preamble are the same.

With reference to the fifth possible implementation manner of the fourth aspect to the eighth possible implementation manner of the fourth aspect, in a ninth possible implementation manner of the fourth aspect, that M is determined according to the level information includes:

M=X*L+Y, where L represents the level information, and X and Y are constant positive integers; or that M is determined according to the level information includes:

when the level information is lowest level information corresponding to the random access preamble sent in the enhanced manner, M=61; or when the level information is not lowest level information corresponding to the random access preamble sent in the enhanced manner, M is equal to 1 plus a maximum value of an RA-RNTI determined according to level information that is one piece of level information lower than the level information.

With reference to the third possible implementation manner of the fourth aspect or the fourth possible implementation manner of the fourth aspect, in a tenth possible implementation manner of the fourth aspect, that the first/second RAR descrambling module or the DCI descrambling module determines the RA-RNTI according to the resource information determined by the determining unit specifically includes:

determining the RA-RNTI according to the resource information and the following third formula, where the third formula includes:

RA-RNTI=$N$+tf_id, or the third formula includes:

RA-RNTI=$N$+t_id+10*$f$_id', or the third formula includes:

RA-RNTI=$N$+t_id'+$T$*$f$_id, or the third formula includes:

RA-RNTI=$N$+t_id'+$T$*$f$_id', where

N is a constant positive integer, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

With reference to the tenth possible implementation manner of the fourth aspect, in an eleventh possible implementation manner of the fourth aspect, when first level information corresponding to a first random access preamble is different from second level information corresponding to a second random access preamble, all values of first resource information corresponding to the first random access preamble and second resource information corresponding to the second random access preamble are different.

With reference to the fourth aspect, in a twelfth possible implementation manner of the fourth aspect, the receiving unit includes a determining module, a DCI receiving module, and an RAR receiving module, where the determining module is configured to determine a resource of a PDCCH according to the at least one of the level information or the resource information determined by the determining unit, where the resource includes at least one resource of a time resource or a frequency resource;

the DCI receiving module is configured to receive, on the resource determined by the determining unit, DCI carried by the PDCCH, where the DCI is used for scheduling the PDSCH; and the RAR receiving module is configured to receive, according to scheduling of the DCI received by the DCI receiving module, the RAR carried by the PDSCH.

With reference to the twelfth possible implementation manner of the fourth aspect, in a thirteenth possible implementation manner of the fourth aspect, when the at least one of the level information or the resource information determined by the determining unit has different values, resources that are of the PDCCH and that are determined by the determining module do not overlap or are different.

With reference to the twelfth possible implementation manner of the fourth aspect or the thirteenth possible implementation manner of the fourth aspect, in a fourteenth possible implementation manner of the fourth aspect, if the resource includes the frequency resource, the determining module is specifically configured to:

determine at least one of a PDCCH aggregation level, a PDCCH search space, or a PDCCH candidate according to the at least one of the level information or the resource information determined by the determining unit.

With reference to the twelfth possible implementation manner of the fourth aspect to the fourteenth possible implementation manner of the fourth aspect, in a fifteenth possible implementation manner of the fourth aspect, the determining module is specifically configured to:

determine the resource of the PDCCH according to the at least one of the level information or the resource information determined by the determining unit and a pre-configured correspondence between the resource of the PDCCH and the at least one of the level information or the resource information of the random access preamble sent in the enhanced manner;

or the receiving unit further includes a correspondence receiving module, where the correspondence receiving module is configured to: before the determining module determines the resource of the PDCCH according to the at least one of the level information or the resource information determined by the determining unit, receive information about a correspondence between the resource of the PDCCH and the at least one of the level information or the resource information of the random access preamble sent in the enhanced manner, where the determining module is further configured to:

determine the resource of the PDCCH according to the at least one of the level information or the resource information determined by the determining unit and the information about the correspondence received by the correspondence receiving module.

With reference to the fourth aspect, in a sixteenth possible implementation manner of the fourth aspect, the receiving unit includes a DCI receiving module, a DCI judging module, and an RAR receiving module, where the DCI receiving module is configured to receive DCI carried by a PDCCH, where the DCI includes the at least one of the level information or the resource information, and the DCI is used for scheduling the PDSCH;

the DCI judging module is configured to determine whether the at least one of the level information or the resource information included in the DCI received by the DCI receiving module is the same as the at least one of the level information or the resource information corresponding to the random access preamble; and the RAR receiving module is configured to: when the DCI judging module determines that the at least one of the level information or the resource information included in the DCI received by the DCI receiving module is the same as the at least one of the level information or the resource information corresponding to the random access preamble, receive the RAR carried by the PDSCH;

or the receiving unit includes an information receiving module, an information determining module, an information judging module, and an RAR acquiring module, where the information receiving module is configured to receive information carried by the PDSCH, where the information carried by the PDSCH includes the RAR and the at least one of the level information or the resource information;

the information determining module is configured to determine the at least one of the level information or the resource information included in the information that is carried by the PDSCH and that is received by the information receiving module;

the information judging module is configured to determine whether the at least one of the level information or the resource information that is included in the information carried by the PDSCH and that is determined by the information determining module is the same as the at least one of the level information or the resource information corresponding to the random access preamble; and the RAR acquiring module is configured to: when the information judging module determines that the at least one of the level information or the resource information that is included in the information carried by the PDSCH and that is determined by the information determining module is the same as the at least one of the level information or the resource information corresponding to the random access preamble, obtain the RAR carried by the PDSCH.

With reference to the sixteenth possible implementation manner of the fourth aspect, in a seventeenth possible implementation manner of the fourth aspect, the information determining module is specifically configured to:

determine, according to a bit in a backoff indication subheader of a Media Access Control MAC protocol data unit PDU carried by the PDSCH, the at least one of the level information or the resource information included in the information that is carried by the PDSCH and that is received by the information receiving module.

With reference to the fourth aspect to the seventeenth possible implementation manner of the fourth aspect, in an eighteenth possible implementation manner of the fourth aspect, the channel quality characterization parameter includes at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

The embodiments of the present invention provide a random access response method, a base station, and a terminal, where the method includes: receiving, by the base station, a random access preamble sent in an enhanced manner; determining at least one of level information or resource information corresponding to the random access preamble sent in the enhanced manner, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; and sending a random access response RAR of the random access preamble according to the at least one of the level information or the resource information, where the RAR is carried by a physical downlink shared channel PDSCH. Based on the foregoing solutions provided in the embodiments of the present invention, after receiving the random access preamble sent in the enhanced manner, the base station further determines the at least one of the level information or the resource information corresponding to the random access preamble, so as to send, according to the at least one of the level information or the resource information, the RAR corresponding to the random access preamble. Therefore, the following problem is avoided so that power waste of a UE is reduced: When the base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a schematic flowchart of another random access response method according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
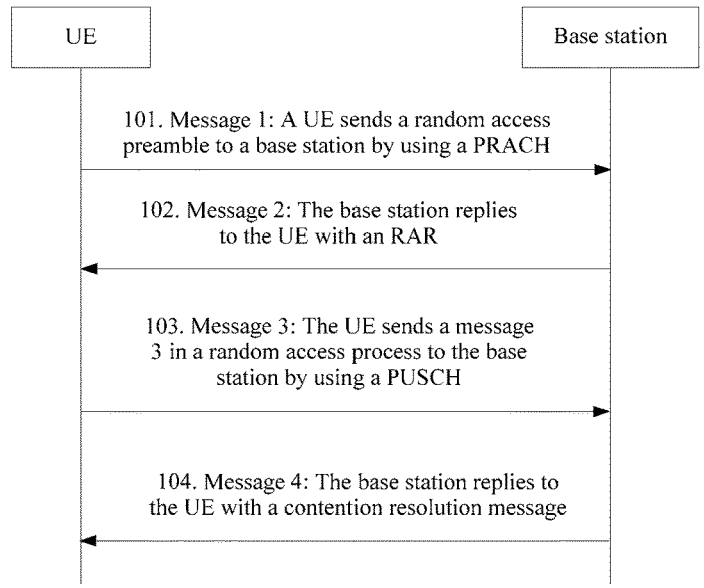
FIG. 1 is a schematic flowchart of a random access procedure in an LTE or LTE-A system according to the prior art.

FIG. 1 is a schematic flowchart of a random access procedure in an LTE or LTE-A system according to the prior art. The random access procedure specifically includes the following steps:

101. Message 1: A UE sends a random access preamble to a base station by using a PRACH.

The random access preamble is one of multiple preamble formats, and each preamble format includes two parts: a cyclic prefix and a sequence. The PRACH occupies 1.08 MHZ in a frequency domain, that is, six physical resource blocks (PRB).

The UE sends the random access preamble on a predefined time resource and frequency resource. There are a total of 64 random access preambles in one cell. Among the 64 random access preambles, some dedicated random access preambles are reserved for non-contention based random access, and remaining random access preambles are used for contention-based random access.

For the contention-based random access, the UE randomly selects a random access preamble from a set of contention-based random access preambles and sends the random access preamble. Therefore, there is a possibility that multiple UEs simultaneously select a same random access preamble, which requires a subsequent contention solution. For the non-contention based random access, the base station configures a dedicated random access preamble by using dedicated signaling, and the UE performs random access by using the dedicated random access preamble.

102. Message 2: The base station replies to the UE with an RAR.

After sending the random access preamble, the UE detects a PDCCH in each subframe within a random access response window. DCI carried by the PDCCH is used for scheduling a PDSCH, and the RAR is carried by the PDSCH. To identify that the RAR carried by the PDSCH scheduled by using the DCI that is carried by the PDCCH is a reply for a random access preamble sent on which time resource and frequency resource, the base station calculates a scrambling code sequence by using an RA-RNTI, and scrambles the PDCCH, where the scrambling the PDCCH refers to scrambling cyclic redundancy check (CRC) of the DCI carried by the PDCCH, and the RA-RNTI is obtained by the base station with reference to a formula (1) according to the PRACH carrying the detected random access preamble:

$$\text{RA-RNTI} = i + t\_id + 10 * f\_id \quad \text{formula (1)}$$

where t_id represents a sequence number of the first subframe in which the PRACH carrying the random access preamble detected by the base station is located and 0?t_id<10, and f_id represents a second PRACH index of the first subframe in which the PRACH carrying the random access preamble is located and 0?f_id<6. It can be learned from the formula (1) that, if different UEs send random access preambles by using a same time resource and frequency resource, RA-RNTIs are the same, and corresponding PDSCHs carrying RARs are scheduled by using DCI of a same PDCCH, where the RARs are transmitted on a same PDSCH.

The UE obtains an RA-RNTI with reference to the formula (1) according to the PRACH carrying the random access preamble sent by the UE. After detecting a PDCCH scrambled by using a scrambling code sequence obtained by calculation by using the RA-RNTI, the UE continues to detect a PDSCH scheduled by using DCI carried by the PDCCH, and the UE searches a MAC header part of a MAC protocol data unit (PDU) carried by the PDSCH for a MAC subheader including a random access preamble index (RAPID) of the random access preamble selected by the UE, where the RAPID is used to indicate the random access preamble detected by the base station, and includes six bits, which are used to indicate 64 preambles. If the MAC subheader is included, it indicates that the MAC PDU includes an RAR with respect to the UE. If the UE does not receive the RAR with respect to the UE within the random access response window, the UE retransmits the random access preamble, and when a particular quantity of retransmissions is reached, random access fails. The RAR further includes information such as a timing alignment instruction, an initial uplink resource (UL grant) allowed to be transmitted for a message 3, and a temporary cell radio network temporary identifier (C-RNTI).

103. Message 3: The UE sends a message 3 in a random access procedure to the base station by using a physical uplink shared channel (PUSCH).

After successfully receiving the RAR for the UE within the random access response window, the UE transmits, in a determined subframe after receiving the RAR, the message 3, such as a radio resource control (RRC) connection request, a tracking area update request, or a scheduling request, in the random access procedure to the base station by using the PUSCH. The message 3 is scrambled according to the temporary C-RNTI included in the RAR, and includes a UE identity in a local cell, where the UE identity is used for contention resolution.

As described in step 101, in a contention-based random access procedure, there is a case in which multiple UEs simultaneously send a same preamble. In this case, different UEs receive a same RAR, obtain a same temporary C-RNTI, and consequently send the message 3 on a same time resource and frequency resource according to the same temporary C-RNTI, which causes a transmission collision of the message 3. If the base station cannot successfully decode the message 3, the UE needs to retransmit the message 3, and when a maximum quantity of retransmissions is reached, the UE starts a new random access procedure. If the base station can successfully decode the message 3, step 104 is performed.

104. Message 4: The base station replies to the UE with a contention resolution message.

If the UE receives a contention resolution message that is scrambled according to the UE identity in the local cell or that includes the UE identity in the local cell, random access is considered successful; otherwise, when a timer expires, current random access is considered failed.

As described in the background, when the LTE or LTE-A system supports an MTC service, network coverage of LTE or LTE-A needs to be enhanced. For example, coverage enhancement of additional 20 dB or 15 dB is performed on the basis of existing network coverage of LTE or LTE-A, so as to ensure that a UE that is located in a basement or whose channel quality is poor can reliably communicate with the base station. When coverage enhancement is performed for an LTE or LTE-A network, information on the LTE or LTE-A network needs to be sent in an enhanced manner.

In the prior art, a method for sending, in an enhanced manner, a random access preamble carried by a PRACH is repeatedly sending the random access preamble. In the method, there are multiple PRACH repetition levels for repetition of the random access preamble, for example, three PRACH repetition levels, where the repetition levels are separately 1, 2, and 3, and preamble repetition counts included in different PRACH repetition levels may be the same or different. For each PRACH repetition level, a system pre-configures a PRACH resource set or a UE is notified of a PRACH resource set by using signaling, where the PRACH resource set includes one or more PRACH resources, and each PRACH resource includes a code resource (random access preamble), a time resource, and a frequency resource that are used for sending the random access preamble. When sending the random access preamble in the enhanced manner, the UE uses a PRACH repetition level, and repeatedly sends, according to a preamble repetition count included in the repetition level, the random access preamble on a PRACH resource included in a PRACH resource set.

Because different PRACH resource sets are used for random access preambles at different PRACH repetition levels, at least one of three manners, that is, code division multiplexing (CDM), TDM, and FDM, can be used for resource multiplexing. In a CDM manner, PRACH resource sets used for different PRACH repetition levels include different code resources. In a TDM manner, PRACH resource sets used for different PRACH repetition levels include different time resources. In an FDM manner, PRACH resource sets used for different PRACH repetition levels include different frequency resources.

The base station detects the random access preamble sent by the UE in the enhanced manner, and sends, according to the detected random access preamble, DCI carried by a PDCCH and an RAR carried by a PDSCH scheduled by using the DCI. The PDCCH and the PDSCH are also sent in the enhanced manner of repeatedly sending and by using different repetition counts, and there are multiple PDCCH repetition levels and PDSCH repetition levels. The PDCCH repetition level and the PDSCH repetition level have a correspondence with the PRACH resource set. According to a PRACH resource set in which a PRACH resource used for the detected random access preamble is located, the base station repeatedly sends the PDCCH and the PDSCH by using a PDCCH repetition level and a PDSCH repetition level that are corresponding to the PRACH resource set.

However, during sending and receiving, by using the multiple PDCCH repetition levels and PDSCH repetition levels, of the DCI carried by the PDCCH and the RAR carried by the PDSCH scheduled by using the DCI, an RA-RNTI calculation manner described in the formula (1) has the following problems:

In a case of CDM, although different random access preambles are used for different PRACH repetition levels, sequence numbers of the first subframes in which PRACHs carrying random access preambles are located may be the same, that is, t_id is the same, and second PRACH indexes of the first subframes in which the PRACHs carrying the random access preambles are located may also be the same, that is, f_id is the same. Therefore, during scrambling on PDCCHs at different repetition levels, a same RA-RNTI may be used to calculate scrambling code sequences, and the PDCCHs at different repetition levels may be sent and received in a same subframe.

In a case of TDM, although different time resources are used for different PRACH repetition levels, sequence numbers of the first subframes in which PRACHs carrying random access preambles are located may be the same, that is, t_id is the same, and second PRACH indexes of the first subframes in which the PRACHs carrying the random access preambles are located may also be the same, that is, f_id is the same. Therefore, during scrambling on PDCCHs at different repetition levels, a same RA-RNTI may be used to calculate scrambling code sequences, and the PDCCHs at different repetition levels may be sent and received in a same subframe.

In a case of FDM, although different frequency resources are used for different PRACH repetition levels, sequence numbers of the first subframes in which PRACHs carrying random access preambles are located may be the same, that is, t_id is the same. In addition, during existing RA-RNTI calculation, 0?f_id<6. When a quantity of PRACH frequency resources of the first subframes in which the PRACHs carrying the random access preambles are located is greater than 6, an existing second PRACH index f_id cannot be used to distinguish frequency resources used for the PRACH repetition levels. Therefore, during scrambling on PDCCHs at different repetition levels, a same RA-RNTI may be used to calculate scrambling code sequences, and the PDCCHs at different repetition levels may be sent and received in a same subframe.

Embodiment 1

Figure 2:
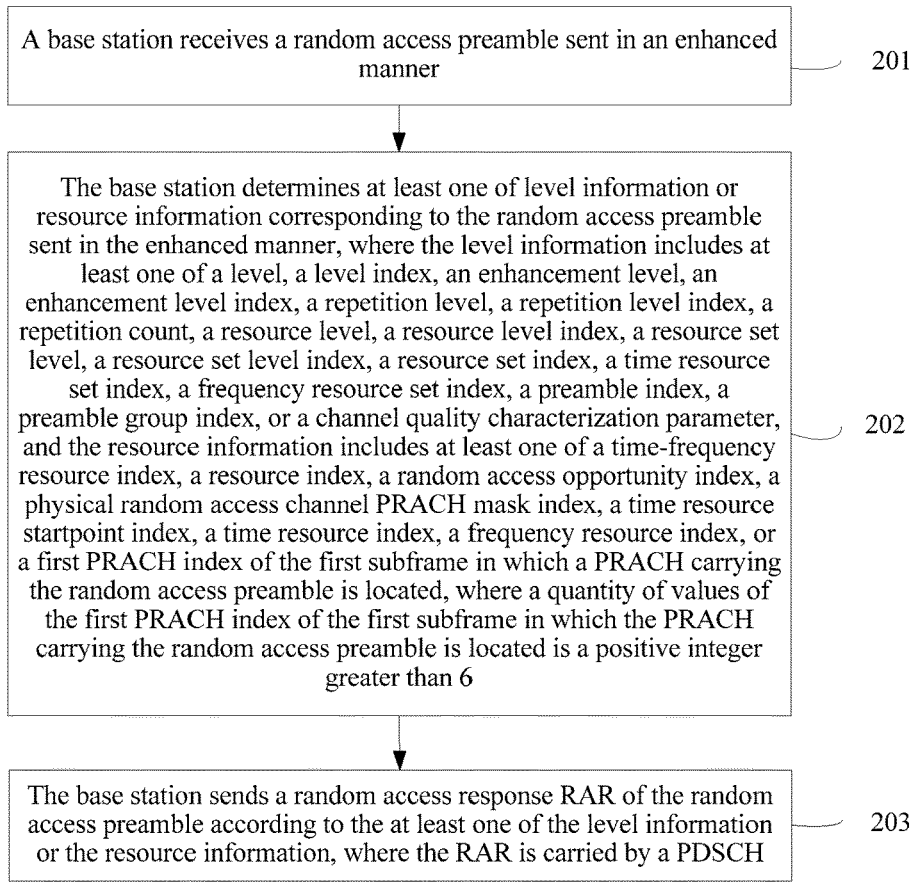
FIG. 2 is a schematic flowchart of a random access response method according to an embodiment of the present invention.

This embodiment of the present invention provides a random access response method. The method is applied to a base station in an LTE or LTE-A system, and specifically, as shown in FIG. 2, includes the following steps:

201. The base station receives a random access preamble sent in an enhanced manner.

Specifically, as shown in FIG. 1, in a random access procedure in the LTE or LTE-A system, a UE sends the random access preamble to the base station in the enhanced manner by using a PRACH, and in this case, the base station receives the random access preamble sent in the enhanced manner.

202. The base station determines at least one of level information or resource information corresponding to the random access preamble sent in the enhanced manner.

The level information includes at least one of a level, a level index, an enhancement level, an enhancement level index, a repetition level, a repetition level index, a repetition count, a resource set, a resource level, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, the foregoing level information may reflect a channel quality status between a UE and the base station. Level information corresponding to the random access preamble detected by the base station varies with the channel quality status between the UE and the base station.

Exemplarily, there may be multiple PRACH repetition levels for repetition of the random access preamble, for example, PRACH repetition levels 1, 2, and 3. A repetition level corresponding to the random access preamble detected by the base station varies with the channel quality status between the UE and the base station. Each PRACH repetition level includes one or more repetition counts. If the UE determines a repetition level, the UE repeatedly sends the random access preamble according to a repetition count included in the repetition level. Index numbering may be performed on the multiple repetition levels to obtain repetition level indexes. For example, for the foregoing three repetition levels, repetition level indexes are 0, 1, and 2. Another manner may be that there are multiple levels or multiple enhancement levels for PRACH enhanced sending, where index numbering is performed on the multiple levels to obtain level indexes, and index numbering is performed on the multiple enhancement levels to obtain enhancement level indexes. Therefore, the level information corresponding to the random access preamble sent in the enhanced manner may be at least one of the level, the level index, the enhancement level, the enhancement level index, the repetition level, the repetition level index, or the repetition count.

Exemplarily, for a repetition level corresponding to each random access preamble sent in the enhanced manner, the system may pre-configure a resource set used for sending the random access preamble in the enhanced manner or the UE is notified, by using signaling, of a resource set used for sending the random access preamble in the enhanced manner. For different repetition levels, resource sets used for sending random access preambles in the enhanced manner are different. The resource set includes one or more resources used for sending the random access preamble in the enhanced manner. The resource includes a code resource (random access preamble), a time resource, and a frequency resource that are used for sending the random access preamble in the enhanced manner. When sending the random access preamble in the enhanced manner, the UE repeatedly sends the random access preamble according to a repetition count at a repetition level and on a resource included in a resource set used for sending the random access preamble in the enhanced manner. The resource set used for sending the random access preamble in the enhanced manner may be referred to as a resource set level, and one or more resources included in a resource set may be collectively referred to as a resource level. Index numbering is separately performed on the resource set, the resource set level, and the resource level to obtain a resource set index, a resource set level index, and a resource level index. Therefore, the level information corresponding to the random access preamble sent in the enhanced manner may further be at least one of the resource level, the resource level index, the resource set level, the resource set level index, or the resource set index.

Exemplarily, when time resource sets used for sending random access preambles at different repetition levels in the enhanced manner are different, the level information corresponding to the random access preamble sent in the enhanced manner may be the time resource set index. When frequency resource sets used for sending random access preambles at different repetition levels in the enhanced manner are different, the level information corresponding to the random access preamble sent in the enhanced manner may be the frequency resource set index. In addition, random access preambles may further be grouped into multiple preamble groups. In this case, the level information corresponding to the random access preamble sent in the enhanced manner may be the preamble group index, that is, the preamble group index is used to indicate a preamble group, and random access preambles in different preamble groups are used for different PRACH repetition levels; alternatively, the level information corresponding to the random access preamble sent in the enhanced manner may be the preamble index.

Exemplarily, the level information corresponding to the random access preamble sent in the enhanced manner may further be the channel quality characterization parameter. In the system or on a network, a coverage enhancement value, a path loss, a reference signal received power (RSRP), a reference signal received quality (RSRQ), and a channel quality indicator (CQI) that are between the UE and the base station may be divided into multiple ranges in advance, and a range index is used for representation. The channel quality characterization parameter may include at least one of the following parameters: the coverage enhancement value, a coverage enhancement range index, the path loss, a path loss range index, the RSRP, an RSRP range index, the RSRQ, an RSRQ range index, the CQI, or a CQI range index.

It should be noted that the coverage enhancement value may be a value of coverage enhancement required by a channel (coverage restricted channel or bottlenecked channel) having smallest coverage, or may be a value of coverage enhancement required by a channel, such as a value of coverage enhancement required by a PRACH. The coverage enhancement range index is used to indicate a range within which the coverage enhancement value falls, or may be used to indicate whether information carried by one or more channels needs to be sent in the enhanced manner. For example, when the information does not need to be sent in the enhanced manner, the coverage enhancement range index is 0; when the information needs to be sent in the enhanced manner, the coverage enhancement range index is 1. Certainly, the channel quality characterization parameter may further include another parameter, which is not specifically limited in this embodiment of the present invention.

It should be noted that the foregoing level information is merely some possible level information corresponding to the random access preamble. Certainly, the random access preamble may also be corresponding to other level information, which is not specifically limited in this embodiment of the present invention.

Specifically, the foregoing resource information may reflect at least one of a time resource or a frequency resource used for sending the random access preamble in the enhanced manner.

Exemplarily, the time resource and the frequency resource that are used for sending the random access preamble in the enhanced manner may be collectively referred to as a time-frequency resource. In one random access procedure, the UE sends a random access preamble in the enhanced manner on one random access opportunity. One random access opportunity includes a time-frequency resource used for sending the random access preamble in the enhanced manner in one random access procedure.

Figure 23:
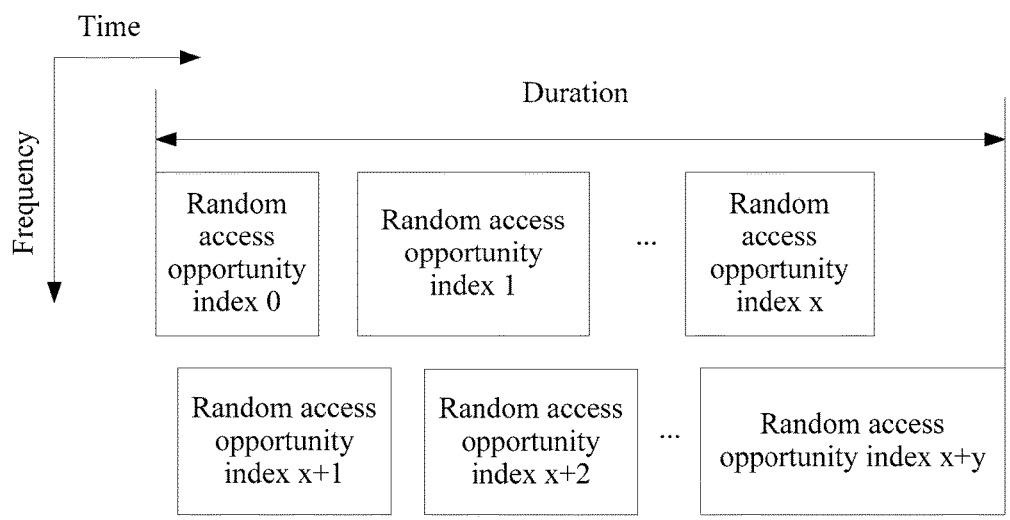
FIG. 23 is a schematic diagram of a random access opportunity index according to an embodiment of the present invention.

Within predefined duration, random access opportunities are numbered first in ascending order of time and then in ascending order of frequencies to obtain random access opportunity indexes. That is, one random access opportunity index indicates a time-frequency resource used for sending a random access preamble in the enhanced manner in one random access procedure. A schematic diagram of a random access opportunity index is shown in FIG. 23. In other words, the random access opportunity index may also be referred to as the time-frequency index, the resource index, or the PRACH mask index. It should be noted that the random access opportunity indexes may also be obtained by numbering the random access opportunities first in ascending order of frequencies and then in ascending order of time, which is not limited in the present invention.

Within predefined duration, startpoints of time resources included in random access opportunities are numbered in ascending order of time to obtain time resource startpoint indexes, which, in other words, may also be referred to as time resource indexes.

Frequency resources included in random access opportunities in one subframe are numbered in ascending order of start frequencies of the frequency resources to obtain frequency resource indexes, which, in other words, may also be referred to as the first PRACH index of the first subframe in which the PRACH carrying the random access preamble is located.

It should be noted that in the prior art, a maximum of six random access opportunities exist in one subframe, that is, the random access opportunities in one subframe include a maximum of six PRACH frequency resources. Therefore, in the formula (1), a quantity of values of a second PRACH index of the first subframe in which the PRACH carrying the random access preamble is located is a positive integer greater than or equal to 0 and less than 6. In this embodiment of the present invention, the frequency resource index and the first index are physical quantities different from the second index in the foregoing formula (1). The first index is a PRACH index of the first subframe in which the physical random access channel PRACH carrying the random access preamble is located. However, to avoid a case in which when there are more than six PRACH frequency resources in one subframe, the existing second index cannot be used to distinguish frequency resources used by random access preambles corresponding to all level information, in this embodiment of the present invention, the quantity of PRACH indexes of the first subframe in which the physical random access channel PRACH carrying the random access preamble is located is a positive integer greater than 6, that is, a quantity of first indexes is a positive integer greater than 6, and a quantity of frequency resource indexes is a positive integer greater than 6.

Specifically, after receiving the random access preamble sent in the enhanced manner, the base station may determine, according to at least one of the received random access preamble, or a time resource or a frequency resource on which the random access preamble is located, the at least one of the level information or the resource information corresponding to the random access preamble. Certainly, the base station may further store a first correspondence between a random access preamble and level information.

After receiving the random access preamble, the base station may determine, according to the first correspondence, the level information corresponding to the random access preamble, which is not specifically limited in this embodiment of the present invention.

203. The base station sends a random access response RAR of the random access preamble according to the at least one of the level information or the resource information, where the RAR is carried by a PDSCH.

Specifically, in this embodiment of the present invention, after determining the at least one of the level information or the resource information corresponding to the random access preamble sent in the enhanced manner, the base station sends the random access response RAR of the random access preamble, where the RAR is carried by the PDSCH, which can be specifically implemented in the following manners:

In a possible implementation manner, the sending, by the base station, a random access response RAR of the random access preamble according to the at least one of the level information or the resource information, where the RAR is carried by a PDSCH may specifically include:

scrambling, according to the at least one of the level information or the resource information, CRC of DCI carried by a PDCCH;

sending the scrambled DCI carried by the PDCCH, where the DCI is used for scheduling the PDSCH;

scrambling the RAR carried by the PDSCH; and sending the scrambled RAR carried by the PDSCH.

In this implementation manner, the scrambling the RAR carried by the PDSCH may be specifically implemented with reference to the formula (1) in an existing manner of scrambling the RAR carried by the PDSCH, that is, determining an RA-RNTI in a manner described in the formula (1); determining a scrambling code sequence according to the RA-RNTI; and scrambling, by using the scrambling code sequence, the RAR carried by the PDSCH. Alternatively, the received RAR carried by the PDSCH may be scrambled according to the at least one of the level information or the resource information, which is not specifically limited in this embodiment of the present invention.

In a possible implementation manner, the sending, by the base station, a random access response RAR of the random access preamble according to the at least one of the level information or the resource information, where the RAR is carried by a PDSCH may specifically include:

scrambling, according to the at least one of the level information or the resource information, the RAR carried by the PDSCH; and sending the scrambled RAR carried by the PDSCH.

In a possible implementation manner, the sending, by the base station, a random access response RAR of the random access preamble according to the at least one of the level information or the resource information, where the RAR is carried by a PDSCH may specifically include:

determining a resource of a PDCCH according to the at least one of the level information or the resource information, where the resource includes at least one resource of a time resource or a frequency resource;

sending, on the resource, DCI carried by the PDCCH, where the DCI is used for scheduling the PDSCH; and sending the RAR carried by the PDSCH.

In a possible implementation manner, the sending, by the base station, a random access response RAR of the random access preamble according to the at least one of the level information or the resource information, where the RAR is carried by a PDSCH may specifically include:

sending DCI carried by a PDCCH, where the DCI includes the at least one of the level information or the resource information, and the DCI is used for scheduling the PDSCH; and sending the RAR carried by the PDSCH.

In a possible implementation manner, the sending, by the base station, a random access response RAR of the random access preamble according to the at least one of the level information or the resource information, where the RAR is carried by a PDSCH may specifically include:

sending the RAR carried by the PDSCH, and adding the at least one of the level information or the resource information to the PDSCH.

Specific implementation procedures of these possible implementation manners are described in detail in Embodiment 3, and details are not described herein.

It should be noted that the sending, by the base station, an RAR of the random access preamble according to the at least one of the level information or the resource information, where the RAR is carried by a PDSCH may further have another possible implementation manner, which is not specifically limited in this embodiment of the present invention.

The random access response method provided in this embodiment of the present invention includes: receiving, by a base station, a random access preamble sent in an enhanced manner; determining at least one of level information or resource information corresponding to the random access preamble sent in the enhanced manner, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; and sending a random access response RAR of the random access preamble according to the at least one of the level information or the resource information, where the RAR is carried by a physical downlink shared channel PDSCH. Based on the foregoing solutions provided in this embodiment of the present invention, after receiving the random access preamble sent in the enhanced manner, the base station further determines the at least one of the level information or the resource information corresponding to the random access preamble, so as to send, according to the at least one of the level information or the resource information, the RAR corresponding to the random access preamble. Therefore, the following problem is avoided so that power waste of a UE is reduced: When the base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

Embodiment 2

This embodiment of the present invention provides a random access response method. The method is applied to a UE in an LTE or LTE-A system, and specifically, as shown in FIG. 3, includes the following steps:

301. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, as shown in FIG. 1, in a random access procedure in the LTE or LTE-A system, the UE sends the random access preamble to a base station in the enhanced manner by using the PRACH. In this embodiment of the present invention, before sending the random access preamble to the base station in the enhanced manner by using the PRACH, the UE first determines the random access preamble, and determines the at least one of the level information or the resource information corresponding to the random access preamble.

The UE may store a first correspondence between a random access preamble and level information in advance. When determining the random access preamble, the UE determines, according to the first correspondence, the level information corresponding to the random access preamble, which is not specifically limited in this embodiment of the present invention.

In addition, when determining at least one of a time resource or a frequency resource for sending the random access preamble in the enhanced manner, the UE also determines the resource information corresponding to the random access preamble, which is not specifically limited in this embodiment of the present invention.

It should be noted that a sequence in which the UE determines the random access preamble and determines the at least one of the level information or the resource information corresponding to the random access preamble is not specifically limited in this embodiment of the present invention.

For related descriptions about the at least one of the level information or the resource information and the channel quality characterization parameter, reference may be made to descriptions in step 201 in Embodiment 1, and details are not described herein in this embodiment of the present invention.

For a difference between the first PRACH index of the first subframe in which the PRACH carrying the random access preamble is located and a second PRACH index, in a formula (1), of the first subframe in which the PRACH carrying the random access preamble is located, reference may be made to descriptions in step 201 in Embodiment 1, and details are not described herein in this embodiment of the present invention.

302. The UE sends the random access preamble in the enhanced manner.

Specifically, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

303. The UE receives an RAR of the random access preamble according to the at least one of the level information or the resource information, where the RAR is carried by a PDSCH.

Specifically, in this embodiment of the present invention, after sending the random access preamble in the enhanced manner, the UE further receives the RAR of the random access preamble according to the at least one of the level information or the resource information, where the RAR is carried by the PDSCH, which can be specifically implemented in the following manners:

In a possible implementation manner, the receiving, by the UE, an RAR of the random access preamble according to the at least one of the level information or the resource information, where the RAR is carried by a PDSCH may specifically include:

receiving the RAR carried by the PDSCH; and descrambling, according to the at least one of the level information or the resource information, the received RAR carried by the PDSCH.

In a possible implementation manner, the receiving, by the UE, an RAR of the random access preamble according to the at least one of the level information or the resource information, where the RAR is carried by a PDSCH may specifically include:

receiving DCI carried by a PDCCH, where the DCI is used for scheduling the PDSCH;

descrambling, according to the at least one of the level information or the resource information, CRC of the received DCI carried by the PDCCH;

receiving, according to scheduling of the DCI, the RAR carried by the PDSCH; and descrambling the received RAR carried by the PDSCH.

In this implementation manner, the descrambling the RAR carried by the PDSCH may be specifically implemented with reference to the formula (i) in an existing manner of descrambling the RAR carried by the PDSCH, that is, determining an RA-RNTI in a manner described in the formula (1); determining a scrambling code sequence according to the RA-RNTI; and descrambling, by using the scrambling code sequence, the RAR carried by the PDSCH. Alternatively, the received RAR carried by the PDSCH may be descrambled according to the at least one of the level information or the resource information, which is not specifically limited in this embodiment of the present invention.

In a possible implementation manner, the receiving, by the UE, an RAR of the random access preamble according to the at least one of the level information or the resource information, where the RAR is carried by a PDSCH may specifically include:

determining a resource of a PDCCH according to the at least one of the level information or the resource information, where the resource includes at least one resource of a time resource or a frequency resource;

receiving, on the resource, DCI carried by the PDCCH, where the DCI is used for scheduling the PDSCH; and receiving, according to scheduling of the DCI, the RAR carried by the PDSCH.

In a possible implementation manner, the receiving, by the UE, an RAR of the random access preamble according to the at least one of the level information or the resource information, where the RAR is carried by a PDSCH may specifically include:

receiving DCI carried by a PDCCH, where the DCI includes the at least one of the level information or the resource information, and the DCI is used for scheduling the PDSCH;

determining whether the at least one of the level information or the resource information included in the received DCI is the same as the at least one of the level information or the resource information corresponding to the random access preamble; and when the at least one of the level information or the resource information included in the received DCI is the same as the at least one of the level information or the resource information corresponding to the random access preamble, receiving the RAR carried by the PDSCH scheduled by using the DCI.

In a possible implementation manner, the receiving, by the UE, an RAR of the random access preamble according to the at least one of the level information or the resource information, where the RAR is carried by a PDSCH may specifically include:

receiving information carried by the PDSCH, where the information carried by the PDSCH includes the RAR and the at least one of the level information or the resource information;

determining the at least one of the level information or the resource information included in the information carried by the PDSCH;

determining whether the at least one of the level information or the resource information included in the information carried by the PDSCH is the same as the at least one of the level information or the resource information corresponding to the random access preamble; and when the at least one of the level information or the resource information included in the information carried by the PDSCH is the same as the at least one of the level information or the resource information corresponding to the random access preamble, obtaining the RAR carried by the PDSCH.

Specific implementation procedures of these possible implementation manners are described in detail in Embodiment 3, and details are not described herein.

It should be noted that the receiving, by the UE, an RAR of the random access preamble according to the at least one of the level information or the resource information, where the RAR is carried by a PDSCH may further have another possible implementation manner, which is not specifically limited in this embodiment of the present invention.

The random access response method provided in this embodiment of the present invention includes: determining, by a UE, a random access preamble to be sent in an enhanced manner, and determining at least one of level information or resource information corresponding to the random access preamble, where the level information is at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information is at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; sending the random access preamble in the enhanced manner; and receiving an RAR of the random access preamble according to the at least one of the level information or the resource information, where the RAR is carried by a PDSCH. Based on the foregoing solutions provided in this embodiment of the present invention, when determining the random access preamble, the UE further determines the at least one of the level information or the resource information corresponding to the random access preamble, so that after sending the random access preamble, the UE can receive, according to the at least one of the level information or the resource information, the RAR corresponding to the random access preamble. Therefore, the following problem is avoided so that power waste of the UE is reduced: When a base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

Embodiment 3

Figure 4A:
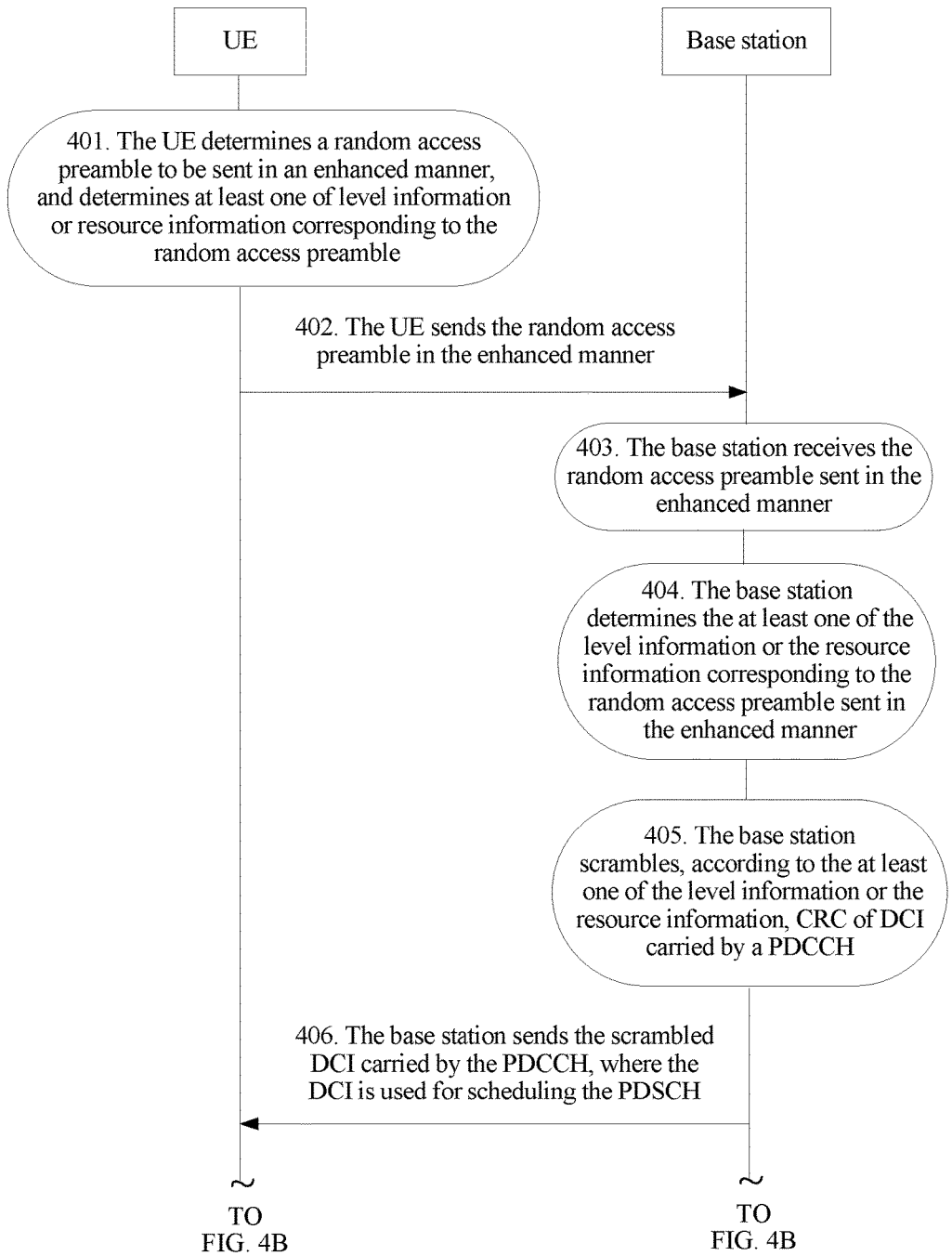
FIG. 4A and FIG. 4B is a schematic flowchart of still another random access response method according to an embodiment of the present invention.
Figure 4B:
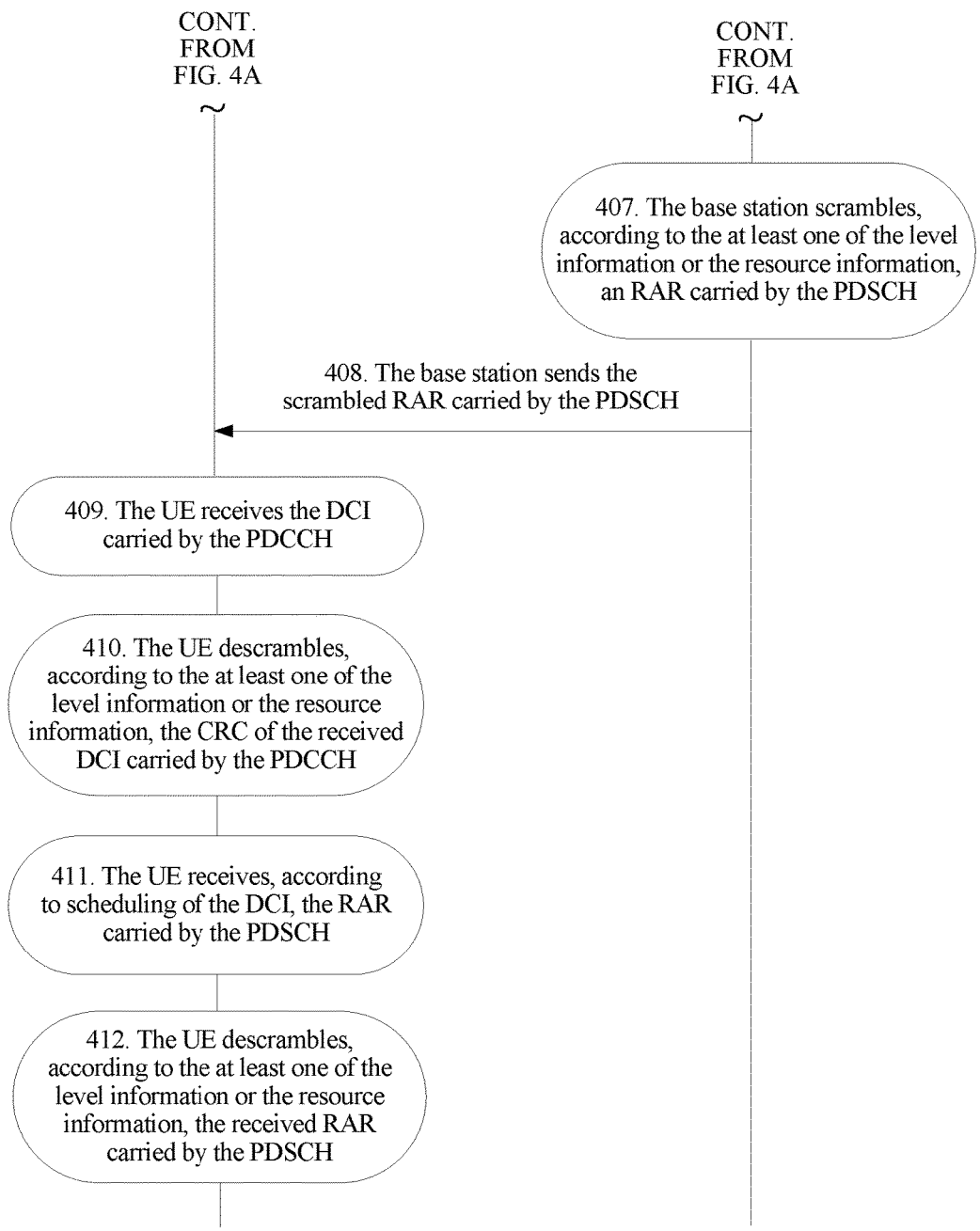

This embodiment of the present invention provides a random access response method. The method is applied to an LTE or LTE-A system, and is specifically described by using interaction between a UE and a base station as an example. As shown in FIG. 4A and FIG. 4B, the method includes the following steps:

401. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, for related descriptions about the determining, by the UE, the random access preamble to be sent in the enhanced manner and determining the at least one of the level information or the resource information corresponding to the random access preamble, reference may be made to descriptions in step 301 in Embodiment 2, and details are not described herein in this embodiment of the present invention.

402. The UE sends the random access preamble in the enhanced manner.

Specifically, in this embodiment of the present invention, in a random access procedure in the LTE or LTE-A system, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

403. The base station receives the random access preamble sent in the enhanced manner.

Specifically, after the UE sends the random access preamble in the enhanced manner, the base station receives the random access preamble sent in the enhanced manner.

404. The base station determines the at least one of the level information or the resource information corresponding to the random access preamble sent in the enhanced manner.

Specifically, for related descriptions about the determining, by the base station, the at least one of the level information or the resource information corresponding to the random access preamble sent in the enhanced manner, reference may be made to descriptions in step 202 in Embodiment 1, and details are not described herein in this embodiment of the present invention.

405. The base station scrambles, according to the at least one of the level information or the resource information, CRC of DCI carried by a PDCCH.

Specifically, the scrambling, by the base station according to the at least one of the level information or the resource information, CRC of DCI carried by a PDCCH may specifically include:

determining an RA-RNTI according to the at least one of the level information or the resource information; and determining a scrambling code sequence according to the RA-RNTI, and scrambling, by using the scrambling code sequence, the CRC of the DCI carried by the PDCCH.

It should be noted that as described in step 102 shown in FIG. 1, to identify that an RAR carried by a PDSCH scheduled by using the DCI that is carried by the PDCCH is a reply for a random access preamble sent on which time resource and frequency resource, the base station scrambles the PDCCH by using a scrambling code sequence obtained by calculation by using the RA-RNTI. In this embodiment of the present invention, when determining the RA-RNTI, the base station determines the RA-RNTI according to the at least one of the level information or the resource information. In this way, the base station may further identify, by using the scrambling code sequence obtained by calculation by using the RA-RNTI, that the RAR carried by the PDSCH scheduled by using the DCI carried by the PDCCH is a reply for a random access preamble corresponding to which piece of level information or resource information. Therefore, during PDCCH detection, the UE does not consider a PDCCH at another repetition level as a PDCCH of the UE or successfully detect the PDCCH, and further does not detect a PDSCH scheduled by using DCI carried by the PDCCH to cause RAR missed detection or an RAR false alarm, thereby reducing power waste of the UE.

It should be noted that when the at least one of the level information or the resource information has different values, determined RA-RNTIs are different.

Several methods for determining the RA-RNTI according to the at least one of the level information or the resource information are provided herein, which are as follows:

Example 1

The determining the RA-RNTI according to the level information may include:

determining the RA-RNTI according to the level information and a first formula, where the first formula may be shown as a formula (2):

$$\text{RA-RNTI} = M + t\_id + 10 * f\_id \quad \text{formula (2)}$$

where M is determined according to the level information, t_id represents a sequence number of the first subframe in which the PRACH carrying the random access preamble is located and 0≤t_id<10, and f_id represents a second PRACH index of the first subframe in which the PRACH carrying the random access preamble is located and 0≤f_id<6.

In the formula (2), when being sent on multiple different random access opportunities, random access preambles corresponding to same level information may have same t_id and f_id, and therefore, RA-RNTIs obtained by calculation are also the same. When performing random access response for the random access preambles that are corresponding to the same level information and that are sent on the multiple different random access opportunities, the base station may send, in one subframe, multiple pieces of DCI carried by PDCCHs, where the multiple pieces of DCI are separately used for scheduling PDSCHs carrying RARs of the random access preambles that are corresponding to the same level information and that are sent on the multiple random access opportunities. When scrambling CRC of the multiple pieces of DCI, the base station may use a same RA-RNTI to calculate scrambling code sequences. In this way, during PDCCH detection, the UE cannot identify, in the subframe, that an RAR carried by a PDSCH scheduled by using DCI that is carried by a PDCCH is a reply for a random access preamble sent on which random access opportunity. Consequently, an RAR false alarm or RAR missed detection is caused.

Therefore, Example 1 further includes: time resources included in multiple random access opportunities of random access preambles corresponding to same level information do not overlap. In addition, when the base station performs random access response for a random access preamble sent in the enhanced manner on a random access opportunity, there is a fixed time offset between a start time of sending DCI used for scheduling the RAR and an end time of the random access opportunity. Therefore, the base station does not simultaneously send, in one subframe, multiple pieces of DCI used for scheduling RARs for random access preambles that are corresponding to same level information and that are sent on multiple random access opportunities, thereby avoiding an RAR false alarm or RAR missed detection caused due to that the UE cannot distinguish the multiple pieces of DCI, and reducing power waste of the UE.

Example 2

The determining the RA-RNTI according to the level information and the resource information may include:

determining the RA-RNTI according to the level information, the resource information, and a second formula, where the second formula may be shown as a formula (3)/formula (4)/formula (5)/formula (6):

$$\text{RA-RNTI} = M + \text{tf\_id} \quad \text{formula (3)}$$

$$\text{RA-RNTI} = M + t\_id + 10 * f\_id' \qquad \text{formula (4)}$$

$$\text{RA-RNTI} = M + t\_id' + T * f\_id \qquad \text{formula (5)}$$

$$\text{RA-RNTI} = M + t\_id' + T * f\_id' \qquad \text{formula (6)}$$

where M is determined according to the level information, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located and 0?f_id'<n, where n represents a quantity of values of f_id' and n>6, and T represents a quantity of values of t_id'.

The resource information is at least one of tf_id, t_id', or f_id'. For related descriptions about tf_id, t_id', and f_id', reference may be made to descriptions in step 201 in Embodiment 1, and details are not described herein in this embodiment of the present invention.

It should be noted that in the second formula, when being sent on multiple different random access opportunities, random access preambles corresponding to same level information have at least one of tf_id, t_id', or f_id' that is different, and therefore, RA-RNTIs obtained by calculation are also different.

It should be noted that in Example 2, the resource information is obtained by separately performing index numbering on random access opportunities used for sending random access preambles corresponding to each piece of level information. For example, the resource information is obtained by numbering, from 0, the random access opportunities used for sending the preambles corresponding to each piece of level information. During the numbering, level information corresponding to a random access preamble sent on a random access opportunity needs to be determined, and only random access opportunities corresponding to same level information are numbered. Index numbers of random access opportunities corresponding to different level information do not have a relationship. When first level information corresponding to a first random access preamble is different from second level information corresponding to a second random access preamble, some or all values of first resource information corresponding to the first random access preamble and second resource information corresponding to the second random access preamble are the same.

Further, it can be learned from Example 1 and Example 2 that, if the PDCCH needs to be scrambled by using the scrambling code sequence obtained by calculation by using the RA-RNTI so as to identify that the RAR carried by the PDSCH scheduled by using the DCI carried by the PDCCH is a reply for a random access preamble corresponding to which piece of level information, M needs to be determined according to the level information during calculation of the RA-RNTI.

In a possible implementation manner, that M is determined according to the level information may specifically include:

$$M = X * L + Y, \text{ where}$$

L represents the level information, and X and Y are constant positive integers.

For example, for the level information corresponding to the random access preamble sent in the enhanced manner, when a smallest value of L is 0, Y is fixed at 61, and X is fixed at 60.

In another possible implementation manner, that M is determined according to the level information may specifically include:

when the level information is lowest level information corresponding to the random access preamble sent in the enhanced manner, M=61; or when the level information is not lowest level information corresponding to the random access preamble sent in the enhanced manner, M is equal to 1 plus a maximum value of an RA-RNTI determined according to level information that is one piece of level information lower than the level information, where the lowest level information is level information that has a smallest value and that is corresponding to the random access preamble sent in the enhanced manner, and the level information that is one piece of level information lower than the level information refers to level information that has a largest value among level information whose value is less than a value of the level information.

Example 3

The determining the RA-RNTI according to the resource information may include:

determining the RA-RNTI according to the resource information and a third formula, where the third formula may be shown as a formula (7)/formula (8)/formula (9)/formula (10):

$$\text{RA-RNTI} = N + tf\_id \qquad \text{formula (7)}$$

$$\text{RA-RNTI} = N + t\_id + 10 * f\_id' \qquad \text{formula (8)}$$

$$\text{RA-RNTI} = N + t\_id' + T * f\_id \qquad \text{formula (9)}$$

$$\text{RA-RNTI} = N + t\_id' + T * f\_id' \qquad \text{formula (10)}$$

where N is a constant positive integer, for example, N is fixed at 61, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located and 0?f_id'<n, where n represents a quantity of values of f_id' and n>6, and T represents a quantity of values of t_id'.

The resource information is at least one of tf_id, t_id', or f_id'. For related descriptions about tf_id, t_id', and f_id', reference may be made to descriptions in step 201 in Embodiment 1, and details are not described herein in this embodiment of the present invention.

It should be noted that in the third formula, when being sent on multiple different random access opportunities, random access preambles corresponding to same level information have at least one of tf_id, t_id', or f_id' that is different, and therefore, RA-RNTIs obtained by calculation are also different.

It should be noted that in Example 3, the resource information is obtained by performing index numbering on all random access opportunities used for sending random access preambles corresponding to all level information. During the numbering, level information corresponding to a random access preamble sent on a random access opportunity does not need to be determined, and all the random access opportunities are numbered. When first level information corresponding to a first random access preamble is different from second level information corresponding to a second random access preamble, all values of first resource information corresponding to the first random access preamble and second resource information corresponding to the second random access preamble are different. Therefore, by determining the RA-RNTI according to the resource information, calculating the scrambling code sequence by using the RA-RNTI, and scrambling the PDCCH, it can be identified that the RAR carried by the PDSCH scheduled by using the DCI that is carried by the PDCCH is a reply for a random access preamble corresponding to which piece of level information or resource information.

It should be noted that values of X, Y, and N in the foregoing formula (2) to formula (10) are merely exemplary numeric values, and the values of X, Y, and N are not specifically limited in this embodiment of the present invention.

It should be noted that T in the foregoing formula (2) to formula (10) represents the quantity of values of t_id'. For example, when a quantity of time resource startpoint indexes or time resource indexes is 20, T=20, and a value of T is not specifically limited in this embodiment of the present invention.

It should be noted that the RA-RNTI determined according to the at least one of the level information or the resource information may still be represented by using an existing RA-RNTI, and in this case, a value range of the RA-RNTI needs to be expanded. For example, the value range of the RA-RNTI is 0001-abcd, where abcd represents a hexadecimal number, and a value of abcd is greater than 003C. Alternatively, a new representation method is defined for the RA-RNTI determined according to the at least one of the level information or the resource information. For example, an enhanced RA-RNTI (eRA-RNTI) is used for representation, where a value range of the eRA-RNTI is 003D-FFF3, which is not specifically limited in this embodiment of the present invention.

406. The base station sends the scrambled DCI carried by the PDCCH, where the DCI is used for scheduling the PDSCH.

Specifically, after scrambling, according to the at least one of the level information or the resource information, the CRC of the DCI carried by the PDCCH, the base station sends the scrambled DCI carried by the PDCCH, where the DCI is used for scheduling the PDSCH.

407. The base station scrambles, according to the at least one of the level information or the resource information, an RAR carried by the PDSCH.

Specifically, after the base station sends the scrambled DCI carried by the PDCCH, the base station scrambles, according to the at least one of the level information or the resource information, the RAR carried by the PDSCH.

Specifically, the scrambling, by the base station according to the at least one of the level information or the resource information, an RAR carried by the PDSCH may specifically include:

determining an RA-RNTI according to the at least one of the level information or the resource information; and determining a scrambling code sequence according to the RA-RNTI, and scrambling, by using the scrambling code sequence, the RAR carried by the PDSCH.

For a method for determining the RA-RNTI according to the at least one of the level information or the resource information, reference may be made to descriptions in step 405, and details are not described herein in this embodiment of the present invention.

408. The base station sends the scrambled RAR carried by the PDSCH.

Specifically, after scrambling, according to the at least one of the level information or the resource information, the RAR carried by the PDSCH, the base station further sends the scrambled RAR carried by the PDSCH.

409. The UE receives the DCI carried by the PDCCH.

Specifically, after the base station sends the scrambled DCI carried by the PDCCH, the UE receives the DCI carried by the PDCCH.

410. The UE descrambles, according to the at least one of the level information or the resource information, the CRC of the received DCI carried by the PDCCH.

Specifically, after receiving the DCI carried by the PDCCH, the UE descrambles, according to the at least one of the level information or the resource information, the CRC of the received DCI carried by the PDCCH, where the descrambling, by the UE according to the at least one of the level information or the resource information, the CRC of the received DCI carried by the PDCCH may specifically include:

determining an RA-RNTI according to the at least one of the level information or the resource information; and determining a scrambling code sequence according to the RA-RNTI, and descrambling, by using the scrambling code sequence, the CRC of the DCI carried by the PDCCH.

For a method in which the UE determines the RA-RNTI according to the at least one of the level information or the resource information, reference may be made to the method, in step 405, in which the base station determines the RA-RNTI according to the at least one of the level information or the resource information, and details are not described herein in this embodiment of the present invention.

It should be noted that similar to that the base station scrambles, according to the at least one of the level information or the resource information, the CRC of the DCI carried by the PDCCH, in this embodiment of the present invention, when determining the RA-RNTI, the UE determines the RA-RNTI according to the at least one of the level information or the resource information. Therefore, during PDCCH detection, the UE descrambles, by using the scrambling code sequence obtained by calculation by using the RA-RNTI, the CRC of the received DCI carried by the PDCCH, and can find, with respect to the random access preamble sent in the enhanced manner by the UE, the DCI used for scheduling the PDSCH that carries the RAR, so that the UE does not consider a PDCCH at another repetition level as a PDCCH of the UE or successfully detect the PDCCH, and does not detect a PDSCH scheduled by using DCI carried by the PDCCH to cause RAR missed detection or an RAR false alarm, thereby reducing power waste of the UE.

It should be noted that there is not necessarily a sequence between steps 407-408 and steps 409-410. Steps 407-408 are actions subsequently performed on a base station side after steps 405-406 are performed, and steps 409-410 are actions that may be performed on a UE side after steps 405-406 are performed on the base station side. The sequence between steps 407-408 and steps 409-410 is not specifically limited in this embodiment of the present invention.

411. The UE receives, according to scheduling of the DCI, the RAR carried by the PDSCH.

Specifically, after the base station sends the scrambled RAR carried by the PDSCH, the UE receives, according to the scheduling of the DCI, the RAR carried by the PDSCH.

412. The UE descrambles, according to the at least one of the level information or the resource information, the received RAR carried by the PDSCH.

Specifically, after receiving the RAR carried by the PDSCH, the UE descrambles, according to the at least one of the level information or the resource information, the received RAR carried by the PDSCH, where the descrambling, by the UE according to the at least one of the level information or the resource information, the received RAR carried by the PDSCH may specifically include:

determining an RA-RNTI according to the at least one of the level information or the resource information; and determining a scrambling code sequence according to the RA-RNTI, and descrambling, by using the scrambling code sequence, the RAR carried by the PDSCH.

For a method in which the UE determines the RA-RNTI according to the at least one of the level information or the resource information, reference may be made to the method, in step 405, in which the base station determines the RA-RNTI according to the at least one of the level information or the resource information, and details are not described herein in this embodiment of the present invention.

It should be noted that in this embodiment of the present invention, the base station may not perform step 407, and the UE may not include step 412. Instead, after sending the scrambled DCI carried by the PDCCH, the base station determines the RA-RNTI in a manner described in the formula (1), determines the scrambling code sequence according to the RA-RNTI, and scrambles, by using the scrambling code sequence, the RAR carried by the PDSCH; after receiving the RAR carried by the PDSCH, the UE determines the RA-RNTI in the manner described in the formula (1), determines the scrambling code sequence according to the RA-RNTI, and scrambles, by using the scrambling code sequence, the RAR carried by the PDSCH, which is not specifically limited in this embodiment of the present invention.

Figure 5:
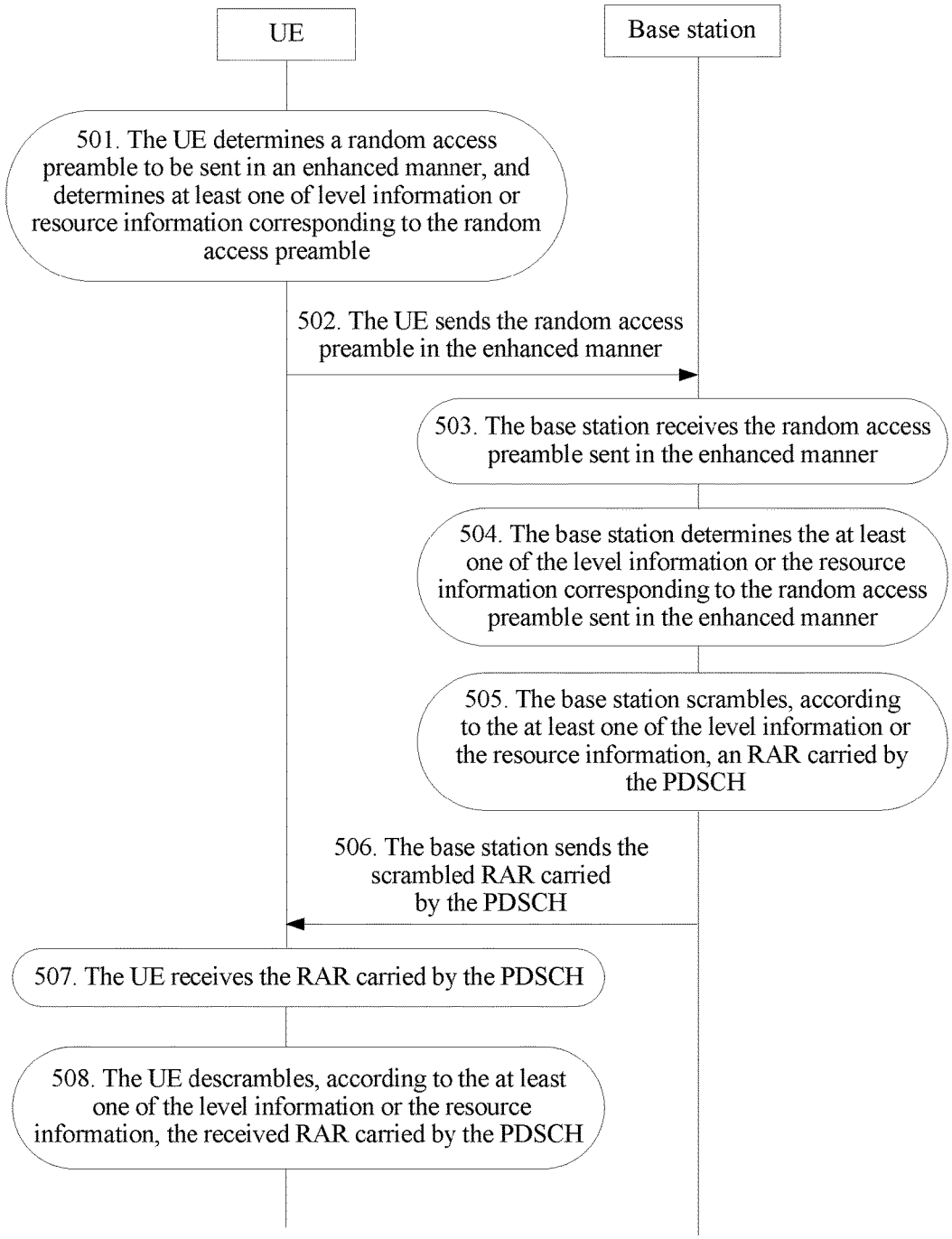
FIG. 5 is a schematic flowchart of yet another random access response method according to an embodiment of the present invention.

Optionally, an embodiment of the present invention further provides a random access response method. The method is applied to an LTE or LTE-A system, and is specifically described by using interaction between a UE and a base station as an example. As shown in FIG. 5, the method includes the following steps:

501. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, for related descriptions about the determining, by the UE, the random access preamble to be sent in the enhanced manner and determining the at least one of the level information or the resource information corresponding to the random access preamble, reference may be made to descriptions in step 301 in Embodiment 2, and details are not described herein in this embodiment of the present invention.

502. The UE sends the random access preamble in the enhanced manner.

Specifically, in this embodiment of the present invention, in a random access procedure in the LTE or LTE-A system, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

503. The base station receives the random access preamble sent in the enhanced manner.

Specifically, after the UE sends the random access preamble in the enhanced manner, the base station receives the random access preamble sent in the enhanced manner.

504. The base station determines the at least one of the level information or the resource information corresponding to the random access preamble sent in the enhanced manner.

Specifically, for related descriptions about the determining, by the base station, the at least one of the level information or the resource information corresponding to the random access preamble sent in the enhanced manner, reference may be made to descriptions in step 202 in Embodiment 1, and details are not described herein in this embodiment of the present invention.

505. The base station scrambles, according to the at least one of the level information or the resource information, an RAR carried by the PDSCH.

Specifically, for a method in which the base station scrambles, according to the at least one of the level information or the resource information, the RAR carried by the PDSCH, reference may be made to descriptions in step 407 in the embodiment shown in FIG. 4A and FIG. 4B, and details are not described herein in this embodiment of the present invention.

506. The base station sends the scrambled RAR carried by the PDSCH.

507. The UE receives the RAR carried by the PDSCH.

508. The UE descrambles, according to the at least one of the level information or the resource information, the received RAR carried by the PDSCH.

Specifically, for a method in which the UE descrambles, according to the at least one of the level information or the resource information, the received RAR carried by the PDSCH, reference may be made to descriptions in step 412 in the embodiment shown in FIG. 4A and FIG. 4B, and details are not described herein in this embodiment of the present invention.

It should be noted that a difference between the embodiment shown in FIG. 4A and FIG. 4B and the embodiment shown in FIG. 5 lies only in that the PDSCH in the embodiment shown in FIG. 5 does not need to be scheduled by using DCI carried by a PDCCH. Instead, information carried by the PDSCH is sent and received by using predefined parameters such as a frequency resource and a modulation and coding scheme.

It should be noted that in this embodiment of the present invention, because the PDSCH does not need to be scheduled by using the DCI carried by the PDCCH, and the UE does not need to detect the PDCCH, a case in which the UE cannot identify that the RAR carried by the PDSCH scheduled by using DCI that is carried by a PDCCH is a reply for a random access preamble corresponding to which piece of level information or resource information is avoided. In addition, in this embodiment of the present invention, the base station determines the RA-RNTI according to the at least one of the level information or the resource information, and scrambles the RAR by using the scrambling code sequence obtained by calculation by using the RA-RNTI. Therefore, the UE can identify that the RAR is a reply for a random access preamble corresponding to which piece of level information or resource information. If same random access preambles are sent in the enhanced manner by using different level information, and the base station sends, in one subframe, RARs replied with respect to the random access preambles corresponding to different level information, in the method described in this embodiment of the present invention, the UE does not consider an RAR replied with respect to a random access preamble corresponding to other level information as an RAR for the UE or successfully detect the RAR to cause an RAR false alarm, thereby reducing power waste of the UE.

Figure 6A:
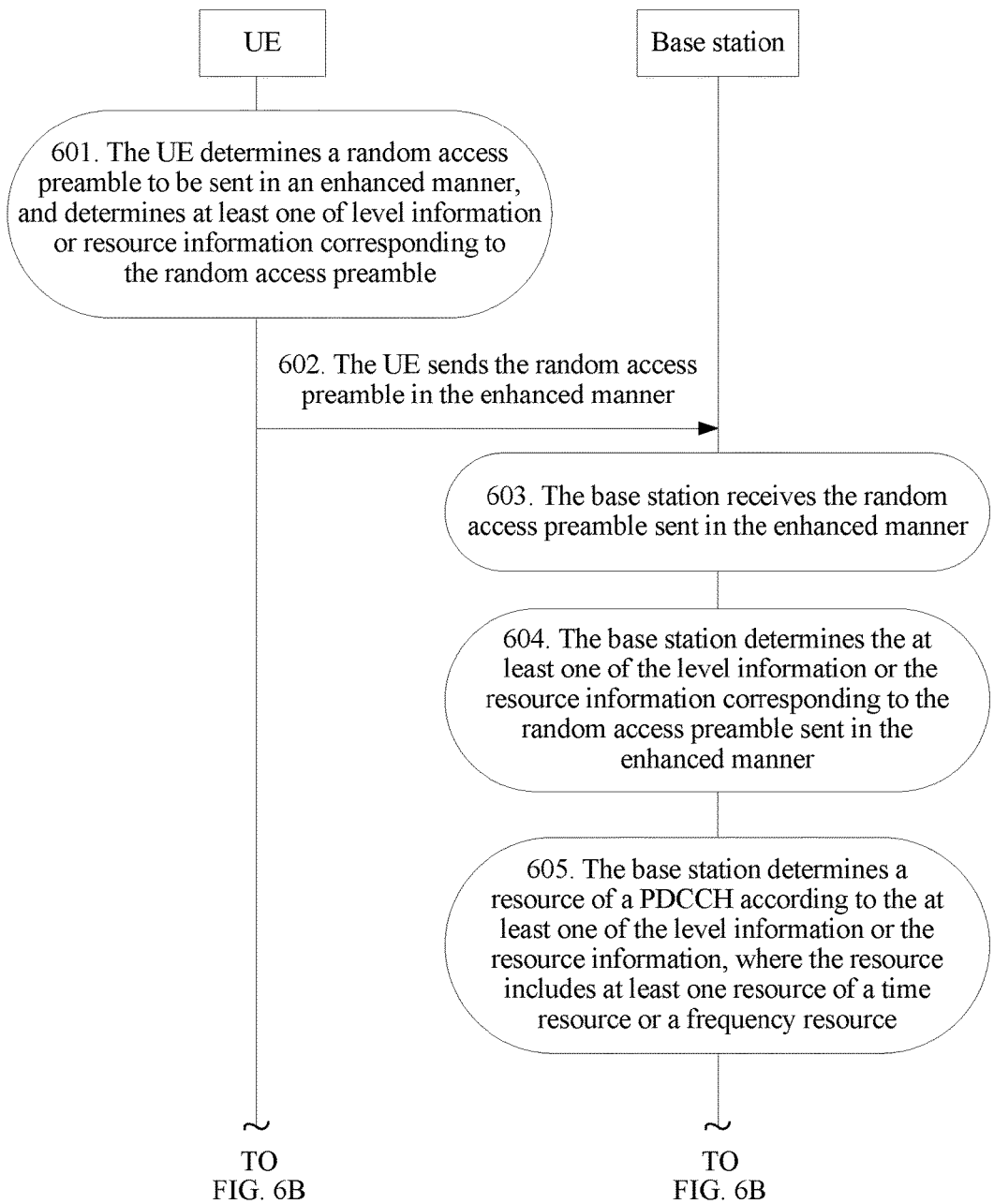
FIG. 6A and FIG. 6B is a schematic flowchart of yet another random access response method according to an embodiment of the present invention.
Figure 6B:
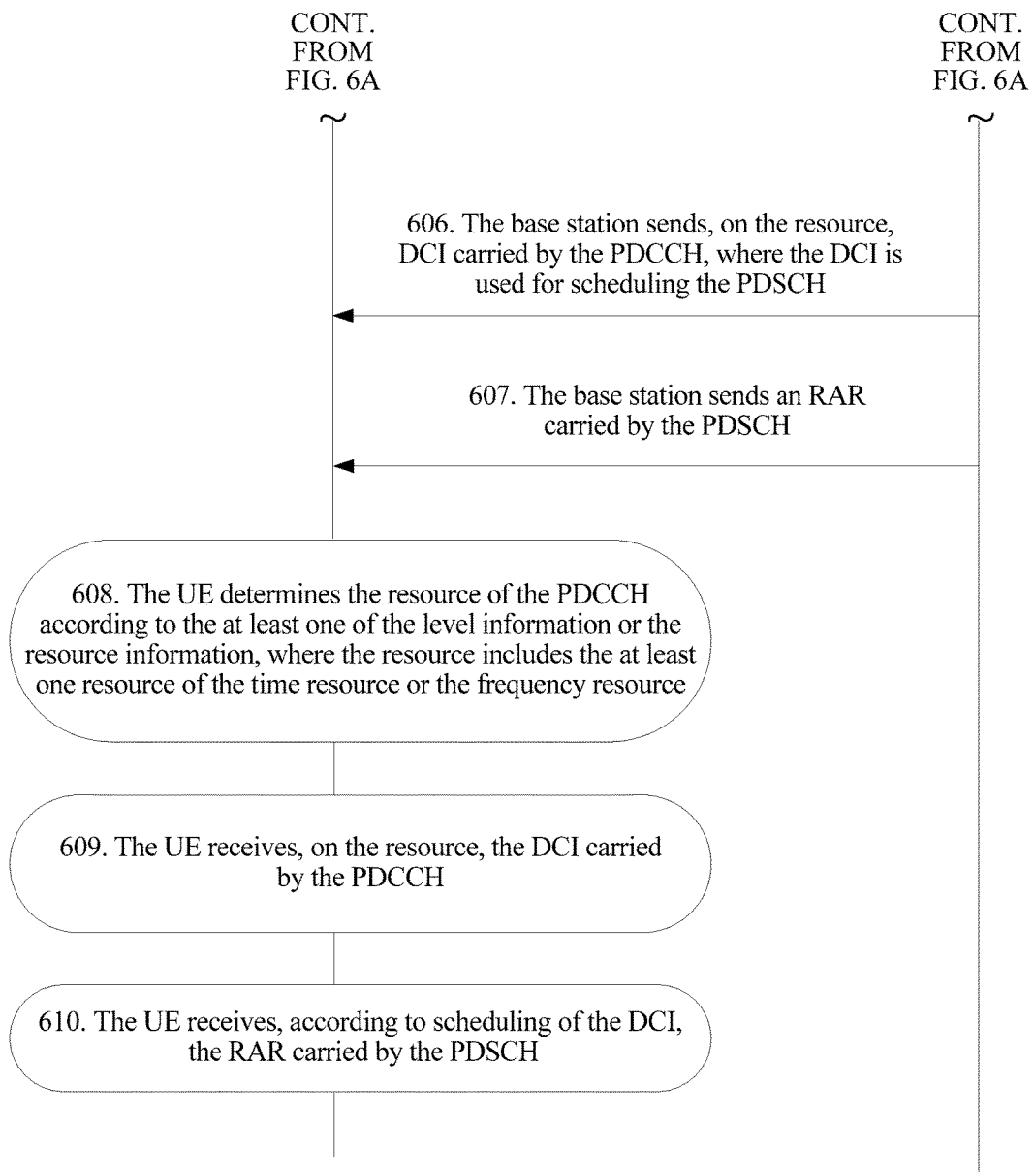

Optionally, an embodiment of the present invention further provides a random access response method. The method is applied to an LTE or LTE-A system, and is specifically described by using interaction between a UE and a base station as an example. As shown in FIG. 6A and FIG. 6B, the method includes the following steps:

601. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, for related descriptions about the determining, by the UE, the random access preamble to be sent in the enhanced manner and determining the at least one of the level information or the resource information corresponding to the random access preamble, reference may be made to descriptions in step 301 in Embodiment 2, and details are not described herein in this embodiment of the present invention.

602. The UE sends the random access preamble in the enhanced manner.

Specifically, in this embodiment of the present invention, in a random access procedure in the LTE or LTE-A system, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

603. The base station receives the random access preamble sent in the enhanced manner.

Specifically, after the UE sends the random access preamble in the enhanced manner, the base station receives the random access preamble sent in the enhanced manner.

604. The base station determines the at least one of the level information or the resource information corresponding to the random access preamble sent in the enhanced manner.

Specifically, for related descriptions about the determining, by the base station, the at least one of the level information or the resource information corresponding to the random access preamble sent in the enhanced manner, reference may be made to descriptions in step 202 in Embodiment 1, and details are not described herein in this embodiment of the present invention.

605. The base station determines a resource of a PDCCH according to the at least one of the level information or the resource information, where the resource includes at least one resource of a time resource or a frequency resource.

Specifically, in this embodiment of the present invention, after determining the at least one of the level information or the resource information corresponding to the random access preamble, the base station determines the resource of the PDCCH according to the at least one of the level information or the resource information.

The resource includes the at least one resource of the time resource or the frequency resource.

In a possible implementation manner, if the resource includes the time resource, the determining a resource of a PDCCH according to the at least one of the level information or the resource information may include:

determining, according to the at least one of the level information or the resource information, at least one of a radio frame or a subframe for sending DCI carried by the PDCCH.

In a possible implementation manner, if the resource includes the frequency resource, the determining a resource of a PDCCH according to the at least one of the level information or the resource information may include:

determining at least one of a PDCCH aggregation level, a PDCCH search space, or a PDCCH candidate according to the at least one of the level information or the resource information.

It should be noted that when the at least one of the level information or the resource information has different values, determined resources of the PDCCH do not overlap or are different.

Exemplarily, when the at least one of the level information or the resource information has different values, the determined at least one of the radio frame or the subframe for sending the DCI carried by the PDCCH is different. Assuming that a first radio frame and a first subframe for sending the DCI carried by the PDCCH are determined according to a first value of the at least one of the level information or the resource information, and a second radio frame and a second subframe for sending the DCI carried by the PDCCH are determined according to a second value of the at least one of the level information or the resource information, where the first value and the second value are different values, the first radio frame and the second radio frame include one or more radio frames, and the first subframe and the second subframe include one or more subframes, at least one radio frame included in the first radio frame is different from a radio frame included in the second radio frame, and/or at least one subframe included in the first subframe is different from a subframe included in the second subframe.

Exemplarily, when the at least one of the level information or the resource information has different values, determined PDCCH aggregation levels are different. Assuming that the at least one of the level information or the resource information is the repetition level index corresponding to the random access preamble sent in the enhanced manner, and there are a total of three repetition level indexes, which are 0, 1, and 2, the base station determines, according to the repetition level indexes 0, 1, and 2, that PDCCH aggregation levels are A, B, and C, where A, B, and C are positive integers different from 4 and 8 and are different from each other. Alternatively, when the at least one of the level information or the resource information has different values, patterns of determined PDCCH aggregation levels are different. A pattern of the aggregation levels includes one or more aggregation levels. When the DCI carried by the PDCCH is repeatedly sent in multiple subframes, an aggregation level used for each subframe is successively selected according to an aggregation level included in a pattern of the aggregation level. For example, when the pattern of the aggregation level is 4,8, the aggregation level used for each of the multiple subframes is successively 4,8, 4,8 . . . . For example, the base station determines, according to the repetition level indexes 0, 1, and 2, that the patterns of the PDCCH aggregation levels are respectively 4,4, 4,8, and 8,8.

Exemplarily, when the at least one of the level information or the resource information has different values, determined PDCCH search spaces are different. Optionally, the determined PDCCH search spaces have different startpoints. Assuming that the at least one of the level information or the resource information is the repetition level index corresponding to the random access preamble sent in the enhanced manner, and there are a total of three repetition level indexes, which are 0, 1, and 2, the base station determines, according to the repetition level indexes 0, 1, and 2, that a startpoint Yk of the search spaces may be respectively 16, 32, and 48.

Exemplarily, when the at least one of the level information or the resource information has different values, determined PDCCH candidates are different, or patterns of determined PDCCH candidates are different. A pattern of the candidates includes one or more PDCCH candidates. When the DCI carried by the PDCCH is repeatedly sent in multiple subframes, a PDCCH candidate used for each subframe is successively selected according to a PDCCH candidate included in a pattern of the candidate. For example, when the pattern of the PDCCH candidate is 1,2, the PDCCH candidate used for each of the multiple subframes for sending the DCI carried by the PDCCH is successively 1,2, 1,2 . . . . For example, the base station determines, according to the repetition level indexes 0, 1, and 2, that the patterns of the determined PDCCH candidates are respectively 1,2, 1,3, and 1,4.

It should be noted that, in addition to the time resource and the frequency resource that are enumerated above, another time resource and frequency resource may further be included, which is not specifically limited in this embodiment of the present invention.

606. The base station sends, on the resource, DCI carried by the PDCCH, where the DCI is used for scheduling the PDSCH.

Specifically, in this embodiment of the present invention, after determining the resource of the PDCCH according to the at least one of the level information or the resource information, the base station sends, on the resource, the DCI carried by the PDCCH.

607. The base station sends an RAR carried by the PDSCH.

Specifically, after sending, on the resource, the DCI carried by the PDCCH, the base station sends the RAR carried by the PDSCH scheduled by using the DCI.

608. The UE determines the resource of the PDCCH according to the at least one of the level information or the resource information, where the resource includes the at least one resource of the time resource or the frequency resource.

Specifically, in this embodiment of the present invention, after determining the at least one of the level information or the resource information corresponding to the random access preamble, the UE determines the resource of the PDCCH according to the at least one of the level information or the resource information, so that the UE can receive, on the resource, the DCI carried by the PDCCH. The resource includes the at least one resource of the time resource or the frequency resource.

Specifically, for related descriptions about the resource of the PDCCH, reference may be made to descriptions in step 605, and details are not described herein in this embodiment of the present invention.

It should be noted that when the at least one of the level information or the resource information has different values, determined resources of the PDCCH do not overlap or are different. For a specific example, reference may be made to step 605, and details are not described herein in this embodiment of the present invention.

It should be noted that a correspondence between the resource of the PDCCH and the at least one of the level information or the resource information of the random access preamble sent in the enhanced manner may be pre-configured in a system, on a network, or in a protocol. The UE stores the correspondence. The UE can determine the resource of the PDCCH according to the at least one of the level information or the resource information and the pre-configured correspondence.

Certainly, alternatively, the base station may notify, by using signaling, the UE of a correspondence between the resource of the PDCCH and the at least one of the level information or the resource information of the random access preamble sent in the enhanced manner. That is, the base station may perform the following step:

sending, to the UE, information about the correspondence between the resource of the PDCCH and the at least one of the level information or the resource information of the random access preamble sent in the enhanced manner.

In this case, the UE receives the information about the correspondence, and determines the resource of the PDCCH according to the at least one of the level information or the resource information and the information about the correspondence.

In this embodiment of the present invention, a method in which the UE determines the resource of the PDCCH according to the at least one of the level information or the resource information is not specifically limited in this embodiment of the present invention.

It should be noted that there is not necessarily a sequence between step 608 and the foregoing steps 602-607. After determining the random access preamble to be sent in the enhanced manner and determining the at least one of the level information or the resource information corresponding to the random access preamble, the UE can determine the resource of the PDCCH according to the at least one of the level information or the resource information, which is not specifically limited in this embodiment of the present invention.

609. The UE receives, on the resource, the DCI carried by the PDCCH.

Specifically, after the base station sends, on the resource, the DCI carried by the PDCCH, the UE receives, on the resource that is of the PDCCH and that is determined according to the at least one of the level information or the resource information, the DCI carried by the PDCCH.

610. The UE receives, according to scheduling of the DCI, the RAR carried by the PDSCH.

As described above, when the at least one of the level information or the resource information has different values, determined resources of the PDCCH do not overlap or are different. Therefore, when performing random access response for random access preambles corresponding to different level information or resource information, the base station uses different resources of the PDCCH. If the base station detects a random access preamble on a PRACH resource included in a PRACH resource set, the base station sends, on a resource that is of the PDCCH and that is determined according to at least one of level information or resource information corresponding to the random access preamble, DCI carried by the PDCCH; and if the UE sends the random access preamble on the PRACH resource included in the PRACH resource set, the UE receives, on a corresponding resource that is of the PDCCH and that is determined according to at least one of the level information or the resource information corresponding to the random access preamble, the DCI carried by the PDCCH. Therefore, during PDCCH detection, the UE does not perform detection on a resource that is of the PDCCH and that is determined according to at least one of level information or resource information corresponding to a random access preamble of another UE, so that the UE does not consider a PDCCH at another repetition level as a PDCCH of the UE or successfully detect the PDCCH, and does not detect a PDSCH scheduled by using DCI carried by the PDCCH to cause RAR missed detection or an RAR false alarm, thereby reducing power waste of the UE.

Figure 7A:
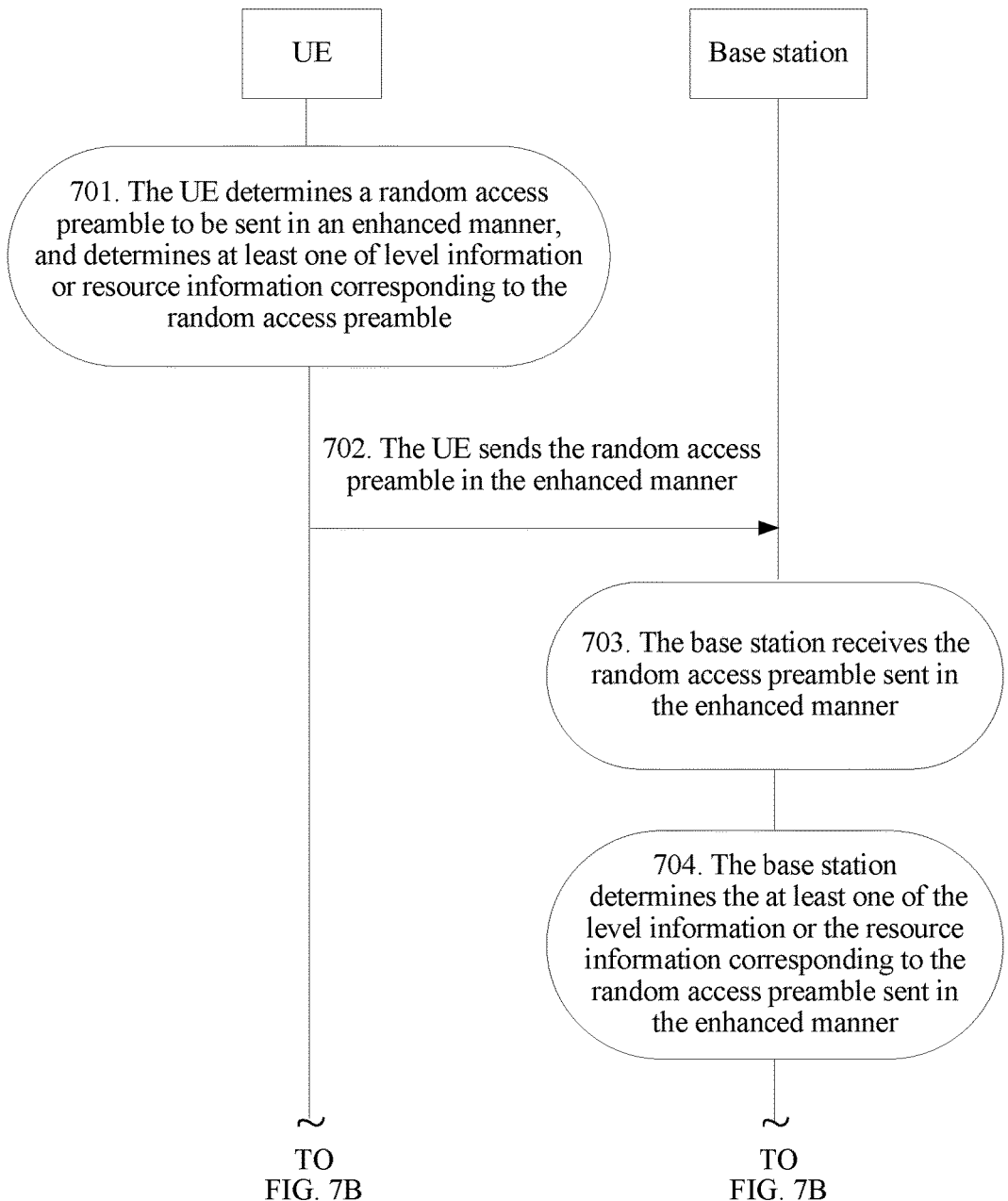
FIG. 7A and FIG. 7B is a schematic flowchart of yet another random access response method according to an embodiment of the present invention.
Figure 7B:
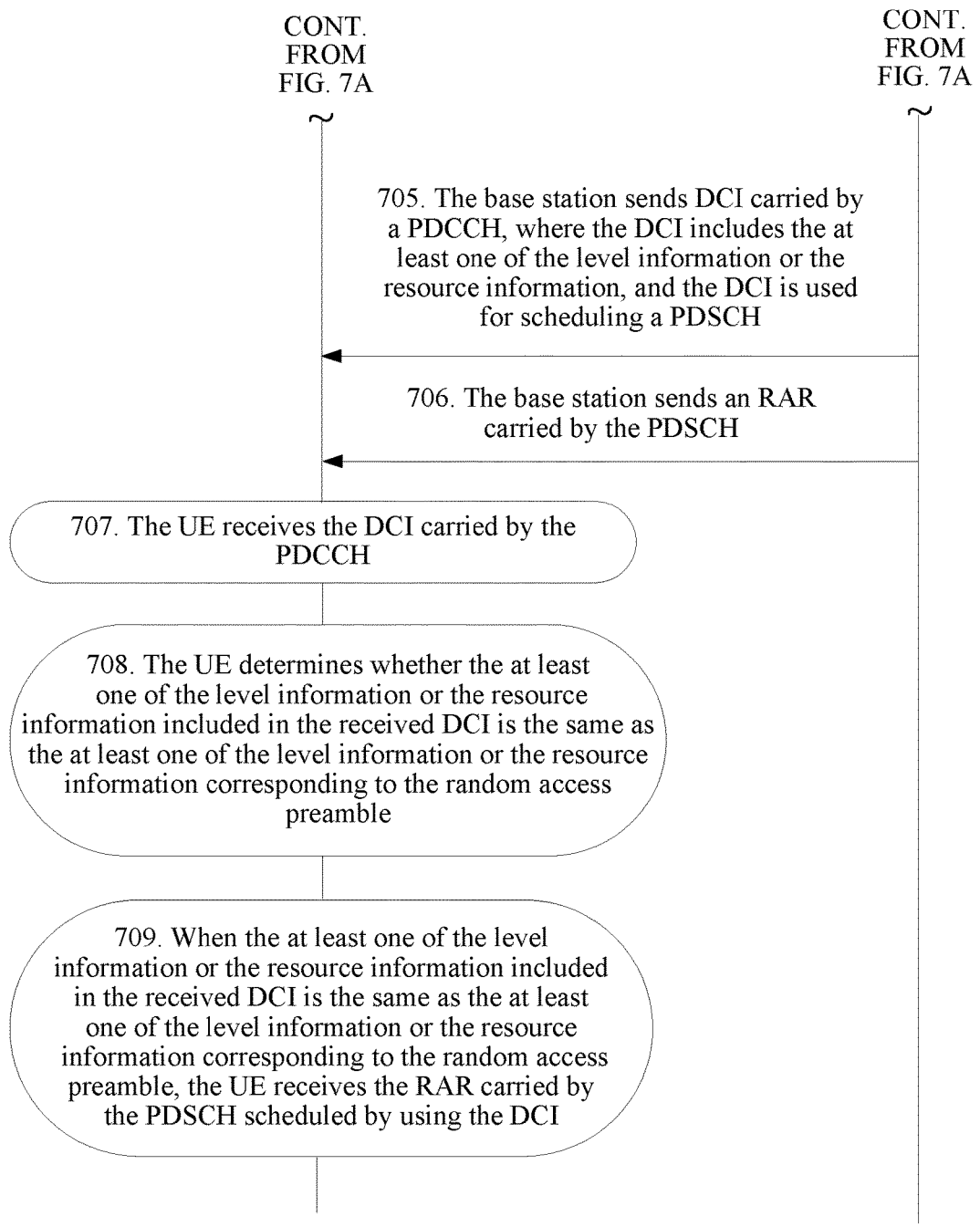

Optionally, an embodiment of the present invention further provides a random access response method. The method is applied to an LTE or LTE-A system, and is specifically described by using interaction between a UE and a base station as an example. As shown in FIG. 7A and FIG. 7B, the method includes the following steps:

701. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, for related descriptions about the determining, by the UE, the random access preamble to be sent in the enhanced manner and determining the at least one of the level information or the resource information corresponding to the random access preamble, reference may be made to descriptions in step 301 in Embodiment 2, and details are not described herein in this embodiment of the present invention.

702. The UE sends the random access preamble in the enhanced manner.

Specifically, in this embodiment of the present invention, in a random access procedure in the LTE or LTE-A system, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

703. The base station receives the random access preamble sent in the enhanced manner.

Specifically, after the UE sends the random access preamble in the enhanced manner, the base station receives the random access preamble sent in the enhanced manner.

704. The base station determines the at least one of the level information or the resource information corresponding to the random access preamble sent in the enhanced manner.

Specifically, for related descriptions about the determining, by the base station, the at least one of the level information or the resource information corresponding to the random access preamble sent in the enhanced manner, reference may be made to descriptions in step 202 in Embodiment 1, and details are not described herein in this embodiment of the present invention.

705. The base station sends DCI carried by a PDCCH, where the DCI includes the at least one of the level information or the resource information, and the DCI is used for scheduling a PDSCH.

Specifically, the at least one of the level information or the resource information may be represented by using a newly added DCI bit or DCI field. Alternatively, instead of adding a DCI bit or DCI field, an existing DCI bit or DCI field carried by the PDCCH is re-defined, so as to be used to represent the at least one of the level information or the resource information.

For example, for a DCI format IA, the at least one of the level information or the resource information is represented by using a reserved bit or field in existing DCI, and the at least one of the level information or the resource information may be specifically represented by using a bit or field used to represent a quantity of hybrid automatic repeat request (HARQ) processes. For another example, the at least one of the level information or the resource information may be represented by using a partial bit or field that is in existing DCI and that is used for resource allocation. A representation form of the at least one of the level information or the resource information included in the DCI is not specifically limited in this embodiment of the present invention.

706. The base station sends an RAR carried by the PDSCH.

707. The UE receives the DCI carried by the PDCCH.

708. The UE determines whether the at least one of the level information or the resource information included in the received DCI is the same as the at least one of the level information or the resource information corresponding to the random access preamble.

709. When the at least one of the level information or the resource information included in the received DCI is the same as the at least one of the level information or the resource information corresponding to the random access preamble, the UE receives the RAR carried by the PDSCH scheduled by using the DCI.

Specifically, in this embodiment of the present invention, the base station sends the DCI carried by the PDCCH, where the DCI further includes the at least one of the level information or the resource information. In this way, when the UE performs PDCCH detection, if it is detected that the at least one of the level information or the resource information included in the PDCCH is the same as the at least one of the level information or the resource information determined by the UE, the UE continues to detect the PDSCH scheduled by using the DCI carried by the PDCCH; or if it is detected that the at least one of the level information or the resource information included in the PDCCH is different from the at least one of the level information or the resource information determined by the UE, the UE continues to detect another PDCCH. Therefore, the UE can learn that the RAR carried by the PDSCH scheduled by using the DCI that is carried by the PDCCH is a reply for a random access preamble corresponding to which piece of level information or resource information, so that the UE does not consider a PDCCH at another repetition level as a PDCCH of the UE or successfully detect the PDCCH, and does not detect a PDSCH scheduled by using DCI carried by the PDCCH to cause RAR missed detection or an RAR false alarm, thereby reducing power waste of the UE.

Figure 8A:
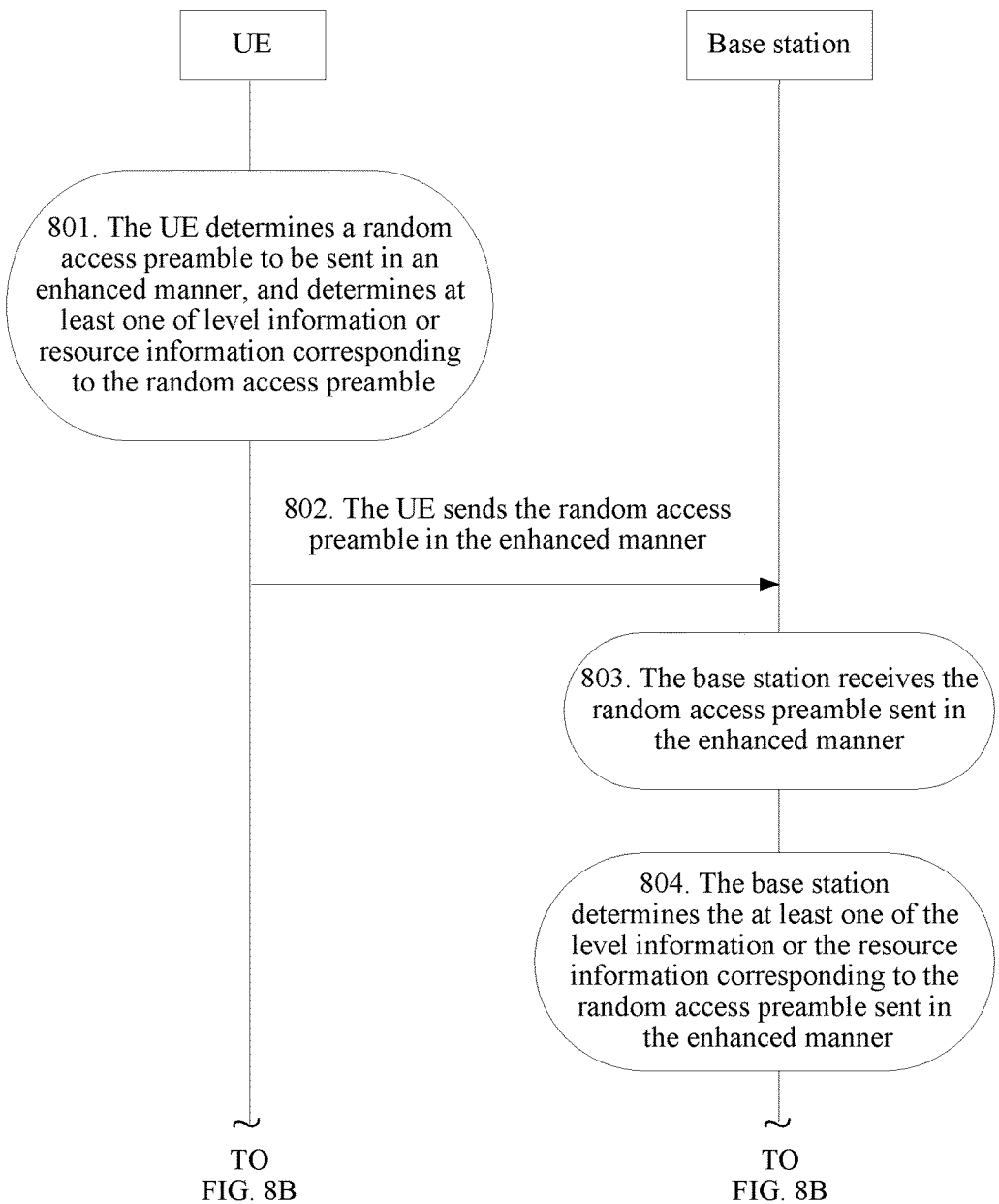
FIG. 8A and FIG. 8B is a schematic flowchart of yet another random access response method according to an embodiment of the present invention.
Figure 8B:
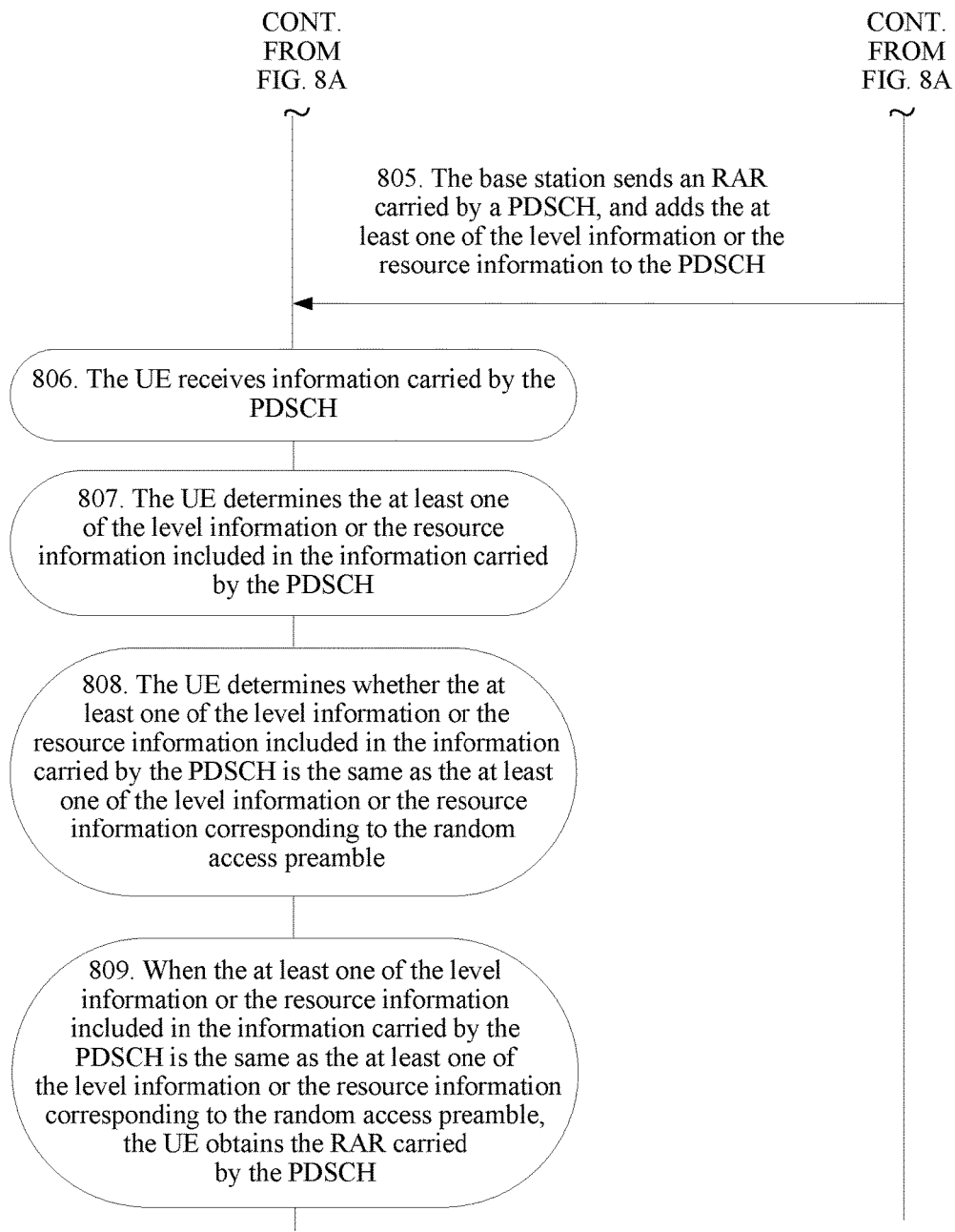

Optionally, an embodiment of the present invention further provides a random access response method. The method is applied to an LTE or LTE-A system, and is specifically described by using interaction between a UE and a base station as an example. As shown in FIG. 8A and FIG. 8B, the method includes the following steps:

801. The UE determines a random access preamble to be sent in an enhanced manner, and determines at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

Specifically, for related descriptions about the determining, by the UE, the random access preamble to be sent in the enhanced manner and determining the at least one of the level information or the resource information corresponding to the random access preamble, reference may be made to descriptions in step 301 in Embodiment 2, and details are not described herein in this embodiment of the present invention.

802. The UE sends the random access preamble in the enhanced manner.

Specifically, in this embodiment of the present invention, in a random access procedure in the LTE or LTE-A system, after determining the random access preamble to be sent in the enhanced manner and determining the at least one of the level information or the resource information corresponding to the random access preamble, the UE may send the random access preamble to the base station in the enhanced manner by using the PRACH, which is not specifically limited in this embodiment of the present invention.

803. The base station receives the random access preamble sent in the enhanced manner.

Specifically, after the UE sends the random access preamble in the enhanced manner, the base station receives the random access preamble sent in the enhanced manner.

804. The base station determines the at least one of the level information or the resource information corresponding to the random access preamble sent in the enhanced manner.

Specifically, for related descriptions about the determining, by the base station, the at least one of the level information or the resource information corresponding to the random access preamble sent in the enhanced manner, reference may be made to descriptions in step 202 in Embodiment 1, and details are not described herein in this embodiment of the present invention.

805. The base station sends an RAR carried by a PDSCH, and adds the at least one of the level information or the resource information to the PDSCH.

Specifically, the at least one of the level information or the resource information may be represented by using a newly added bit or field in information carried by the PDSCH. Alternatively, instead of adding a bit or field, an existing bit or field in information carried by the PDSCH is re-defined, and the existing bit or field is used to represent the at least one of the level information or the resource information. A representation form of the at least one of the level information or the resource information is not specifically limited in this embodiment of the present invention.

Preferably, the adding the at least one of the level information or the resource information to the PDSCH may specifically include:

representing the at least one of the level information or the resource information by using a bit in a backoff indication subheader of a Media Access Control MAC protocol data unit PDU carried by the PDSCH that carries the RAR.

806. The UE receives information carried by the PDSCH.

807. The UE determines the at least one of the level information or the resource information included in the information carried by the PDSCH.

808. The UE determines whether the at least one of the level information or the resource information included in the information carried by the PDSCH is the same as the at least one of the level information or the resource information corresponding to the random access preamble.

809. When the at least one of the level information or the resource information included in the information carried by the PDSCH is the same as the at least one of the level information or the resource information corresponding to the random access preamble, the UE obtains the RAR carried by the PDSCH.

Specifically, when the at least one of the level information or the resource information included in the information carried by the PDSCH is the same as the at least one of the level information or the resource information corresponding to the random access preamble, the UE parses the RAR included in the information carried by the PDSCH, so as to obtain the RAR.

Specifically, in this embodiment of the present invention, when the information carried by the PDSCH that carries the RAR includes the at least one of the level information or the resource information, the PDSCH does not need to be scheduled by using DCI carried by a PDCCH. Instead, the information carried by the PDSCH is sent and received by using predefined parameters such as a frequency resource and a modulation and coding scheme. When the UE performs PDSCH detection, if it is detected that the at least one of the level information or the resource information included in the information carried by the PDSCH is the same as the at least one of the level information or the resource information determined by the UE, the UE parses the RAR included in the information carried by the PDSCH to obtain the RAR; or if it is detected that the at least one of the level information or the resource information included in the information carried by the PDSCH is different from the at least one of the level information or the resource information determined by the UE, the UE continues to detect another PDSCH. In this way, the UE does not need to detect the PDCCH, and a case in which the UE cannot identify that the RAR carried by the PDSCH scheduled by using the DCI that is carried by the PDCCH is a reply for a random access preamble corresponding to which piece of level information or resource information is avoided. In addition, if same random access preambles are sent in the enhanced manner by using different level information, and the base station sends, in one subframe, RARs replied with respect to the random access preambles corresponding to different level information, in the method described in this embodiment of the present invention, the UE does not consider an RAR replied with respect to a random access preamble corresponding to other level information as an RAR for the UE or successfully detect the RAR to cause an RAR false alarm, thereby reducing power waste of the UE.

The random access response method provided in this embodiment of the present invention includes: determining, by a UE, a random access preamble to be sent in an enhanced manner, and determining at least one of level information or resource information corresponding to the random access preamble, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; sending the random access preamble in the enhanced manner; receiving, by a base station, the random access preamble sent in the enhanced manner; determining the at least one of the level information or the resource information corresponding to the random access preamble sent in the enhanced manner; sending an RAR of the random access preamble according to the at least one of the level information or the resource information, where the RAR is carried by a PDSCH; and receiving, by the UE, the RAR of the random access preamble according to the at least one of the level information or the resource information. Based on the foregoing solutions provided in this embodiment of the present invention, after receiving the random access preamble, the base station further determines the at least one of the level information or the resource information corresponding to the random access preamble, so as to send, according to the at least one of the level information or the resource information, the RAR corresponding to the random access preamble. Therefore, the following problem is avoided so that power waste of the UE is reduced: When the base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

Embodiment 4

Figure 9:
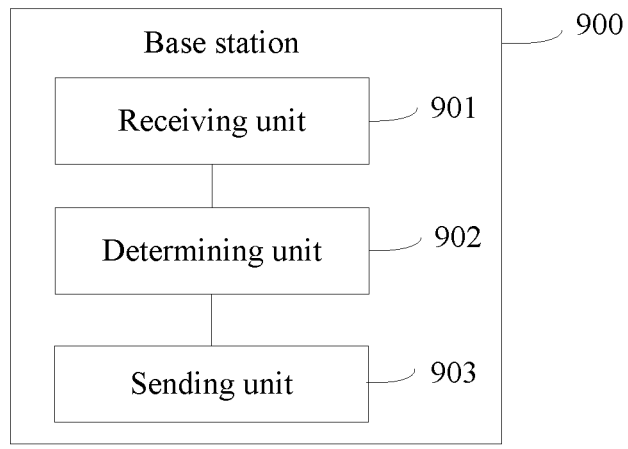
FIG. 9 is a schematic structural diagram of a base station according to an embodiment of the present invention.

This embodiment of the present invention provides a base station 900. Specifically, as shown in FIG. 9, the base station 900 includes a receiving unit 901, a determining unit 902, and a sending unit 903.

The receiving unit 901 is configured to receive a random access preamble sent in an enhanced manner.

The determining unit 902 is configured to determine at least one of level information or resource information corresponding to the random access preamble that is sent in the enhanced manner and that is received by the receiving unit 901, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

The sending unit 903 is configured to send a random access response RAR of the random access preamble according to the at least one of the level information or the resource information determined by the determining unit 902, where the RAR is carried by a physical downlink shared channel PDSCH.

Figure 10:
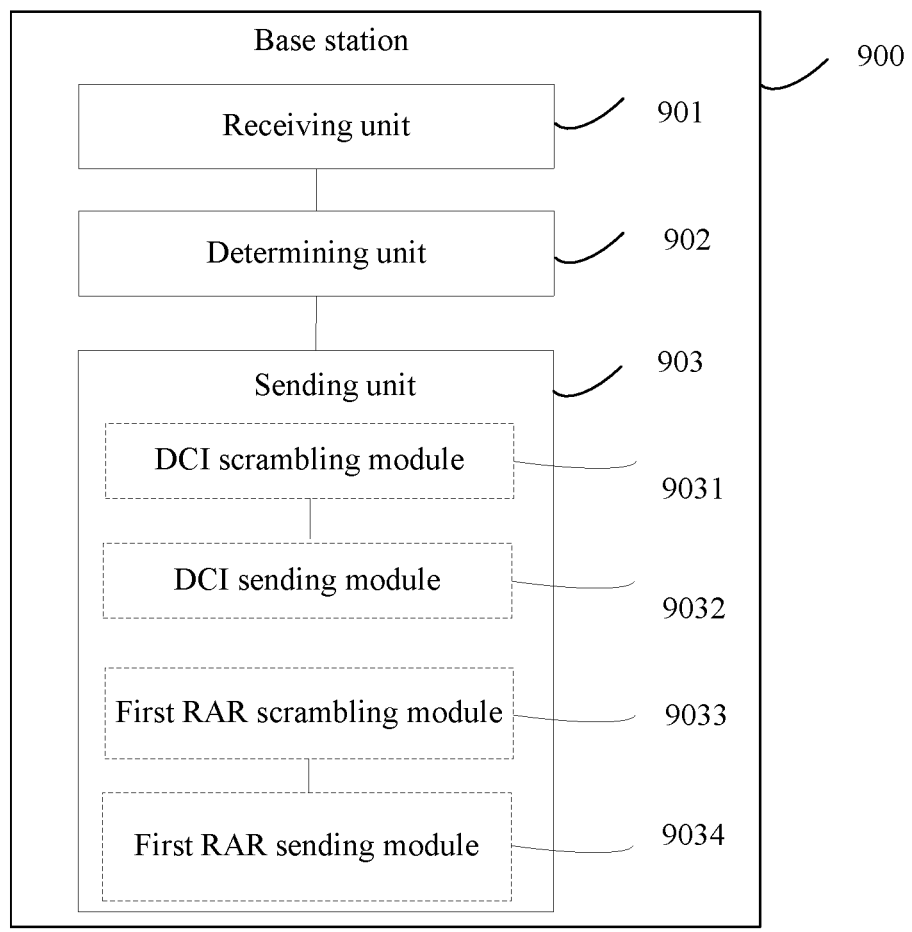
FIG. 10 is a schematic structural diagram of another base station according to an embodiment of the present invention.

In a first possible implementation manner, as shown in FIG. 10, the sending unit 903 includes a downlink control information DCI scrambling module 9031, a DCI sending module 9032, a first RAR scrambling module 9033, and a first RAR sending module 9034.

The DCI scrambling module 9031 is configured to scramble, according to the at least one of the level information or the resource information determined by the determining unit 902, cyclic redundancy check CRC of DCI carried by a physical downlink control channel PDCCH.

The DCI sending module 9032 is configured to send the DCI that is carried by the PDCCH and that is scrambled by the DCI scrambling module 9031, where the DCI is used for scheduling the PDSCH.

The first RAR scrambling module 9033 is configured to scramble the RAR carried by the PDSCH.

The first RAR sending module 9034 is configured to send the RAR that is carried by the PDSCH and that is scrambled by the first RAR scrambling module 9033.

The first RAR scrambling module 9033 may be specifically configured to:

scramble, according to the at least one of the level information or the resource information determined by the determining unit 902, the RAR carried by the PDSCH.

Figure 11:
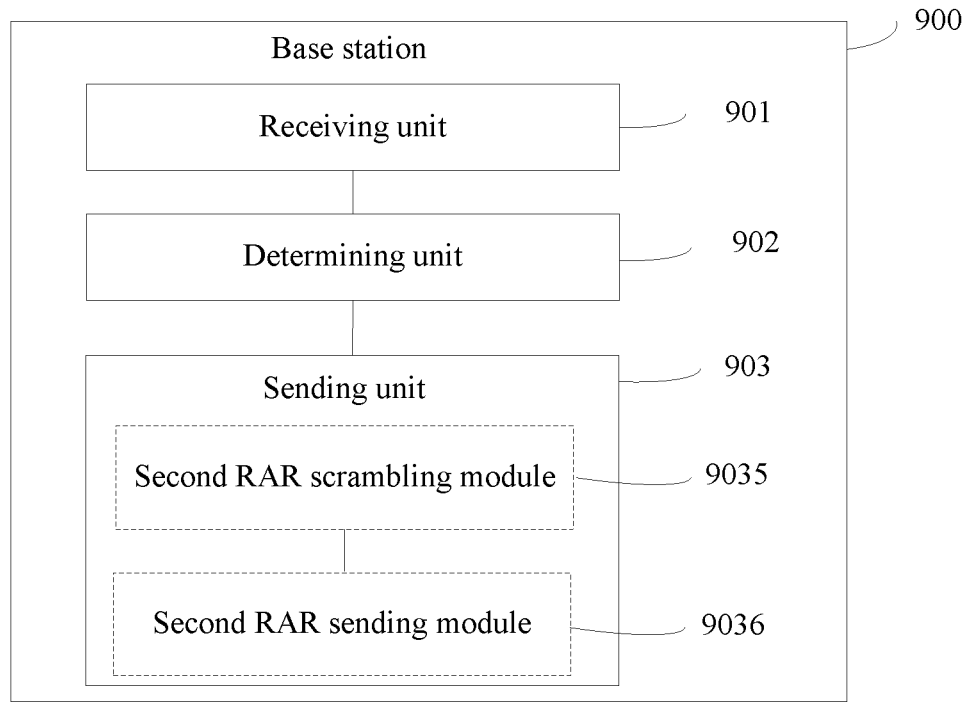
FIG. 11 is a schematic structural diagram of still another base station according to an embodiment of the present invention.

In a second possible implementation manner, as shown in FIG. 11, the sending unit 903 includes a second RAR scrambling module 9035 and a second RAR sending module 9036.

The second RAR scrambling module 9035 is configured to scramble, according to the at least one of the level information or the resource information determined by the determining unit 902, the RAR carried by the PDSCH.

The second RAR sending module 9036 is configured to send the RAR that is carried by the PDSCH and that is scrambled by the second RAR scrambling module 9035.

Further, that the DCI scrambling module 9031 is configured to scramble, according to the at least one of the level information or the resource information determined by the determining unit 902, CRC of DCI carried by a PDCCH includes:

determining a random access radio network temporary identifier RA-RNTI according to the at least one of the level information or the resource information determined by the determining unit 902; and determining a scrambling code sequence according to the RA-RNTI, and scrambling, by using the scrambling code sequence, the CRC of the DCI carried by the PDCCH.

That the first RAR scrambling module 9033/second RAR scrambling module 9035 is configured to scramble, according to the at least one of the level information or the resource information, the RAR carried by the PDSCH includes:

determining an RA-RNTI according to the at least one of the level information or the resource information determined by the determining unit 902; and determining a scrambling code sequence according to the RA-RNTI, and scrambling, by using the scrambling code sequence, the RAR carried by the PDSCH.

When the at least one of the level information or the resource information determined by the determining unit 902 has different values, RA-RNTIs determined according to the at least one of the level information or the resource information are different.

Further, that the DCI scrambling module 9031 or the first RAR scrambling module 9033/second RAR scrambling module 9035 determines an RA-RNTI according to the at least one of the level information or the resource information determined by the determining unit 902 has the following four cases:

Case 1:

That the DCI scrambling module 9031 or the first RAR scrambling module 9033/second RAR scrambling module 9035 determines the RA-RNTI according to the level information determined by the determining unit 902 specifically includes:

determining the RA-RNTI according to the level information and the following first formula, where the first formula includes:

$$\text{RA-RNTI} = M + t\_id + 10 * f\_id, \text{ where}$$

M is determined according to the level information, t_id represents a sequence number of the first subframe in which the PRACH carrying the random access preamble is located and 0?t_id<10, and f_id represents a second PRACH index of the first subframe in which the PRACH carrying the random access preamble is located and 0?f_id<6.

Particularly, time resources included in multiple random access opportunities of random access preambles corresponding to same level information do not overlap.

Case 2:

That the DCI scrambling module 9031 or the first RAR scrambling module 9033/second RAR scrambling module 9035 determines the RA-RNTI according to the level information and the resource information that are determined by the determining unit 902 specifically includes:

determining the RA-RNTI according to the level information, the resource information, and the following second formula, where the second formula includes:

$$\text{RA-RNTI} = M + tf\_id,$$

or the second formula includes:

$$\text{RA-RNTI} = M + t\_id + 10 * f\_id',$$

or the second formula includes:

$$\text{RA-RNTI} = M + t\_id' + T * f\_id,$$

or the second formula includes:

$$\text{RA-RNTI} = M + t\_id' + T * f\_id', \text{ where}$$

M is determined according to the level information, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

Particularly, when first level information corresponding to a first random access preamble is different from second level information corresponding to a second random access preamble, some or all values of first resource information corresponding to the first random access preamble and second resource information corresponding to the second random access preamble are the same.

Specifically, that M is determined according to the level information includes:

$M = X*L+Y$, where

L represents the level information, and X and Y are constant positive integers; or that M is determined according to the level information includes:

when the level information is lowest level information corresponding to the random access preamble sent in the enhanced manner, M=61; or when the level information is not lowest level information corresponding to the random access preamble sent in the enhanced manner, M is equal to 1 plus a maximum value of an RA-RNTI determined according to level information that is one piece of level information lower than the level information.

Case 3:

That the DCI scrambling module 9031 or the first RAR scrambling module 9033/second RAR scrambling module 9035 determines the RA-RNTI according to the resource information determined by the determining unit 902 specifically includes:

determining the RA-RNTI according to the resource information and the following third formula, where the third formula includes:

RA-RNTI=$N$+tf_id, or the third formula includes:

RA-RNTI=$N$+$t$_id+10*$f$_id', or the third formula includes:

RA-RNTI=$N$+$t$_id'+$T$*$f$_id, or the third formula includes:

RA-RNTI=$N$+$t$_id'+$T$*$f$_id', where

N is a constant positive integer, t_id represents a sequence number of the first subframe in which the PRACH carrying the random access preamble is located and 0?t_id<10, f_id represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

Particularly, when first level information corresponding to a first random access preamble is different from second level information corresponding to a second random access preamble, all values of first resource information corresponding to the first random access preamble and second resource information corresponding to the second random access preamble are different.

Figure 12:
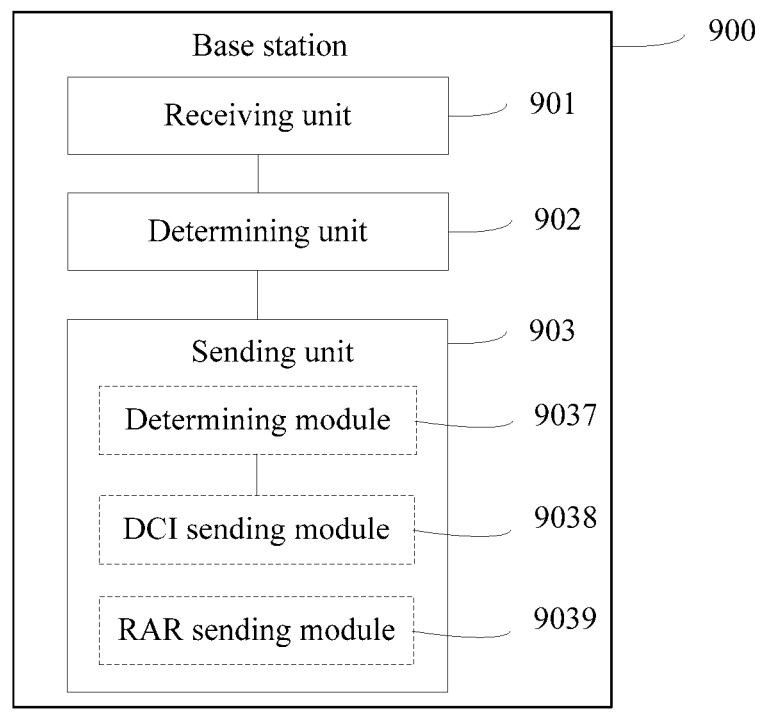
FIG. 12 is a schematic structural diagram of yet another base station according to an embodiment of the present invention.

In a third possible implementation manner, as shown in FIG. 12, the sending unit 903 includes a determining module 9037, a DCI sending module 9038, and an RAR sending module 9039.

The determining module 9037 is configured to determine a resource of a PDCCH according to the at least one of the level information or the resource information determined by the determining unit 902, where the resource includes at least one resource of a time resource or a frequency resource.

The DCI sending module 9038 is configured to send, on the resource determined by the determining module 9037, DCI carried by the PDCCH, where the DCI is used for scheduling the PDSCH.

The RAR sending module 9039 is configured to send the RAR carried by the PDSCH scheduled by using the DCI that is sent by the DCI sending module 9038.

When the at least one of the level information or the resource information determined by the determining unit 902 has different values, resources that are of the PDCCH and that are determined by the determining module 9037 do not overlap or are different.

Further, if the resource includes the frequency resource, the determining module 9037 is specifically configured to:

determine at least one of a PDCCH aggregation level, a PDCCH search space, or a PDCCH candidate according to the at least one of the level information or the resource information.

Figure 13:
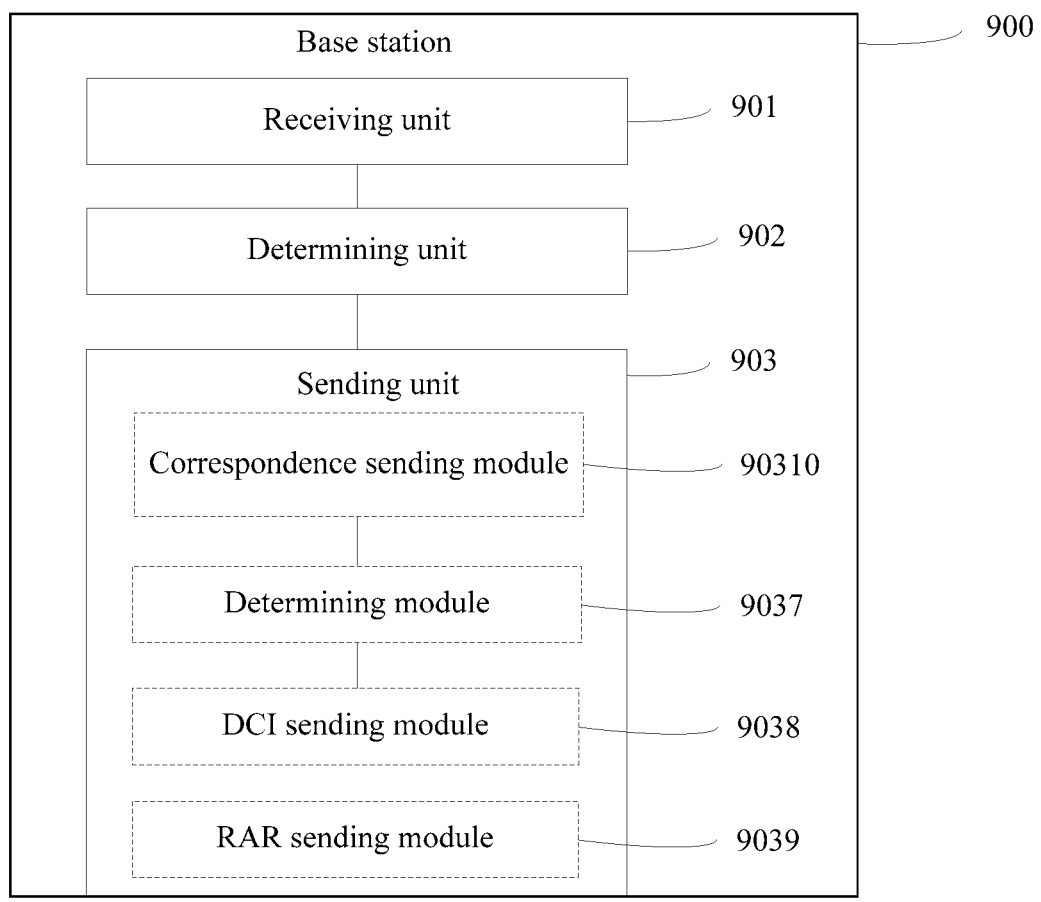
FIG. 13 is a schematic structural diagram of yet another base station according to an embodiment of the present invention.

Further, as shown in FIG. 13, the sending unit 903 further includes a correspondence sending module 90310, where the correspondence sending module 90310 is configured to send information about a correspondence between the resource of the PDCCH and the at least one of the level information or the resource information of the random access preamble sent in the enhanced manner, so as to determine the resource of the PDCCH according to the information about the correspondence.

Figure 14:
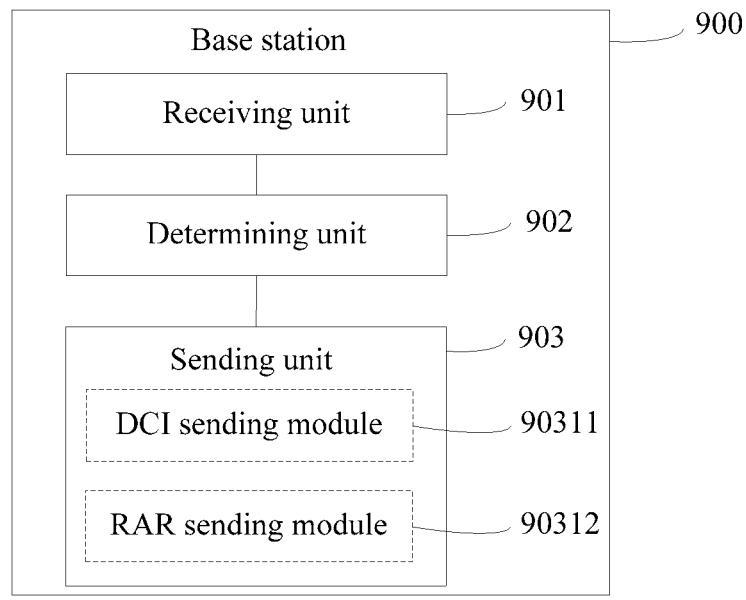
FIG. 14 is a schematic structural diagram of yet another base station according to an embodiment of the present invention.

In a fourth possible implementation manner, as shown in FIG. 14, the sending unit 903 includes a DCI sending module 90311 and an RAR sending module 90312.

The DCI sending module 90311 is configured to send DCI carried by a PDCCH, where the DCI includes the at least one of the level information or the resource information determined by the determining unit 902, and the DCI is used for scheduling the PDSCH.

The RAR sending module 90312 is configured to send the RAR carried by the PDSCH.

Figure 15:
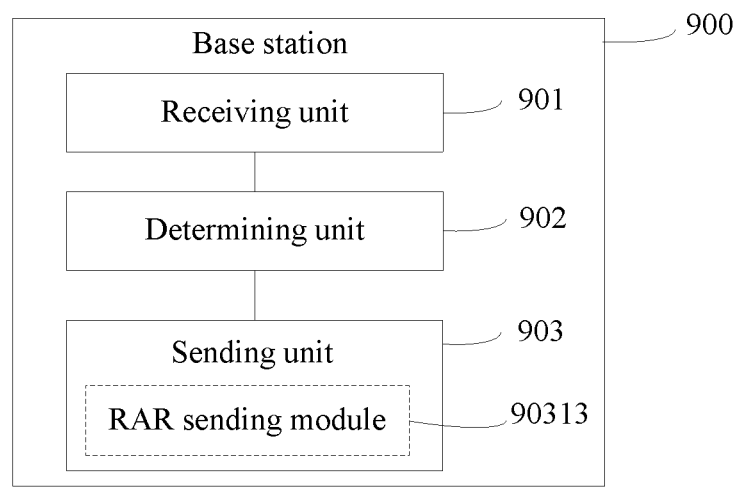
FIG. 15 is a schematic structural diagram of yet another base station according to an embodiment of the present invention.

In a fifth possible implementation manner, as shown in FIG. 15, the sending unit 903 includes an RAR sending module 90313.

The RAR sending module 90313 is configured to: send the RAR carried by the PDSCH, and add the at least one of the level information or the resource information determined by the determining unit 902 to the PDSCH.

Further, the adding the at least one of the level information or the resource information determined by the determining unit 902 to the PDSCH includes:

representing, by using a bit in a backoff indication subheader of a Media Access Control MAC protocol data unit PDU carried by the PDSCH that carries the RAR, the at least one of the level information or the resource information determined by the determining unit 902.

Specifically, in this embodiment of the present invention, the channel quality characterization parameter includes at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

It should be noted that for units/modules of the base station 900 provided in this embodiment of the present invention, the receiving unit 901 may be specifically implemented by using a receiver, the sending unit 903 may be specifically implemented by using a transmitter, and the determining unit 902 may be specifically implemented by using a processor, where the processor, the receiver, and the transmitter can communicate with each other, which is not specifically limited in this embodiment of the present invention.

Specifically, for a method in which the base station performs random access response, reference may be made to descriptions in Embodiment 1 and Embodiment 3, and details are not described herein in this embodiment of the present invention.

The base station provided in this embodiment of the present invention includes: a receiving unit, configured to receive a random access preamble sent in an enhanced manner; a determining unit, configured to determine at least one of level information or resource information corresponding to the random access preamble that is sent in the enhanced manner and that is received by the receiving unit, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; and a sending unit, configured to send an RAR of the random access preamble according to the at least one of the level information or the resource information determined by the determining unit, where the RAR is carried by a PDSCH. Based on the foregoing solutions provided in this embodiment of the present invention, after receiving the random access preamble sent in the enhanced manner, the base station further determines the at least one of the level information or the resource information corresponding to the random access preamble, so as to send, according to the at least one of the level information or the resource information, the RAR corresponding to the random access preamble. Therefore, the following problem is avoided so that power waste of a UE is reduced: When the base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

Embodiment 5

Figure 16:
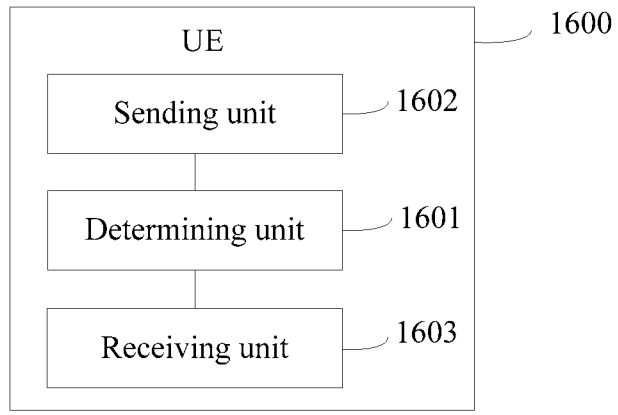
FIG. 16 is a schematic structural diagram of a UE according to an embodiment of the present invention.

This embodiment of the present invention provides a terminal UE 1600. Specifically, as shown in FIG. 16, the UE 1600 includes a determining unit 1601, a sending unit 1602, and a receiving unit 1603.

The determining unit 1601 is configured to determine a random access preamble to be sent in an enhanced manner, and determine at least one of level information or resource information corresponding to the random access preamble.

The level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6.

The sending unit 1602 is configured to send, in the enhanced manner, the random access preamble determined by the determining unit 1601.

The receiving unit 1603 is configured to receive a random access response RAR of the random access preamble according to the at least one of the level information or the resource information determined by the determining unit 1601, where the RAR is carried by a physical downlink shared channel PDSCH.

Figure 17:
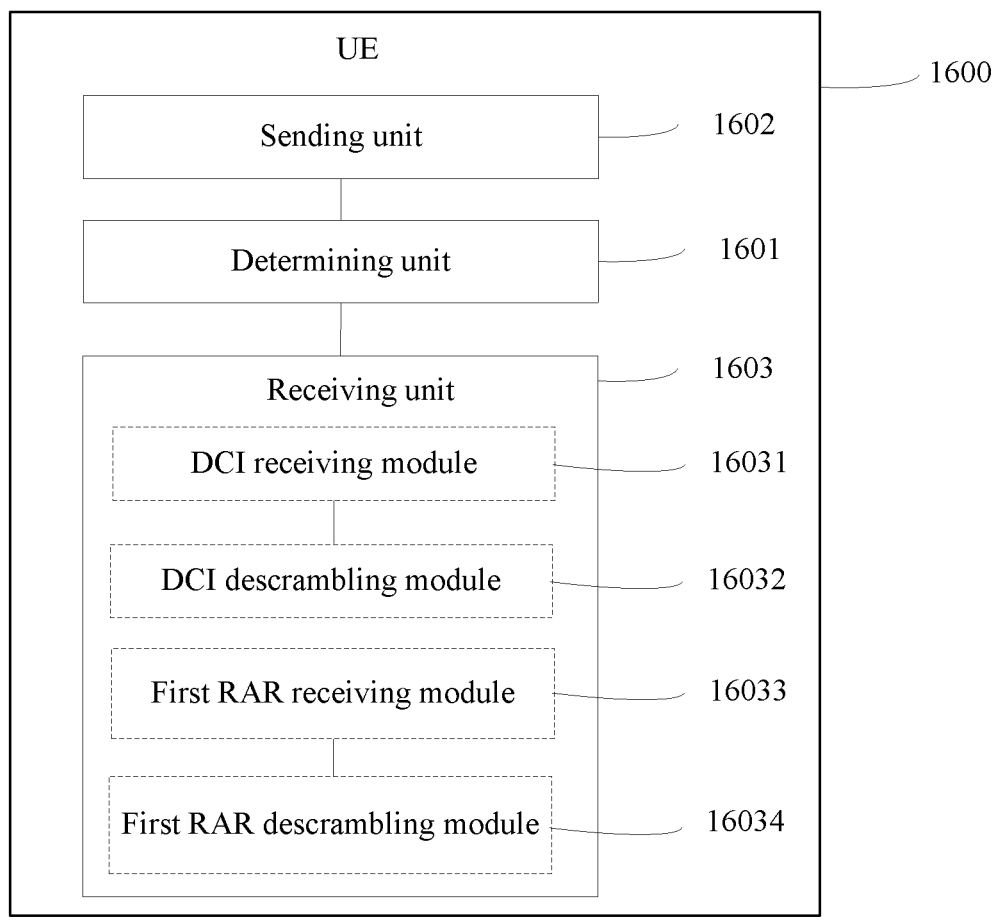
FIG. 17 is a schematic structural diagram of another UE according to an embodiment of the present invention.

In a first possible implementation manner, as shown in FIG. 17, the receiving unit 1603 includes a downlink control information DCI receiving module 16031, a DCI descrambling module 16032, a first RAR receiving module 16033, and a first RAR descrambling module 16034.

The DCI receiving module 16031 is configured to receive DCI carried by a physical downlink control channel PDCCH, where the DCI is used for scheduling the PDSCH.

The DCI descrambling module 16032 is configured to descramble, according to the at least one of the level information or the resource information determined by the determining unit 1601, CRC of the DCI that is carried by the PDCCH and that is received by the DCI receiving module 16031.

The first RAR receiving module 16033 is configured to receive, according to scheduling of the DCI received by the DCI receiving module 16031, the RAR carried by the PDSCH.

The first RAR descrambling module 16034 is configured to descramble the RAR that is carried by the PDSCH and that is received by the first RAR receiving module 16033.

The first RAR descrambling module 16034 may be specifically configured to:

descramble, according to the at least one of the level information or the resource information determined by the determining unit 1601, the RAR that is carried by the PDSCH and that is received by the first RAR receiving module 16033.

Figure 18:
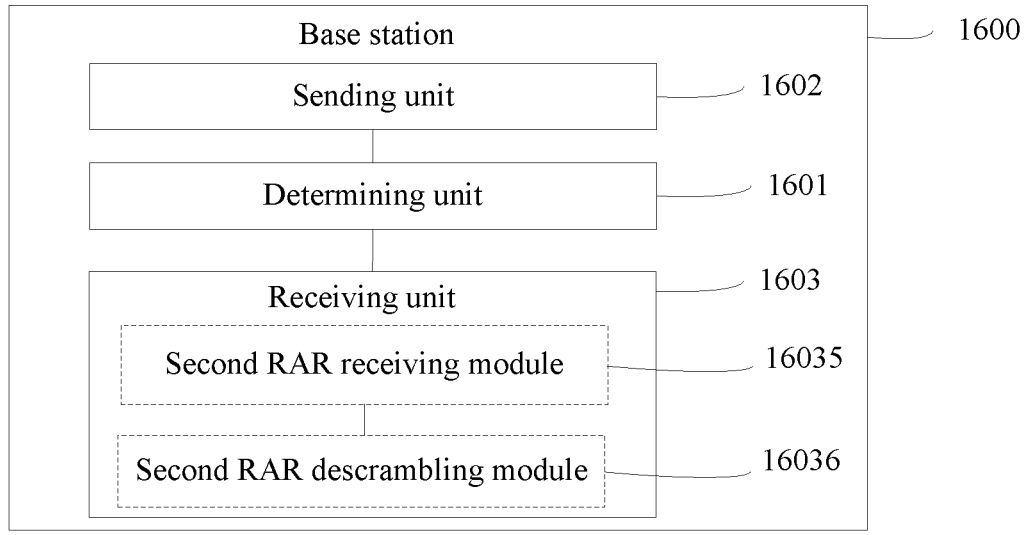
FIG. 18 is a schematic structural diagram of still another UE according to an embodiment of the present invention.

In a second possible implementation manner, as shown in FIG. 18, the receiving unit 1603 includes a second RAR receiving module 16035 and an RAR descrambling module 16036.

The second RAR receiving module 16035 is configured to receive the RAR carried by the PDSCH.

The second RAR descrambling module 16036 is configured to descramble, according to the at least one of the level information or the resource information determined by the determining unit 1601, the RAR that is carried by the PDSCH and that is received by the second RAR receiving module 16035.

Further, that the first RAR descrambling module 16034/second RAR descrambling module 16036 is configured to descramble, according to the at least one of the level information or the resource information determined by the determining unit 1601, the RAR that is carried by the PDSCH and that is received by the first RAR receiving module 16033/second RAR receiving module 16035 includes:

determining a random access radio network temporary identifier RA-RNTI according to the at least one of the level information or the resource information determined by the determining unit 1601; and determining a scrambling code sequence according to the RA-RNTI, and descrambling, by using the scrambling code sequence, the RAR carried by the PDSCH.

That the DCI descrambling module 16032 is configured to descramble, according to the at least one of the level information or the resource information determined by the determining unit 1601, CRC of the DCI that is carried by the PDCCH and that is received by the DCI receiving module 16031 includes:

determining an RA-RNTI according to the at least one of the level information or the resource information determined by the determining unit 1601; and determining a scrambling code sequence according to the RA-RNTI, and descrambling, by using the scrambling code sequence, the CRC of the received DCI carried by the PDCCH.

When the at least one of the level information or the resource information determined by the determining unit 1601 has different values, RA-RNTIs determined according to the at least one of the level information or the resource information are different.

Further, that the first RAR descrambling module 16034/second RAR descrambling module 16036 or the DCI descrambling module 16032 determines the RA-RNTI according to the at least one of the level information or the resource information determined by the determining unit 1601 includes the following four cases:

Case 1:

That the first RAR descrambling module 16034/second RAR descrambling module 16036 or the DCI descrambling module 16032 determines the RA-RNTI according to the level information determined by the determining unit 1601 specifically includes:

determining the RA-RNTI according to the level information and the following first formula, where the first formula includes:

$$RA\text{-}RNTI = M + t\_id + 10 * f\_id, \text{ where}$$

M is determined according to the level information, $t\_id$ represents a sequence number of the first subframe in which the PRACH carrying the random access preamble is located and $0 \leq t\_id < 10$, and $f\_id$ represents a second PRACH index of the first subframe in which the PRACH carrying the random access preamble is located and $0 \leq f\_id < 6$.

Particularly, time resources included in multiple random access opportunities of random access preambles corresponding to same level information do not overlap.

Case 2:

That the first RAR descrambling module 16034/second RAR descrambling module 16036 or the DCI descrambling module 16032 determines the RA-RNTI according to the level information and the resource information that are determined by the determining unit 1601 specifically includes:

determining the RA-RNTI according to the level information, the resource information, and the following second formula, where the second formula includes:

$$RA\text{-}RNTI = M + tf\_id,$$

or the second formula includes:

$$RA\text{-}RNTI = M + t\_id + 10 * f\_id',$$

or the second formula includes:

$$RA\text{-}RNTI = M + t\_id' + T * f\_id,$$

or the second formula includes:

$$RA\text{-}RNTI = M + t\_id' + T * f\_id', \text{ where}$$

M is determined according to the level information, $t\_id$ represents a sequence number of the first subframe in which the PRACH carrying the random access preamble is located and $0 \leq t\_id < 10$, $f\_id$ represents a second PRACH index of the first subframe in which the PRACH carrying the random access preamble is located and $0 \leq f\_id < 6$, $tf\_id$ represents at least one of the time-frequency resource index, the resource index, the random access opportunity index, or the PRACH mask index, $t\_id'$ represents the time resource startpoint index or the time resource index, $f\_id'$ represents the frequency resource index or the first PRACH index of the first subframe in which the PRACH carrying the random access preamble is located, and T represents a quantity of values of $t\_id'$.

Particularly, when first level information corresponding to a first random access preamble is different from second level information corresponding to a second random access preamble, some or all values of first resource information corresponding to the first random access preamble and second resource information corresponding to the second random access preamble are the same.

Specifically, that M is determined according to the level information includes:

$M = X*L + Y$, where L represents the level information, and X and Y are constant positive integers; or that M is determined according to the level information includes:

when the level information is lowest level information corresponding to the random access preamble sent in the enhanced manner, $M = 61$; or when the level information is not lowest level information corresponding to the random access preamble sent in the enhanced manner, M is equal to 1 plus a maximum value of an RA-RNTI determined according to level information that is one piece of level information lower than the level information.

Case 3:

That the first RAR descrambling module 16034/second RAR descrambling module 16036 or the DCI descrambling module 16032 determines the RA-RNTI according to the resource information determined by the determining unit 1601 specifically includes:

determining the RA-RNTI according to the resource information and the following third formula, where the third formula includes:

$$RA\text{-}RNTI = N + tf\_id,$$

or the third formula includes:

$$RA\text{-}RNTI = N + t\_id + 10 * f\_id',$$

or the third formula includes:

$$RA\text{-}RNTI = N + t\_id' + T * f\_id,$$

or the third formula includes:

$$RA\text{-}RNTI = N + t\_id' + T * f\_id', \text{ where}$$

N is a constant positive integer, $t\_id$ represents a sequence number of the first subframe in which the PRACH carrying the random access preamble is located and $0 \leq t\_id < 10$, $f\_id$ represents a second PRACH index of the first subframe in which the PRACH carrying the random access preamble is located and 0?f_id<6, tf_id represents at least one of the time-frequency resource index, the resource index, the random access opportunity index, or the PRACH mask index, t_id' represents the time resource startpoint index or the time resource index, f_id' represents the frequency resource index or the first PRACH index of the first subframe in which the PRACH carrying the random access preamble is located, and T represents a quantity of values of t_id'.

Particularly, when first level information corresponding to a first random access preamble is different from second level information corresponding to a second random access preamble, all values of first resource information corresponding to the first random access preamble and second resource information corresponding to the second random access preamble are different.

Figure 19:
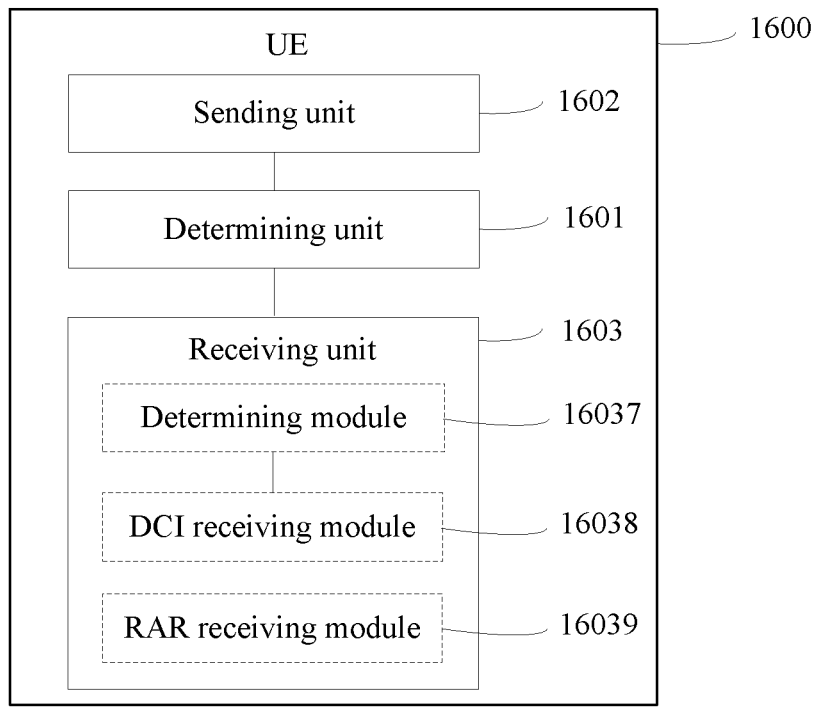
FIG. 19 is a schematic structural diagram of yet another UE according to an embodiment of the present invention.

In a third possible implementation manner, as shown in FIG. 19, the receiving unit 1603 includes a determining module 16037, a DCI receiving module 16038, and an RAR receiving module 16039.

The determining module 16037 is configured to determine a resource of a PDCCH according to the at least one of the level information or the resource information determined by the determining unit 1601, where the resource includes at least one resource of a time resource or a frequency resource.

The DCI receiving module 16038 is configured to receive, on the resource determined by the determining unit 1601, DCI carried by the PDCCH, where the DCI is used for scheduling the PDSCH.

The RAR receiving module 16039 is configured to receive, according to scheduling of the DCI received by the DCI receiving module 16038, the RAR carried by the PDSCH.

When the at least one of the level information or the resource information determined by the determining unit 1601 has different values, resources that are of the PDCCH and that are determined by the determining module 16037 do not overlap or are different.

Further, if the resource includes the frequency resource, the determining module 16037 is specifically configured to:

determine at least one of a PDCCH aggregation level, a PDCCH search space, or a PDCCH candidate according to the at least one of the level information or the resource information determined by the determining unit 1601.

Further, the determining module 16037 is specifically configured to:

determine the resource of the PDCCH according to the at least one of the level information or the resource information determined by the determining unit 1601 and a pre-configured correspondence between the resource of the PDCCH and the at least one of the level information or the resource information of the random access preamble sent in the enhanced manner.

Figure 20:
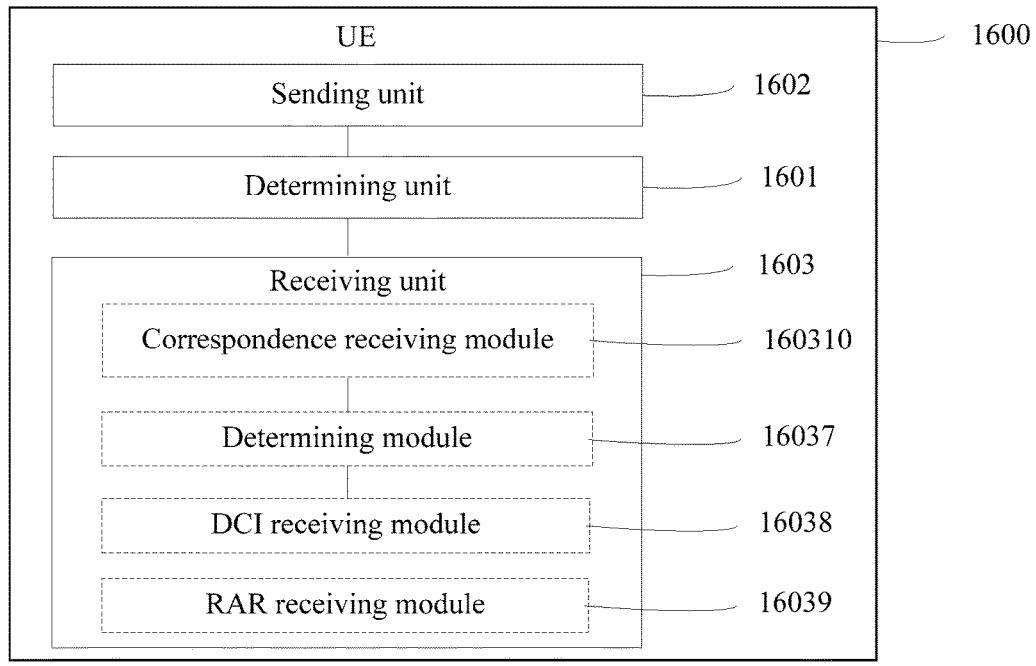
FIG. 20 is a schematic structural diagram of yet another UE according to an embodiment of the present invention.

Alternatively, as shown in FIG. 20, the receiving unit 1603 further includes a correspondence receiving module 160310, where the correspondence receiving module 160310 is configured to: before the determining module 16037 determines the resource of the PDCCH according to the at least one of the level information or the resource information determined by the determining unit 1601, receive information about a correspondence between the resource of the PDCCH and the at least one of the level information or the resource information of the random access preamble sent in the enhanced manner.

The determining module 16037 is further configured to:

determine the resource of the PDCCH according to the at least one of the level information or the resource information determined by the determining unit 1601 and the correspondence received by the correspondence receiving module 160310.

Figure 21:
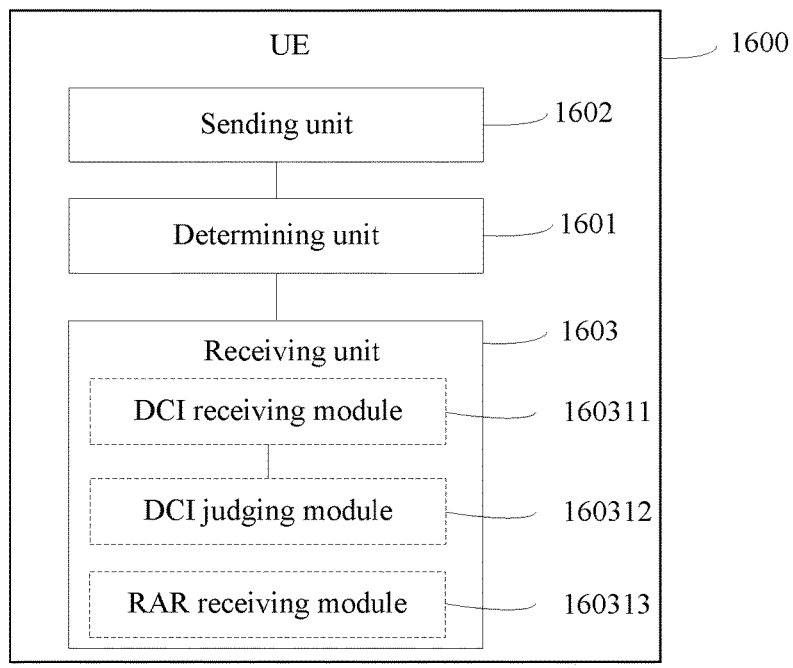
FIG. 21 is a schematic structural diagram of yet another UE according to an embodiment of the present invention.

In a fourth possible implementation manner, as shown in FIG. 21, the receiving unit 1603 includes a DCI receiving module 160311, a DCI judging module 160312, and an RAR receiving module 160313.

The DCI receiving module 160311 is configured to receive DCI carried by a PDCCH, where the DCI includes the at least one of the level information or the resource information, and the DCI is used for scheduling the PDSCH.

The DCI judging module 160312 is configured to determine whether the at least one of the level information or the resource information included in the DCI received by the DCI receiving module 160311 is the same as the at least one of the level information or the resource information corresponding to the random access preamble.

The RAR receiving module 160313 is configured to: when the DCI judging module 160312 determines that the at least one of the level information or the resource information included in the DCI received by the DCI receiving module 160311 is the same as the at least one of the level information or the resource information corresponding to the random access preamble, receive the RAR carried by the PDSCH.

Figure 22:
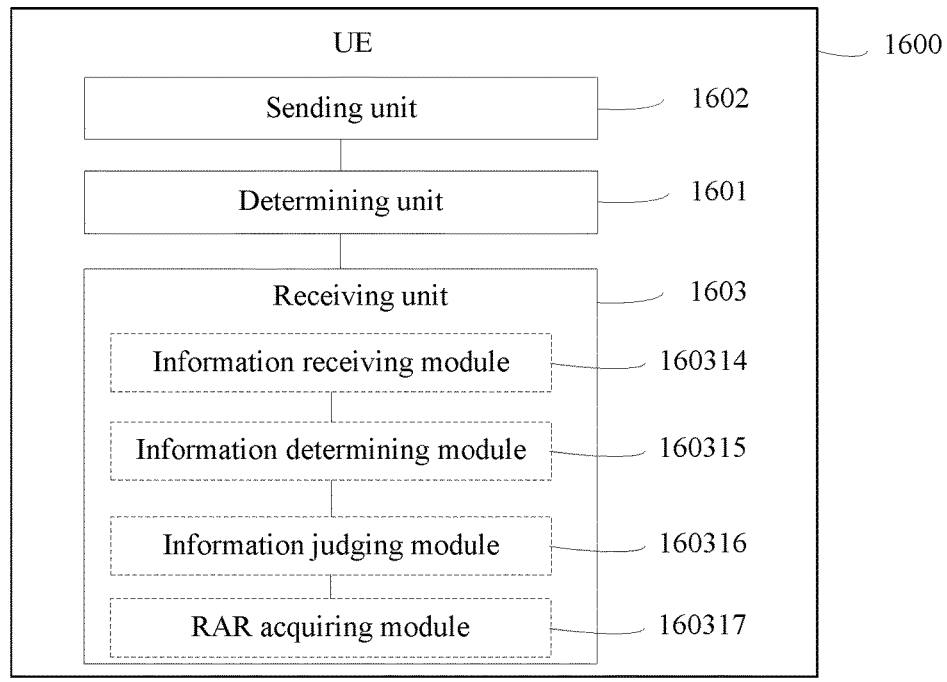
FIG. 22 is a schematic structural diagram of yet another UE according to an embodiment of the present invention.

Alternatively, as shown in FIG. 22, the receiving unit 1603 includes an information receiving module 160314, an information determining module 160315, an information judging module 160316, and an RAR acquiring module 160317.

The information receiving module 160314 is configured to receive information carried by the PDSCH, where the information carried by the PDSCH includes the RAR and the at least one of the level information or the resource information.

The information determining module 160315 is configured to determine the at least one of the level information or the resource information included in the information that is carried by the PDSCH and that is received by the information receiving module 160314.

The information judging module 160316 is configured to determine whether the at least one of the level information or the resource information that is included in the information carried by the PDSCH and that is determined by the information determining module 160315 is the same as the at least one of the level information or the resource information corresponding to the random access preamble.

The RAR acquiring module 160317 is configured to: when the information judging module 160316 determines that the at least one of the level information or the resource information that is included in the information carried by the PDSCH and that is determined by the information determining module 160315 is the same as the at least one of the level information or the resource information corresponding to the random access preamble, obtain the RAR carried by the PDSCH.

Further, the information determining module 160315 is specifically configured to:

determine, according to a bit in a backoff indication subheader of a Media Access Control MAC protocol data unit PDU carried by the PDSCH, the at least one of the level information or the resource information included in the information that is carried by the PDSCH and that is received by the information receiving module 160314.

Specifically, in this embodiment of the present invention, the channel quality characterization parameter may include at least one of the following parameters:

a coverage enhancement value, a coverage enhancement range index, a path loss, a path loss range index, a reference signal received power RSRP, a reference signal received power RSRP range index, a reference signal received quality RSRQ, a reference signal received quality RSRQ range index, a channel quality indicator CQI, or a CQI range index.

It should be noted that for units/modules of the UE 1600 provided in this embodiment of the present invention, the receiving unit 1603 may be specifically implemented by using a receiver, the sending unit 1602 may be specifically implemented by using a transmitter, and the determining unit 1601 may be specifically implemented by using a processor, where the processor, the receiver, and the transmitter can communicate with each other, which is not specifically limited in this embodiment of the present invention.

Specifically, for a method in which the UE performs random access response, reference may be made to descriptions in Embodiment 2 and Embodiment 3, and details are not described herein in this embodiment of the present invention.

The UE provided in this embodiment of the present invention includes: a determining unit, configured to determine a random access preamble to be sent in an enhanced manner, and determine at least one of level information or resource information corresponding to the random access preamble, where the level information includes at least one of a level, a level index, an enhancement level, an enhancement level index, a repetition level, a repetition level index, a repetition count, a resource level, a resource level index, a resource set level, a resource set level index, a resource set index, a time resource set index, a frequency resource set index, a preamble index, a preamble group index, or a channel quality characterization parameter, and the resource information includes at least one of a time-frequency resource index, a resource index, a random access opportunity index, a physical random access channel PRACH mask index, a time resource startpoint index, a time resource index, a frequency resource index, or a first PRACH index of the first subframe in which a PRACH carrying the random access preamble is located, where a quantity of values of the first PRACH index of the first subframe in which the PRACH carrying the random access preamble is located is a positive integer greater than 6; a sending unit, configured to send, in the enhanced manner, the random access preamble determined by the determining unit; and a receiving unit, configured to receive an RAR of the random access preamble according to the at least one of the level information or the resource information determined by the determining unit, where the RAR is carried by a PDSCH. Based on the foregoing solutions provided in this embodiment of the present invention, when determining the random access preamble, the UE further determines the at least one of the level information or the resource information corresponding to the random access preamble, so that after sending the random access preamble, the UE can receive, according to the at least one of the level information or the resource information, the RAR corresponding to the random access preamble. Therefore, the following problem is avoided so that power waste of the UE is reduced: When a base station sends, in one subframe, DCI carried by PDCCHs at different repetition levels, and schedules, by using the DCI, a PDSCH that carries an RAR, RAR missed detection or an RAR false alarm occurs because the UE cannot distinguish the PDCCHs at different repetition levels.

It may be clearly understood by a person skilled in the art that, for the purpose of convenient and brief description, division of the foregoing functional modules is merely used as an example for illustrating the apparatus described above. In actual application, the foregoing functions may be allocated to different functional modules and implemented according to a requirement, that is, an inner structure of the apparatus is divided into different functional modules to implement all or some of the functions described above. For a detailed working procedure of the foregoing system, apparatus, and unit, reference may be made to a corresponding procedure in the foregoing method embodiments, and details are not described herein.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separated, and components shown as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A random access response method, the method comprising:
  receiving a random access preamble sent in an enhanced manner;
  determining level information corresponding to the random access preamble sent in the enhanced manner, wherein the level information comprises a preamble index;
  determining a resource of a physical downlink control channel according to the preamble index, wherein the resource comprises at least one resource of a time resource or a frequency resource;
  sending, on the resource, downlink control information (DCI) carried by the physical downlink control channel, wherein the DCI is used for scheduling the physical downlink shared channel (PDSCH); and
  sending a random access response (RAR).

2. The method according to claim 1, further comprising, when the level information has different values, determining resources of the physical downlink control channel so that resources do not overlap or so that the resources are different.

3. The method according to claim 2, wherein, when the resource comprises the frequency resource, determining the resource of the physical downlink control channel according to the preamble index comprises determining at least one of a physical downlink control channel aggregation level, a physical downlink control channel search space, or a physical downlink control channel candidate according to the preamble index.

4. The method according to claim 2, further comprising sending information about a correspondence between the resource of the physical downlink control channel and the level information of the random access preamble sent in the enhanced manner, so as to determine the resource of the physical downlink control channel according to the information about the correspondence.

5. A random access response method, the method comprising:
  determining a random access preamble to be sent in an enhanced manner;
  determining level information corresponding to the random access preamble, wherein the level information comprises a preamble index;
  sending the random access preamble in the enhanced manner;
  receiving downlink control information (DCI) carried in a resource of a physical downlink control channel, wherein the resource is determined according to the preamble index; and
  receiving a random access response (RAR), wherein the RAR is carried by a physical downlink shared channel (PDSCH).

6. The method according to claim 5, further comprising, when the level information has different values, determining resources of a physical downlink control channel so that the resources do not overlap or so that the resources are different.

7. The method according to claim 6, wherein, when the resource comprises a frequency resource, determining the resource of the physical downlink control channel according to the preamble index comprises determining at least one of a physical downlink control channel aggregation level, a physical downlink control channel search space, or a physical downlink control channel candidate according to the preamble index.

8. The method according to claim 6,
  wherein determining resource of the physical downlink control channel according to the level information comprises determining the resource of the physical downlink control channel according to the preamble index and a pre-configured correspondence between the resource of the physical downlink control channel and the level information of the random access preamble sent in the enhanced manner; or
  wherein, before determining the resource of the physical downlink control channel according to the preamble index, receiving information about a correspondence between the resource of the physical downlink control channel and the level information of the random access preamble sent in the enhanced manner and determining the resource of the physical downlink control channel according to the preamble index comprises determining the resource of the physical downlink control channel according to the preamble index and the information about the correspondence.

9. A base station comprising:
  a receiver configured to receive a random access preamble sent in an enhanced manner;
  a processor configured to determine level information corresponding to the random access preamble that is sent in the enhanced manner, wherein the level information comprises a preamble index, wherein the processor is further configured to determine a resource of a physical downlink control channel according to the preamble index, and wherein the resource comprises at least one resource of a time resource or a frequency resource; and
  a transmitter is configured to send, on the resource, downlink control information (DCI) carried by the physical downlink control channel, wherein the DCI is used for scheduling the physical downlink shared channel (PDSCH), wherein the transmitter is further configured to send a random access response (RAR) carried by the PDSCH.

10. The base station according to claim 9, wherein, when the level information determined by the processor has different values, determined resources of the physical downlink control channel do not overlap or are different.

11. The base station according to claim 10, wherein when the resource comprises the frequency resource, the processor is specifically configured to determine at least one of a physical downlink control channel aggregation level, a physical downlink control channel search space, or a physical downlink control channel candidate according to the level information.

12. The base station according to claim 10, wherein transmitter further comprises a correspondence sending module, wherein the correspondence sending module is configured to send information about a correspondence between the resource of the physical downlink control channel and the level information of the random access preamble sent in the enhanced manner, so as to determine the resource of the physical downlink control channel according to the information about the correspondence.

13. A terminal comprising:
a processor is configured to:
determine a random access preamble to be sent in an enhanced manner, and determine level information corresponding to the random access preamble, wherein the level information comprises a preamble index;
a transmitter configured to send, in the enhanced manner, the random access preamble; and
a receiver configured to:
receive downlink control information (DCI) carried in a resource of a physical downlink control channel, the resource being determined according to the preamble index, and
receive a random access response (RAR), wherein the RAR is carried by a physical downlink shared channel (PDSCH).

14. The terminal according to claim 13, wherein, when the level information determined by the processor has different values, determined resources of a physical downlink control channel do not overlap or are different.

15. The terminal according to claim 14, wherein, when the resource comprises a frequency resource, the processor is configured to determine at least one of a physical downlink control channel aggregation level, a physical downlink control channel search space, or a physical downlink control channel candidate according to the level information determined by the processor.

16. The terminal according to claim 14,
wherein the processor is specifically configured to determine the resource of the physical downlink control channel according to the level information determined by the processor and a pre-configured correspondence between the resource of the physical downlink control channel and the level information of the random access preamble sent in the enhanced manner; or
wherein, when the receiver comprises a correspondence receiving module, the correspondence receiving module is configured to, before the processor determines the resource of the physical downlink control channel according to the level information determined by the processor, receive information about a correspondence between the resource of the physical downlink control channel and the level information of the random access preamble sent in the enhanced manner, and the processor is further configured to determine the resource of the physical downlink control channel according to the level information determined by the processor and the information about the correspondence received by the correspondence receiving module.

* * * * *